(12) United States Patent
Jobe

(10) Patent No.: US 11,142,371 B2
(45) Date of Patent: *Oct. 12, 2021

(54) RECYCLABLE INSULATED STACKABLE TRAY FOR COLD WET MATERIALS

(71) Applicant: Vericool, Inc., Livermore, CA (US)

(72) Inventor: Darrell Jobe, Livermore, CA (US)

(73) Assignee: Vericool, Inc., Livermore, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/846,917

(22) Filed: Apr. 13, 2020

(65) Prior Publication Data

US 2020/0307858 A1  Oct. 1, 2020

Related U.S. Application Data

(63) Continuation of application No. 15/913,699, filed on Mar. 6, 2018, now Pat. No. 10,618,690, which is a
(Continued)

(51) Int. Cl.
*B65D 21/02* (2006.01)
*B65D 81/38* (2006.01)
(Continued)

(52) U.S. Cl.
CPC ..... *B65D 21/0212* (2013.01); *B65D 21/0222* (2013.01); *B65D 65/466* (2013.01);
(Continued)

(58) Field of Classification Search
CPC ............ B65D 21/0212; B65D 21/0222; B65D 65/466; B65D 81/261; B65D 81/3816
See application file for complete search history.

(56) References Cited

U.S. PATENT DOCUMENTS 1,497,159 A    6/1924  Herbert
1,641,030 A    8/1927  Moses
(Continued)

FOREIGN PATENT DOCUMENTS

CN    2435329    6/2001
CN    101638162    2/2010
(Continued)

OTHER PUBLICATIONS

International Search Report and Written Opinion in International Application No. PCT/US2018/021152, dated Jun. 26, 2018, 19 pages.
(Continued)

*Primary Examiner* — Corey N Skurdal
(74) *Attorney, Agent, or Firm* — Fish & Richardson P.C.

(57) ABSTRACT

A stackable container includes a solid compostable or recyclable body formed primarily of a plant fiber. The body includes a floor and a plurality of side walls that are coupled to the floor along first common edges. Each side wall is coupled to two adjacent side walls along second common edges to surround an interior space of the container. A top surface of the side walls provides a rim that includes a recess or projection configured to couple the container to a corresponding projection or recess of an overlying container. A bottom surface of the floor includes a recess or projection that is configured to be coupled with a projection or recess of an underlying container.

15 Claims, 31 Drawing Sheets

Related U.S. Application Data continuation-in-part of application No. 15/904,168, filed on Feb. 23, 2018, now Pat. No. 10,597,219.

(60) Provisional application No. 62/567,137, filed on Oct. 2, 2017, provisional application No. 62/467,705, filed on Mar. 6, 2017, provisional application No. 62/462,842, filed on Feb. 23, 2017.

(51) Int. Cl.
  *B65D 81/26* (2006.01)
  *B65D 65/46* (2006.01)

(52) U.S. Cl.
  CPC ....... *B65D 81/261* (2013.01); *B65D 81/3816* (2013.01); *Y02W 90/10* (2015.05)

(56) References Cited

U.S. PATENT DOCUMENTS

| | | |
|---|---|---|
| 1,691,178 A | 11/1928 | Beaman |
| 1,701,323 A | 2/1929 | Martin |
| 1,715,814 A | 6/1929 | Brown |
| 1,845,970 A | 2/1932 | Katz |
| 1,904,400 A | 4/1933 | Bangs et al. |
| 2,083,113 A | 6/1937 | Bergaud |
| 2,109,789 A | 3/1938 | Bangs et al. |
| 2,194,301 A | 3/1940 | Fourness et al. |
| 2,231,981 A | 2/1941 | Zalkind |
| 2,326,817 A | 8/1943 | Zalkind |
| 2,591,578 A | 4/1952 | McNealy |
| 2,732,119 A | 1/1956 | Risch |
| 2,808,976 A | 10/1957 | Merle |
| 2,828,903 A | 4/1958 | Adkins |
| 2,872,095 A | 2/1959 | Adams |
| 2,885,135 A | 5/1959 | Friday |
| 2,927,720 A | 3/1960 | Adams |
| 2,941,708 A | 6/1960 | Harold et al. |
| 3,166,191 A | 1/1965 | Chaplin |
| 3,196,021 A | 7/1965 | Oas et al. |
| 3,315,410 A | 4/1967 | French |
| 3,365,092 A | 1/1968 | Blessing |
| 3,401,671 A | 9/1968 | Axelrod et al. |
| 3,416,692 A | 12/1968 | Delbert et al. |
| 3,513,531 A | 5/1970 | Humphress et al. |
| 3,539,075 A | 11/1970 | Bautista |
| 3,613,943 A | 10/1971 | Bridenstine |
| 3,678,703 A | 7/1972 | Cornish et al. |
| 3,746,204 A | 7/1973 | Nagai |
| 4,344,300 A | 8/1982 | Taylor |
| 4,351,165 A | 9/1982 | Drucker et al. |
| 5,062,527 A | 11/1991 | Westerman |
| 5,180,060 A | 1/1993 | Forti et al. |
| 5,208,267 A | 5/1993 | Neumann et al. |
| 5,215,208 A | 6/1993 | Jackson |
| 5,244,094 A | 9/1993 | Graff et al. |
| 5,266,763 A | 11/1993 | Colombo |
| 5,284,294 A | 2/1994 | Floyd |
| 5,307,986 A | 5/1994 | Schuster |
| 2,365,331 A | 12/1994 | Brayton |
| 5,564,570 A | 10/1996 | Jaszai |
| 5,634,569 A | 6/1997 | De Coster |
| 5,758,513 A | 6/1998 | Smith |
| 5,827,385 A | 10/1998 | Meyer et al. |
| 5,896,641 A | 4/1999 | Yamada et al. |
| 5,897,017 A | 4/1999 | Lantz |
| 5,924,302 A | 7/1999 | Derifield |
| 6,168,040 B1 | 1/2001 | Sautner |
| 6,257,764 B1 | 7/2001 | Lantz |
| 6,325,281 B1 | 12/2001 | Grogan |
| 6,598,419 B1 | 7/2003 | Tago |
| 6,619,500 B1 | 9/2003 | Lantz |
| 6,740,373 B1 | 5/2004 | Swoboda et al. |
| 6,938,968 B2 | 9/2005 | Tanimoto et al. |
| 7,332,214 B2 | 2/2008 | Ozasa et al. |
| 8,557,367 B2 | 10/2013 | Netravali et al. |
| 8,617,684 B2 | 12/2013 | Nomura et al. |
| 8,763,811 B2 | 7/2014 | Lantz |
| 8,960,470 B2 | 2/2015 | Tarble |
| 9,550,618 B1 | 1/2017 | Jobe |
| 9,856,608 B1 | 1/2018 | Chung et al. |
| 10,046,901 B1 | 8/2018 | Jobe |
| 10,059,495 B1 | 8/2018 | Korustan et al. |
| 10,625,925 B1 | 4/2020 | Jobe |
| 10,822,149 B1 | 11/2020 | Guido |
| 2002/0008113 A1 | 1/2002 | Fuji et al. |
| 2003/0082357 A1 | 5/2003 | Gokay et al. |
| 2003/0102317 A1 | 6/2003 | Gordon |
| 2003/0146224 A1 | 8/2003 | Fuji et al. |
| 2003/0152724 A1 | 8/2003 | Swoboda et al. |
| 2003/0217948 A1 | 11/2003 | Lantz |
| 2004/0058119 A1 | 3/2004 | Wynne |
| 2005/0202229 A1 | 9/2005 | Ozasa et al. |
| 2006/0065704 A1 | 3/2006 | Chang |
| 2006/0230778 A1 | 10/2006 | Williams |
| 2007/0051782 A1 | 3/2007 | Lantz |
| 2007/0158344 A1 | 7/2007 | Lin |
| 2008/0011621 A1 | 1/2008 | Liu et al. |
| 2008/0197037 A1 | 8/2008 | O'brien et al. |
| 2008/0289302 A1 | 11/2008 | Vulpitta |
| 2009/0001086 A1 | 1/2009 | Roderick et al. |
| 2009/0038978 A1 | 2/2009 | Lay |
| 2009/0265875 A1 | 10/2009 | Clamp et al. |
| 2010/0044267 A1 | 2/2010 | Tolibas-Spurlock et al. |
| 2010/0258574 A1 | 10/2010 | Bentley |
| 2010/0314397 A1 | 12/2010 | Williams et al. |
| 2011/0042449 A1 | 2/2011 | Copenhaver et al. |
| 2011/0100868 A1 | 5/2011 | Lantz |
| 2011/0101077 A1 | 5/2011 | Lin |
| 2011/0248038 A1 | 10/2011 | Mayer |
| 2012/0097067 A1 | 4/2012 | Fascio |
| 2012/0279896 A1 | 11/2012 | Lantz |
| 2013/0112694 A1 | 5/2013 | Bentley |
| 2013/0112695 A1 | 5/2013 | Roskoss |
| 2013/0140317 A1 | 6/2013 | Roskoss |
| 2014/0021208 A1 | 1/2014 | Anti et al. |
| 2014/0093704 A1 | 4/2014 | Shi et al. |
| 2014/0144161 A1 | 5/2014 | Pointer et al. |
| 2014/0319018 A1 | 10/2014 | Collison |
| 2014/0353317 A1 | 12/2014 | Ranade et al. |
| 2015/0158656 A1 | 6/2015 | McKinnon |
| 2015/0336730 A1 | 11/2015 | Shields |
| 2015/0344211 A1 | 12/2015 | Moon |
| 2016/0023837 A1 | 1/2016 | Furneaux et al. |
| 2016/0052692 A1 | 2/2016 | Branham |
| 2016/0311604 A1 | 10/2016 | Qin |
| 2017/0043937 A1 | 2/2017 | Lantz |
| 2017/0066582 A1 | 3/2017 | Vogel et al. |
| 2018/0029776 A1 | 2/2018 | Chung et al. |
| 2018/0215504 A1 | 8/2018 | Lin |
| 2018/0229911 A1 | 8/2018 | Luo |
| 2018/0229916 A1 | 8/2018 | Jobe |
| 2018/0229917 A1 | 8/2018 | Jobe |
| 2018/0237184 A1 | 8/2018 | Jobe |
| 2018/0237206 A1 | 8/2018 | Jobe |
| 2018/0305109 A1 | 10/2018 | Jobe |
| 2018/0334308 A1 | 11/2018 | Moore et al. |
| 2019/0329961 A1 | 10/2019 | Jobe |
| 2019/0367209 A1 | 12/2019 | Jobe |
| 2020/0102139 A1 | 4/2020 | Jobe |
| 2020/0122909 A1 | 4/2020 | Jobe |
| 2020/0140165 A1 | 5/2020 | Soto et al. |
| 2020/0391135 A1 | 12/2020 | Reimann |
| 2021/0070523 A1 | 3/2021 | Iyer |

FOREIGN PATENT DOCUMENTS

| | | |
|---|---|---|
| CN | 203473388 | 3/2014 |
| CN | 104743271 | 7/2015 |
| CN | 108177875 | 6/2018 |
| DE | 2461107 | 6/1976 |
| EP | 2000422 | 5/2012 |
| JP | H10-236545 | 9/1998 |
| JP | 2000-053180 | 2/2000 |
| JP | 2000-229676 | 8/2000 |

(56) References Cited

FOREIGN PATENT DOCUMENTS

| | | |
|---|---|---|
| JP | 2000-255640 | 9/2000 |
| JP | 2003-300565 | 10/2003 |
| JP | 2014-189326 | 10/2014 |
| KR | 20-0438192 | 1/2008 |
| KR | 20-0443141 | 1/2009 |
| WO | WO 99-54228 | 10/1999 |
| WO | WO 2006/117801 | 11/2006 |
| WO | WO 2017/027189 | 2/2017 |

OTHER PUBLICATIONS

U.S. Appl. No. 15/089,344, filed Apr. 1, 2016, 25 pages.

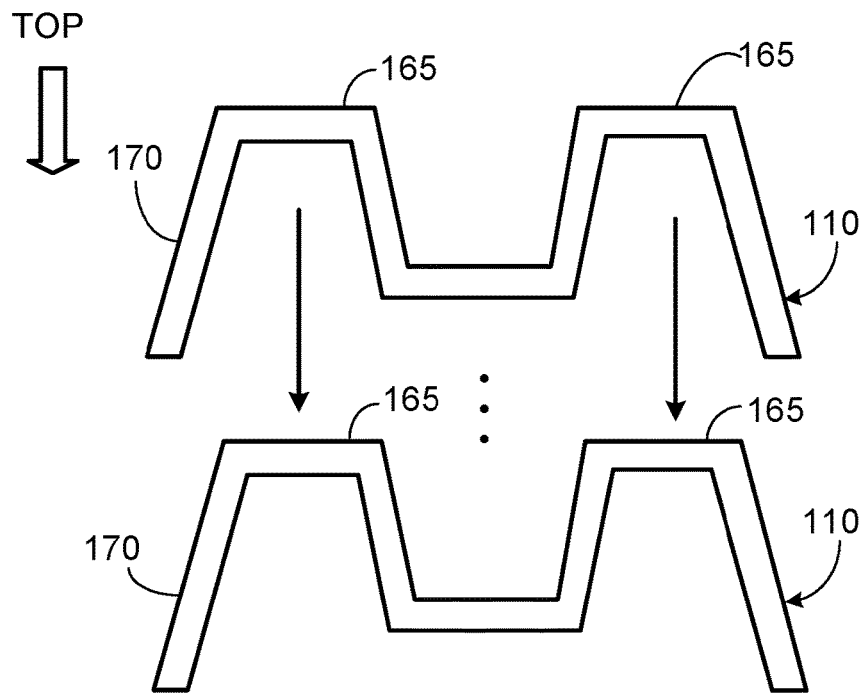
FIG. 7A
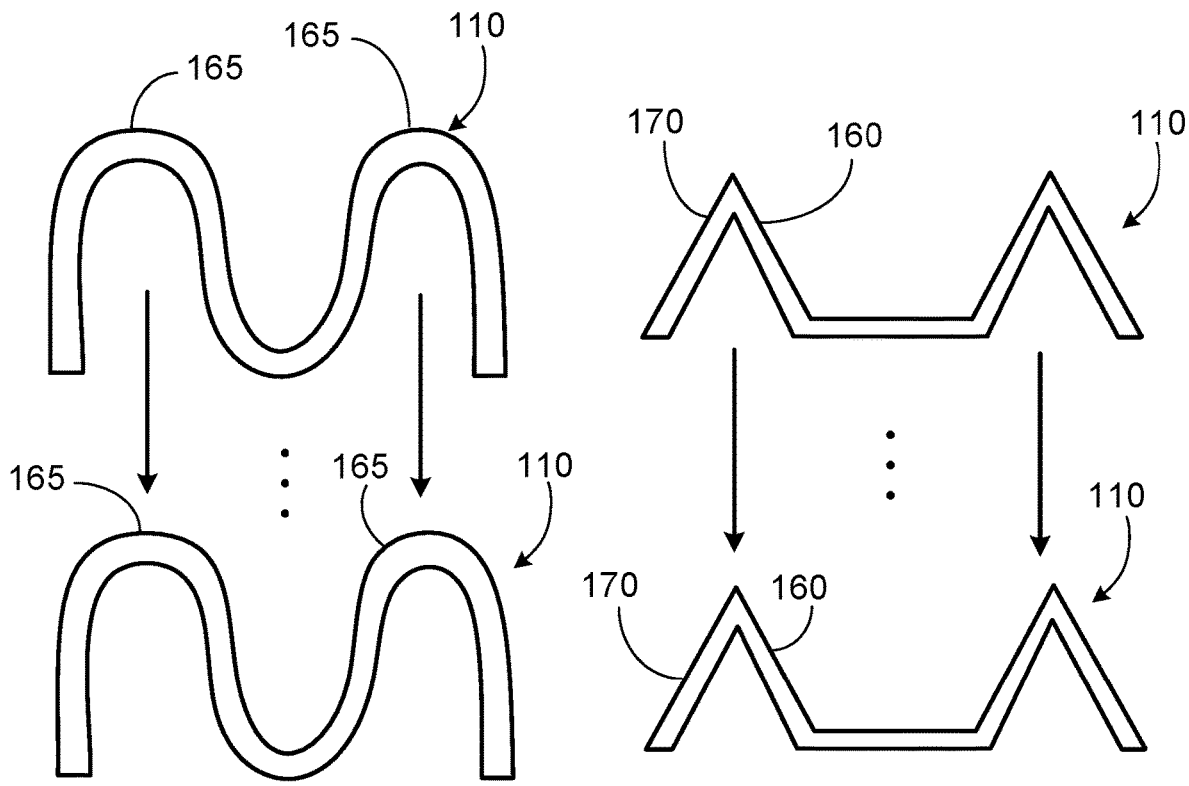
FIG. 7B
FIG. 7C

RECYCLABLE INSULATED STACKABLE TRAY FOR COLD WET MATERIALS

CROSS-REFERENCE TO RELATED APPLICATIONS

This application is a continuation of U.S. application Ser. No. 15/913,699, filed Mar. 6, 2018 which claims the benefit of U.S. Application Ser. No. 62/567,137, filed on Oct. 2, 2017. U.S. application Ser. No. 15/913,699 is also a continuation-in-part of U.S. application Ser. No. 15/904,168, filed Feb. 23, 2018, which claims the benefit of U.S. Provisional Application Ser. No. 62/467,705, filed Mar. 6, 2017, and to U.S. Provisional Application Ser. No. 62/462,842, filed Feb. 23, 2017.

TECHNICAL FIELD

This invention relates to a tray to store cold wet materials, e.g., seafood.

BACKGROUND

A conventional container for storing cold wet material, such as seafood, is expanded polystyrene (EPS), e.g., Styrofoam. For example, panels formed of expanded polystyrene can line or form the walls of a box, and additional cooling material to keep the seafood fresh, e.g., ice, can be placed surround the item.

EPS is relatively inexpensive and easily formed into a variety of shapes, but is not recyclable or compostable. Consequently, disposing of the material of the container can be a problem.

SUMMARY

A container that is compostable or recyclable, e.g., using curbside composting or recycling bins, is described. The container is stackable without any further stacking mechanism.

In one aspect, a stackable container to store wet material includes a solid compostable or recyclable body formed primarily of a plant fiber. The body includes a floor and a plurality of side walls that are coupled to the floor along first common edges. Each side wall is coupled to two adjacent side walls along second common edges to surround an interior space of the container. A top surface of the side walls provides a rim that includes a recess or projection configured to couple the container to a corresponding projection or recess of an overlying container. The floor is seamlessly and continuously coupled along each of the first common edges to each of the plurality of side walls. Each of the plurality of side walls is seamlessly and continuously coupled along the second common edges to adjacent side walls. A bottom surface of the floor includes a recess or projection that is configured to be coupled with a projection or recess of an underlying container.

Implementations may include one or more of the following features.

The plant fiber may include bamboo, bagasse, wood pulp, or combinations thereof. A top surface of the floor may further include one or more grooves or protrusions to secure the wet material. One or more holes through the floor may provide drainage of liquid from the interior space. The solid compostable or recyclable body may include an additive to increase resistance of the plant fiber to water. A water-barrier film may be formed over a portion of the body. The rim may include the projection and the bottom surface of the floor may include the recess.

In another aspect, a container to store wet material includes a solid compostable or recyclable body formed primarily of a plant fiber. The body includes a floor, a plurality of inner side walls that are coupled to the floor along first common edges and each coupled to two adjacent inner side walls along second common edges, a rim coupled to the plurality of inner side walls along third common edges and that includes a projection or recess configured to couple the container to a recess or projection of an overlying container, and a plurality of outer side walls that are coupled to the rim along fourth common edges and each coupled to two adjacent outer side walls along fifth common edges. The floor and the plurality of inner side walls define an interior space of the body to receive the item and an opening to the interior space. The plurality of inner side walls and plurality of outer side walls have a space therebetween that defines a first gap. The floor is seamlessly and continuously coupled along each of the first common edges to each of the plurality of inner side walls, wherein each of the plurality of inner side walls is seamlessly and continuously coupled along the second common edges to adjacent inner side walls, wherein each of the plurality of inner side walls is seamlessly and continuously coupled along each of the third common edges to the rim, wherein the rim is seamlessly and continuously coupled along each of the fourth common edges to each of the plurality of outer side walls, and wherein each of the plurality of outer side walls is seamlessly and continuously coupled along the fifth common edges to adjacent outer side walls. A bottom cover is attached to bottom edges of the outer walls of the body and extending below the floor of the body. The floor, the plurality of inner side walls, the rim, the plurality of outer side walls and the bottom cover define a cavity that includes the first gap. The floor includes a recess or projection that is configured to be coupled with a projection or recess of an underlying container.

Implementations may include one or more of the following features.

The cavity may be filled with one or more materials selected from the group consisting of plant fiber, starch and plastic. The cavity may be empty. A top surface of the floor may have one or more grooves or protrusions configured to secure the wet flexible material. One or more holes through the floor may provide drainage of liquid from the interior space. The solid compostable or recyclable body may include an additive to increase resistance of the plant fiber to water. A water-barrier film may be formed over a portion of the body. The rim may include the projection and the bottom surface of the floor may include the recess.

Potential advantages may include (and are not limited to) one or more of the following. The container is compostable or recyclable, so all of the components of the container are easily disposable. The container is thermally insulating and water-resistant, so the container can store wet material such as seafood along with a coolant such as ice to maintain the material in a fresh condition. In addition, the container is stackable without any further stacking mechanism. Each container engages the vertically adjacent chamber to reduce the likelihood of the containers tipping or sliding off the stack.

Optionally, liquid inside can drain from the container through one or more holes formed on a bottom surface of the container. Thus, danger of the material becoming soggy or soaking in accumulated water can be reduced.

The details of one or more embodiments are set forth in the accompanying drawings and the description below. Other features, objects, and advantages will be apparent from the description and drawings, and from the claims.

DESCRIPTION OF DRAWINGS

FIGS. 7A to 7C are cross-sectional views of implementations of a stackable compostable or recyclable body.

Like reference symbols in the various drawings indicate like elements.

DETAILED DESCRIPTION

Initially, some terminology may be beneficial. "Biodegradable" simply means that a product will eventually disintegrate into to innocuous material. "Recyclable" indicates that a product can be reused or treated in order to be made suitable for reuse. "Compostable" indicates both that a product will decompose quickly, e.g., within 180 days, and that the product will decompose into material that can be used as fertilizer (e.g., per ASTM D6400 or EN 13432). Products that are "biodegradable" need not be (and usually aren't) "compostable." First, since there is no particular time limit for a "biodegradable" product to disintegrate, it need not decompose quickly. For example, even aluminum cans will biodegrade given several centuries. Moreover, even a biodegradable product that decomposes quickly might not provide a material that is suitable as fertilizer.

Most conventional thermally insulating materials for packaging, e.g., EPS, are not compostable. One technique for using a compostable insulating packaging material is to fill a volume between an inner wall and an outer wall of a box with loose-fill compostable cornstarch foam pellets (e.g., packing "peanuts") using layered stratification, and then compress each layer of foam pellets in within this volume to compact them. This technique requires either multiple boxes or a specialized box having both inner and outer walls, and also requires specialized machinery for layered stratification compaction of the pellets. The additional or specialized boxes increase the cost. In addition, the loose fill pellets are difficult to compost because they are messy when removed from the box. Moreover, a large amount of pressure, e.g., 25 lbs. or more, needs to be applied to close the top flaps of the box due to the resistance from the pellets.

However, instead of loose-fill foam pellets, a solid compostable or recyclable body formed primarily of extruded starch, e.g., milled extruded sorghum or corn starch, organic fiber pulp, e.g., corn husk fiber pulp, or a plastic, e.g., polyethylene, provides a thermally insulating packaging for shipping an item, and this packaging can be used as the insulation in the container.

The solid compostable or recyclable body can be enclosed by or coated with a biodegradable or recyclable layer. The layer can provide a moisture barrier. As a moisture barrier, the layer can be a water-proof, water-resistant or water-repellant layer.

Structure of Thermally Insulating Packaging

Figure 1A:
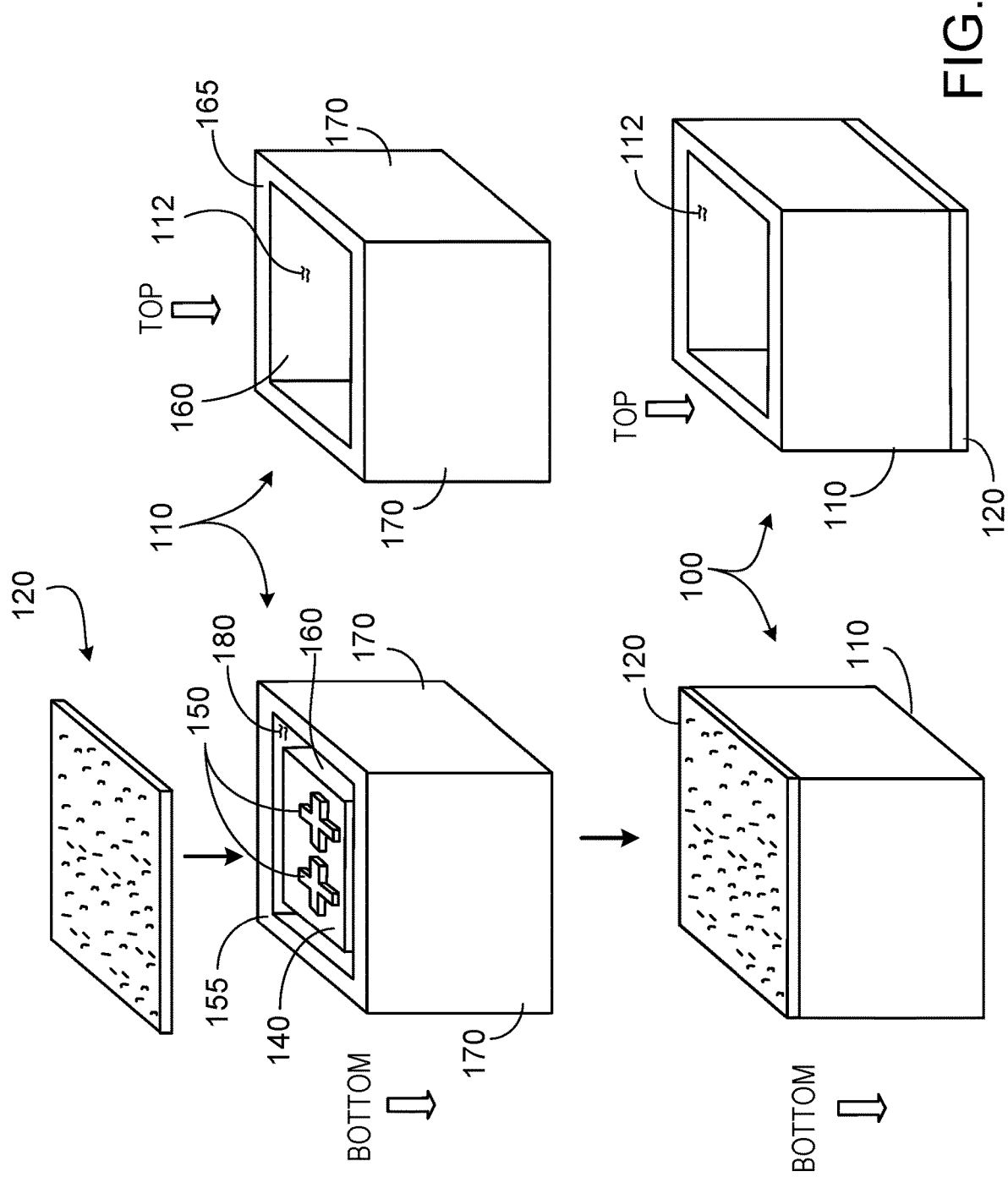
FIG. 1A is an exploded perspective view of a first implementation of a thermally insulating packaging.
Figure 1B:
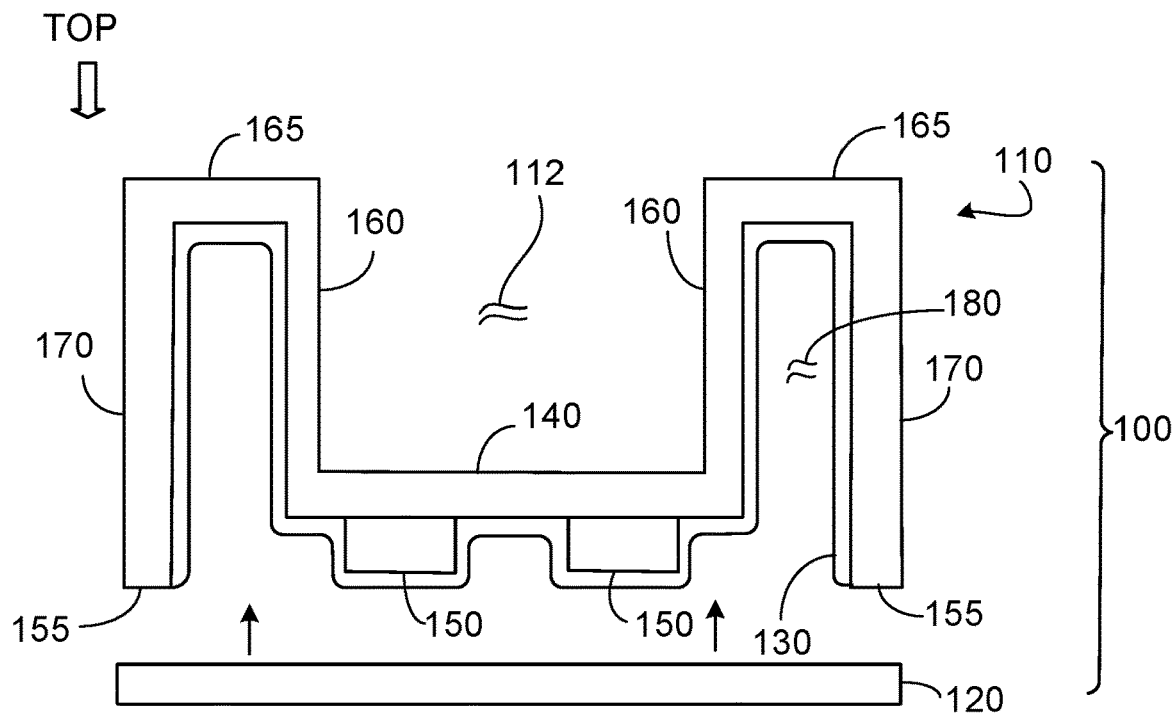
FIG. 1B is a cross-sectional view of the first implementation of a thermally insulating packaging.

FIG. 1A is an exploded perspective view of a first implementation of a thermally insulating packaging. FIG. 1B is a cross-sectional view of the first implementation of the thermally insulating packaging in FIG. 1A. In some implementations, the thermally insulating packaging 100 can be shipped without being inserted into a shipping box; in this case the packaging 100 can serve as the shipping container. In some other implementations, the thermally insulating packaging 100 can be inserted into a shipping box, e.g., a cardboard box, for shipping.

The thermally insulating packaging 100 includes a solid compostable or recyclable body 110 that is primarily formed of a compostable and/or recyclable material. In this context, "solid" indicates that the body 110 holds together as a single unit, e.g., rather than being formed of loose-fill pellets. The thermally insulating packaging 100 can optionally include a water-proof, water-resistant or water-repellant layer that covers at least a portion of the body 110.

Examples of the compostable material(s) for forming the body 110 are starch, organic fiber, or a combination of them. The starch can be a grain starch, e.g., a corn starch, a wheat starch or sorghum (sorghum is also known as milo), a root starch, e.g., a potato starch, or a vegetable starch. In some cases, a combinations of different starches can be used. The organic fiber can be plant fibers, e.g., a paper pulp, or a vegetable fiber pulp. For example, the plant fibers could be fibers from coconut husk, corn husk, linen, or cotton. In some cases, a combination of plant fibers from different plants can be used.

In some implementations, the body 110 consists of starch. In some implementations, the body consists of plant fiber. In some cases, a combination of starch and plant fiber can be used; the body can consist of starch and plant fiber.

Other materials that do not interfere with the compostable or recyclable nature of the body 110, e.g., a softener to improve adhesion of the starch, or a preservative or anti-fungal agent, can be present, but only in small quantities. For example, at least 85%, e.g., at least 90-95%, by weight of the body 110 is starch and/or pulp. Polyvinyl alcohol can be present, e.g., 5-10% by weight.

In some implementations, the material of the body 110 can be a foam material, e.g., to include small pores or voids spread substantially uniformly through the body 110. For example, 10-80% of the volume of the body 111 can be pores or voids, e.g., 25-75%, 25-50%, 10-25%, 50-75%. The maximum size of the pores or voids can be about 1 mm. Although the body 110 could be a foam material, it is generally incompressible. The density of the solid compostable or recyclable body 110 can be about 0.4-3.5 g/cm3, e.g., 0.6-1.0 g/cm3, 0.8-2.0 g/cm3, 1.0-3.5 g/cm3.

An example of the recyclable material for forming the body 110 is a plastic, e.g., polyethylene. For example, the body 110 can include low-density polyethylene (LDPE), medium-density polyethylene (MDPE), high-density polyethylene (HDPE), or polyethylene terephthalate. In some implementations, polyethylene can be shredded into particles having a particular size or a random size and be compacted to form the body 110. An advantage of polyethylene is ease of fabrication and good water resistance. Another example of recyclable material for the body 110 is a body formed from a pulp of plant fibers, e.g., a paper pulp (whether paper pulp is compostable or recyclable can depend on the thickness, size and porosity of the body).

In some implementations, the body 110 is entirely compostable, i.e., consists of compostable materials. In some implementations, the body 110 is entirely recyclable, i.e., consists of recyclable materials. In some implementations, the body 110 is formed of a combination of compostable and recyclable materials.

The thickness of the body 110 can be about 0.5-5 inches, e.g., 1-3 inches. Any given unitary body 110 can have substantially uniform thickness. The floor 140, the outer side walls 160, and the inner side walls 170 can have substantially uniform thickness. In some implementations, the surfaces of the body 110 can be generally flat. In some other implementations, one or more surfaces of the body 110 can be corrugated. Corrugation can increase the effective thickness of the body 110, e.g., by a factor of up to 4. In this case, the thickness of the body 110 can still be uniform, but the body 110 is shaped with corrugations. However, in some implementations, the inner surfaces of the body have various projections, e.g., tabs or struts, e.g., to assist in positioning of the item to be shipped or for increased structural support.

In addition, in some implementations, the outer surfaces of the body can have various projections, e.g., pads or struts, e.g., to assist provide increased structural support or cushioning.

Referring a top view of the thermally insulating packaging 100 shown in FIG. 1A, the thermally insulating packaging 100 generally takes the form of a "tub," e.g., a container with floor and side-walls and that is open at the top and has an interior space. The "tub" can have box-like shape, e.g., a generally rectilinear prism. Of course, the edges of the body can be rounded, while remaining a generally rectilinear prism. In addition, the "tub" could have other shapes, e.g., octagonal, cylindrical, etc., while still considered to have side-walls.

Figure 1C:
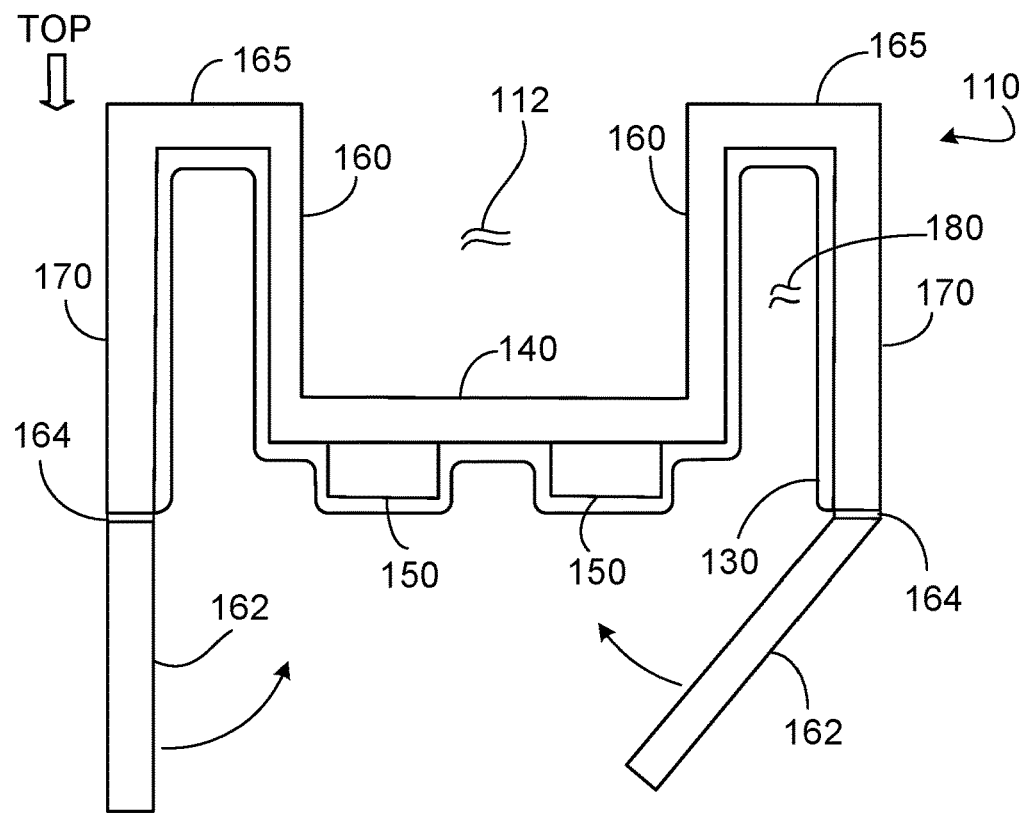
FIG. 1C is a cross-sectional view of a second implementation of a thermally insulating packaging.
Figure 1D:
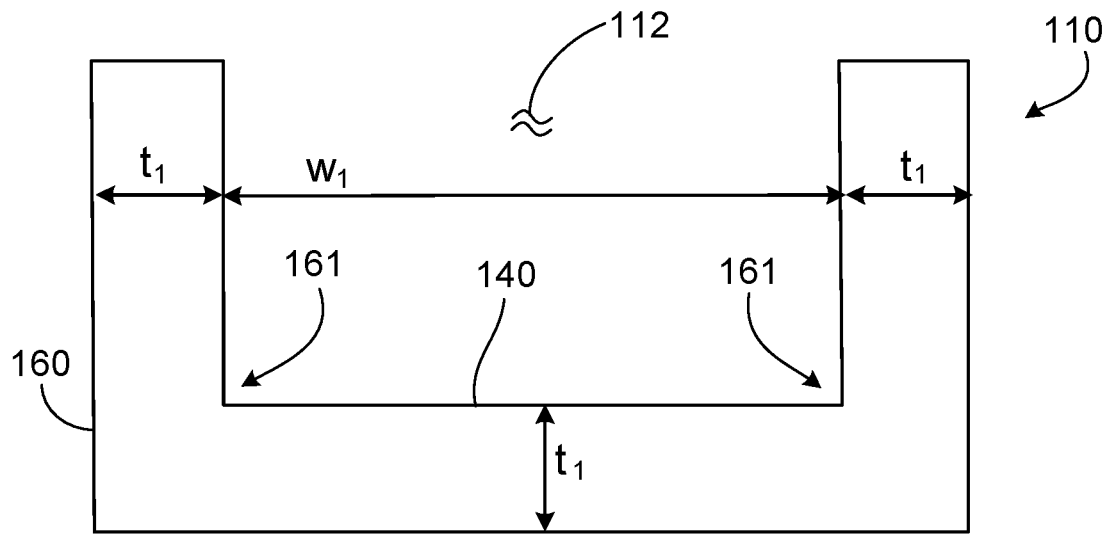
FIG. 1D is a cross-sectional view of a third implementation of a thermally insulating packaging.
Figure 1E:
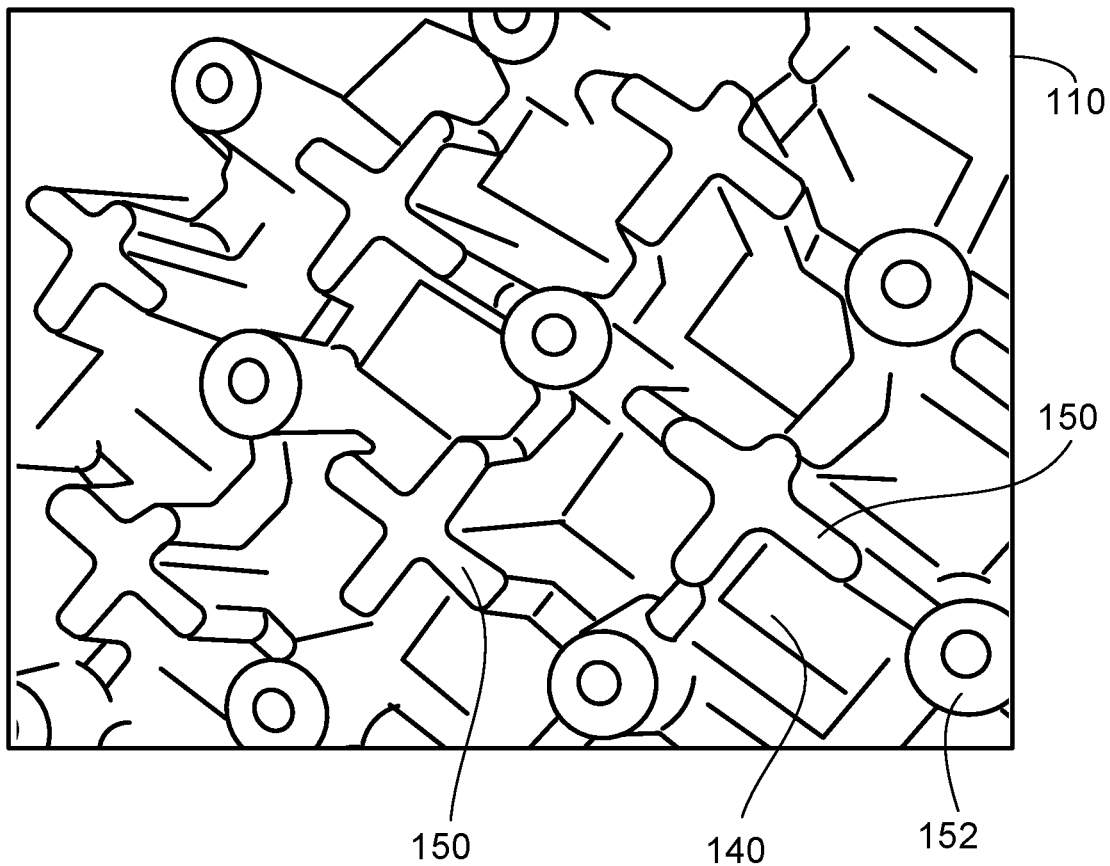
FIG. 1E is a bottom view of a floor of a fourth implementation of a thermally insulating packaging.
Figure 1F:
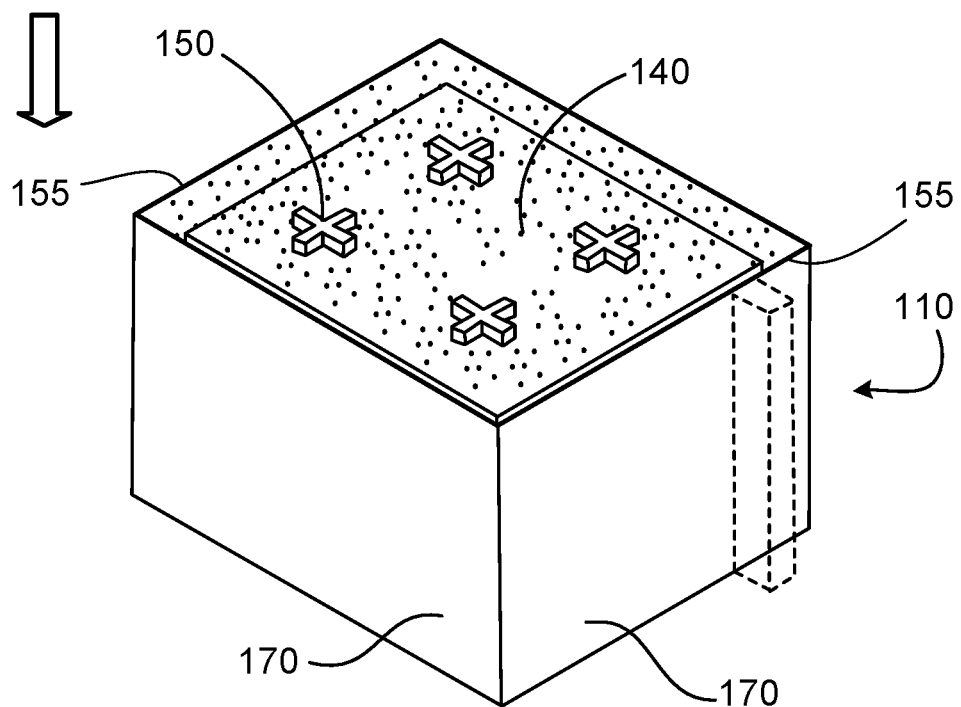
FIGS. 1F to 1O are perspective views of implementations of a thermally insulating packaging.
Figure 1F:
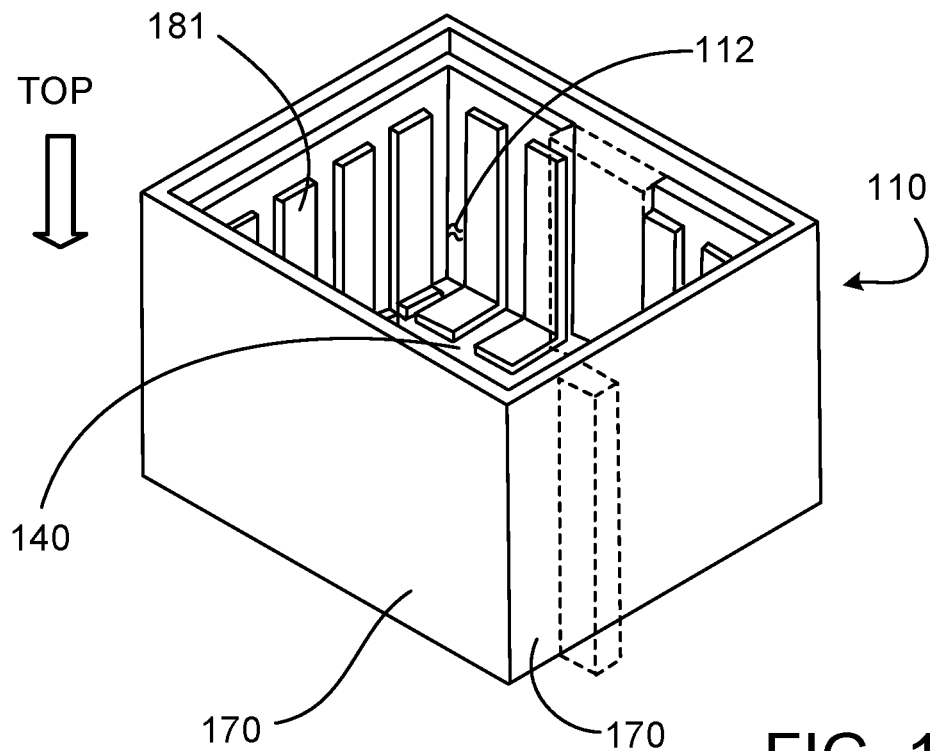
Figure 1G:
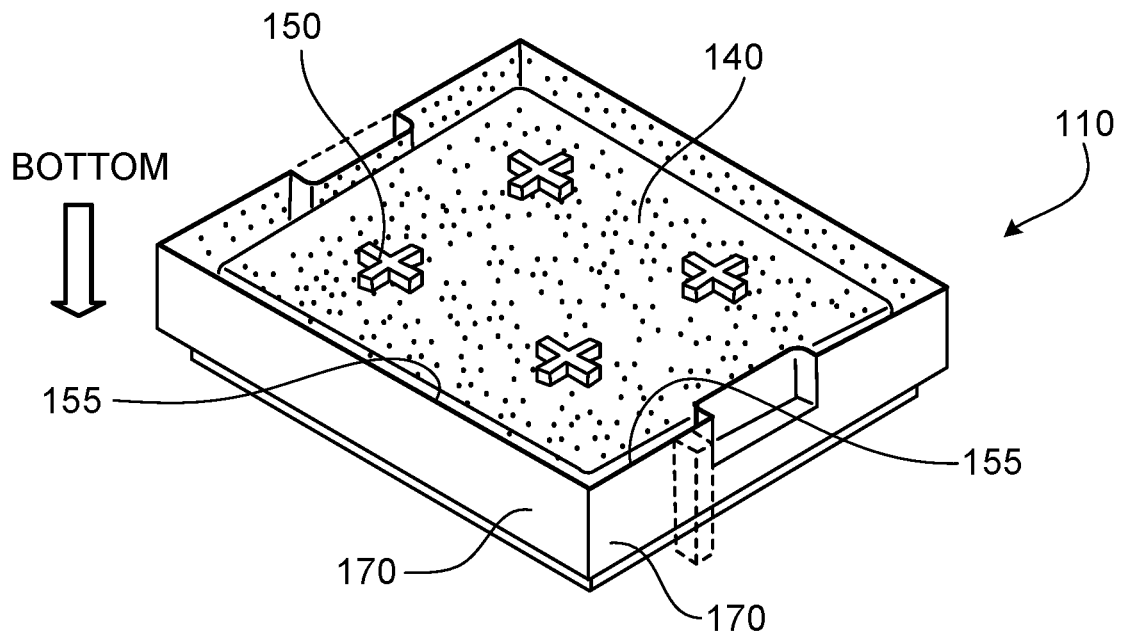
Figure 1G:
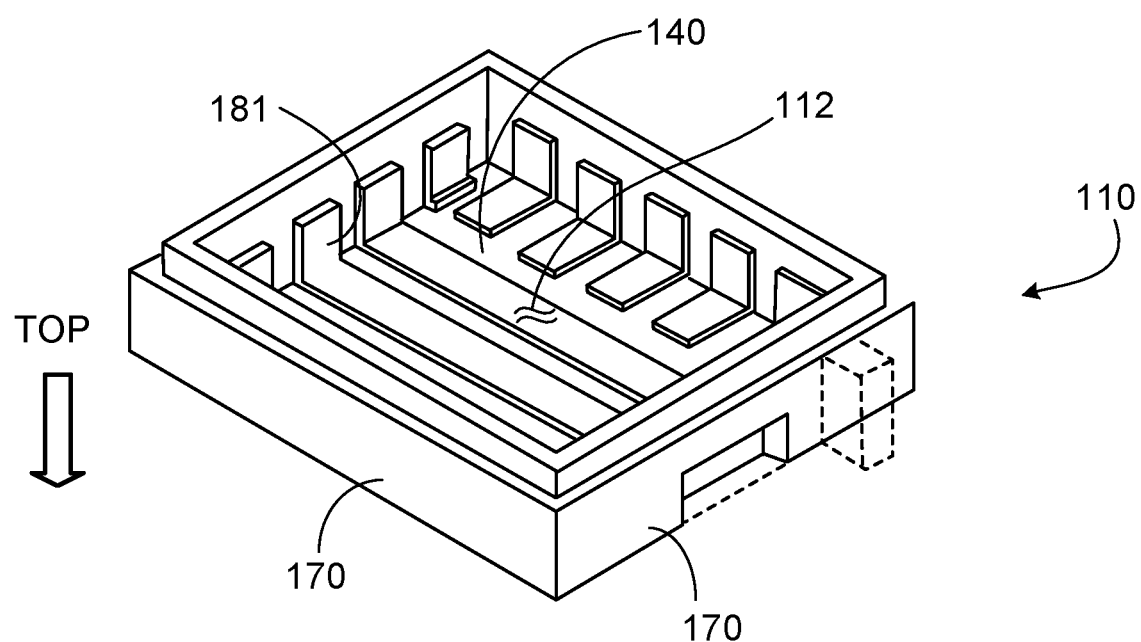
Figure 1H:
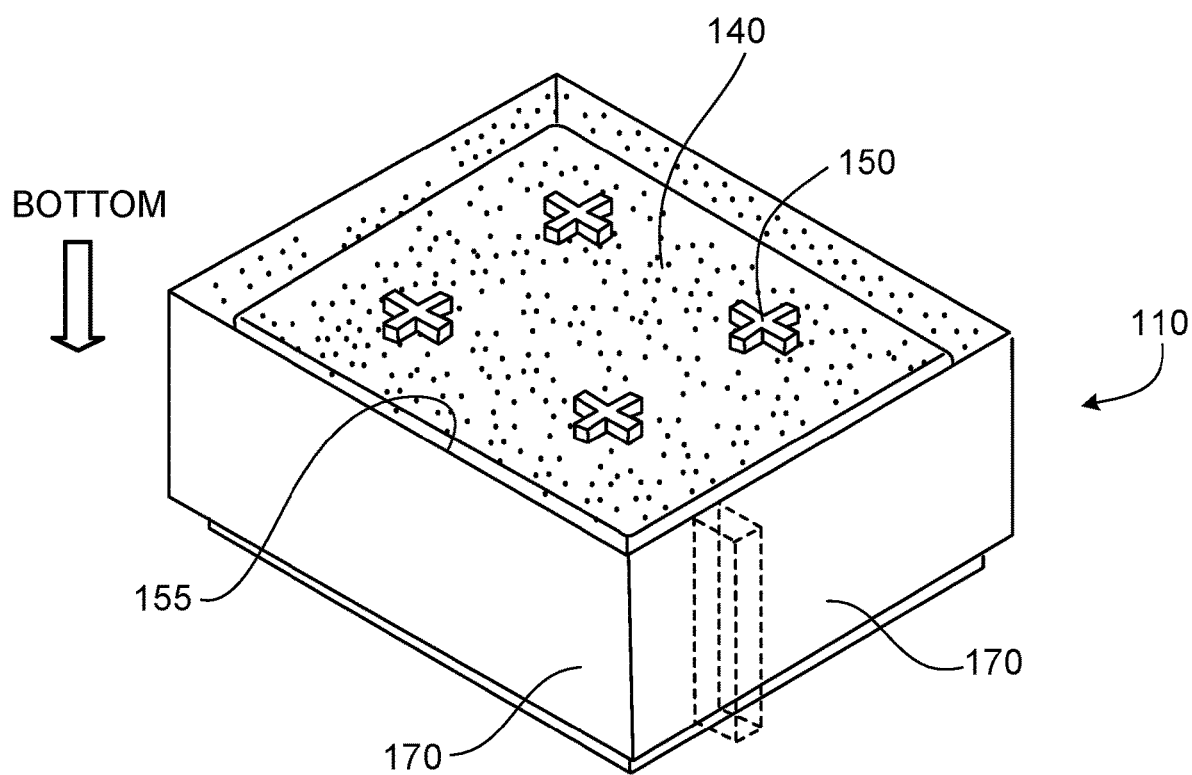
Figure 1H:
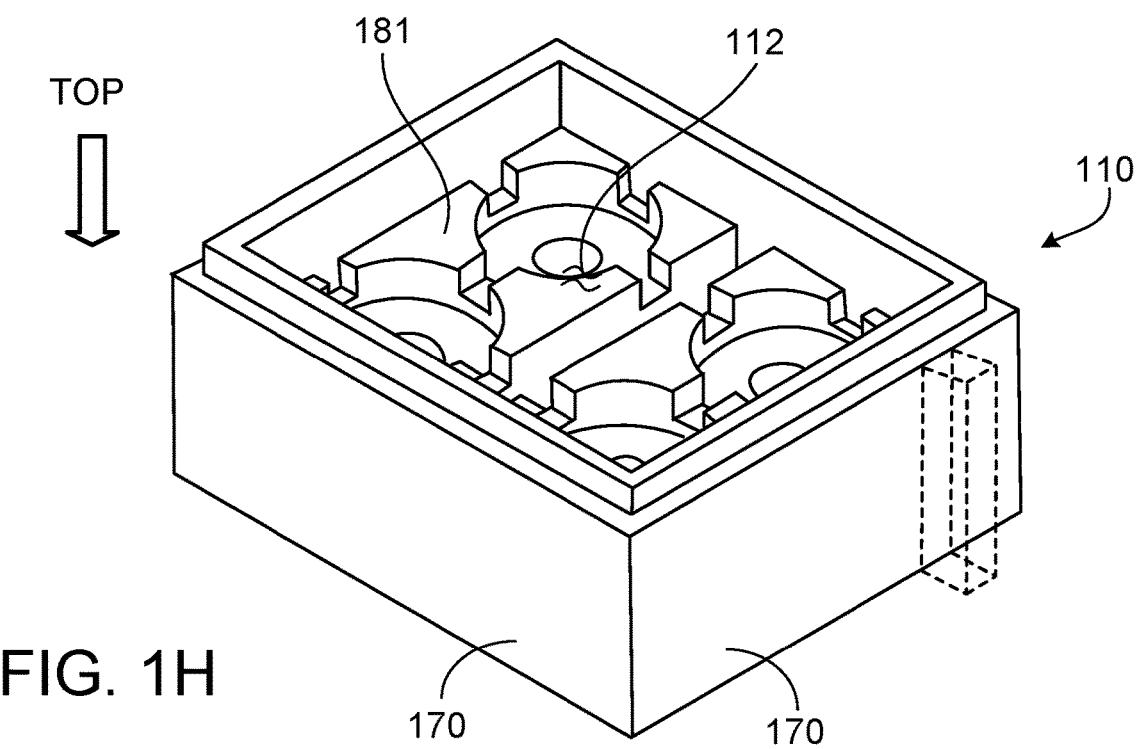
Figure 1I:
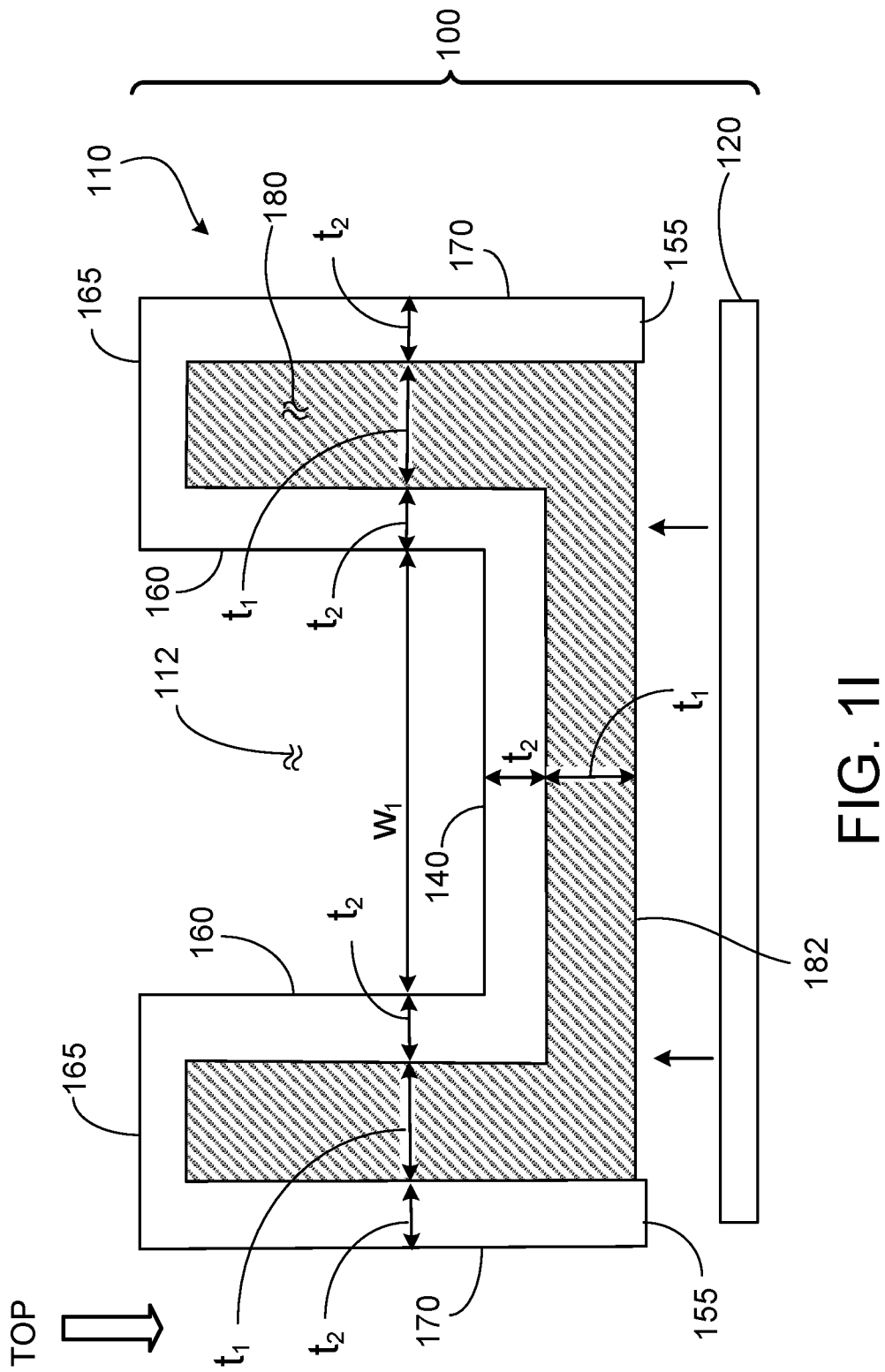

Referring FIGS. 1B, 1D and 1I, the body 110 is or includes a unitary layer that provides a floor and side walls of the body 110. This unitary layer is "continuous." In this context, "continuous" indicates that the portions are joined without a discontinuity in material composition; there is no gap, adhesive, melted region, or similar disruption in the material composition to indicate a seam between floor and walls or between adjacent walls. This unitary layer holds together by itself as a single unit without adhesives or fasteners to join multiple sections.

As shown in FIGS. 1B and 1D, the packaging 100 can be a single-piece body, i.e., the solid compostable or recyclable body 110 consists of, i.e., is only, the unitary layer. The solid compostable or recyclable body 110 can have a uniform homogenous composition. The solid compostable or recyclable body 110 is primarily formed of a single compostable material. As a unitary layer, the floor 140 of the solid compostable or recyclable body 110 is joined "continuously" to the side walls 160 along edges 161. In addition, each of the side walls 160 is joined "continuously" to its adjacent side walls along edges, e.g., an edge 161.

As shown in FIG. 1B, the body can form a shell with a gap between inner and outer side walls (which together provide the side walls of the packaging). Alternatively, as shown in FIG. 1D, the body doesn't include any interior cavity between the inside surface and outside surface of the side walls 160.

For any of the various implementations, although the floor and walls of the body 110 can be thin, as compared to their respective length and width, the floor and walls are thick enough to provide sufficient thermal insulating function for common commercial applications that require shipment by package delivery service, e.g., FedEx or UPS services, of packages, e.g., up to 48"×48"×48", of products, e.g., foods or medical supplies, that need to be kept cool, e.g., at temperatures of 32-48° F. In general, this can be accomplished with the body 110 having a thicknesses noted above, e.g., of about 0.5-5 inches for a single-piece compostable body, or 0.25-4 inches for the core and 0.25-0.75 inches for the shell of a compostable body having a core and shell.

An example thickness t1 of the solid compostable or recyclable body 110 can be 0.5-5 inches. In the illustrated example, the solid compostable or recyclable body 110 has substantially uniform thickness. In some implementations, the solid compostable or recyclable body 110 can have non-uniform thickness. For example, a thickness of the floor 140 can be different from a thickness for the side wall 160. A width w1 of the interior space 112 can be 3-48 inches. In some implementations, the interior space 112 can have a square shape. In some other implementations, the interior area 112 can have a rectangular shape. In some other implementations, the interior area 112 can have a circular shape.

In the example of the body 110 in FIG. 1A and FIG. 1B, the outer surface of the floor 140 is continuously joined to the outer surfaces of inner side walls 170. The outer surfaces of the inner side walls 170 are continuously jointed to the outer surfaces of the outer side walls 160 by a rim 165 of the body 110. The outer surfaces of the outer side walls 160 are continuously joined to the inner surfaces of inner side walls 170. The inner surfaces of the inner side walls 170 are continuously jointed to the inner surface of the floor 140.

The floor 140, the inner side walls 170, the rims 165, the outer side walls 160 define a cavity 180 within the body 110. In some implementations, referring to FIG. 1B, the cavity 180 can be left as an empty space.

In some implementations, referring to FIG. 1I, the cavity 180 can be filled with a compostable or recyclable material(s). In this case, the body 110 includes both a shell (formed from the body described above) and material that fits into the cavity 180 in the shell and that provides a core 182 of the body. Optionally, the bottom of the thermally insulating packaging 100 is closed off by a lower cover 120 to cover the core 182 of the body 110.

An example thickness t1 of the core 182 can be 0.25-4 inches. An example thickness t2 of the outer side walls 160, the rims 165, and the inner sidewalls 170 can be 0.125-0.5 inches.

In the illustrated example, the body 110 has substantially uniform thickness. The outer side walls 160, the rims 165, and the inner side walls 170 have a uniform thickness. In some implementations, the body 110 can have non-uniform thickness. For example, thicknesses of the outer side walls 160, the rims 165, and the inner side walls 170 can be different from each other. A width w1 of the interior space 112 can be 3-48 inches. In addition, as described below, the interior and/or exterior surfaces of the body 110 can have protrusions and/or recesses.

In some implementations, the shell and the core can have different compositions. For example, the shell can be primarily formed of starch whereas the core can be primarily formed of organic fiber pulp. As another example, the shell can be primarily formed of a corn starch while the core can be primarily formed of a root starch. In these examples, the shell and the core are compostable and recyclable.

As another example, the shell can be primarily formed of starch or pulp while the core can be primarily formed of polyethylene, e.g., shredded polyethylene or polyethylene pellets. In this example, the shell is compostable and recyclable while the core is recyclable. As another example, the core can be primarily formed of starch or pulp while the shell can be primarily formed of polyethylene. In this example, the core is compostable and recyclable while the shell is recyclable. In these implementations, even if the shell has a composition that is different from a composition of the core, each of the shell and the core can have a uniform homogenous composition.

In some implementations, the shell and the core can have the same composition, but the composition of the shell and the composition of the core can be differently processed. For example, both the shell and the core can be primarily formed of a starch. However, the starch used for the shell can be processed at a first temperature during a drying process while the starch used for the core can be processed at a second temperature during a drying process.

In some implementations, the shell and the core can have different firmness. For example, the shell can be primarily formed of a material that is harder than the material that provides the core, or vice versa. Alternatively, the shell and the core can have the same compositions.

In some implementations, the shell can have a solid composition while the core is loose material, e.g., pellets, shredded material, powder, etc. For example, the core can be composed of starch pellets, shredded paper, loose plant fibers, etc. Optionally the loose material can be compacted within the shell.

If the core includes a loose material, the bottom of the shell will need to be covered, e.g., by the lower cover 120, to retain the loose material of the core within the shell.

If the core is a solid body or is a loose material that is sufficiently compacted that it can't be trivially dislodged, then covering the bottom of the shell is optional; a portion of the shell can extend across the bottom of the core to enclose the core, or the bottom of the core could provide the lower outer surface of the body 110.

In some other implementations, e.g., as shown in FIG. 1B, the gap 180 can be filled with air, that is the gap 180 can be left as an empty space. In this case, the bottom of the shell can be covered to seal the air within the gap 180.

The gap between the outer wall 160 and the inner wall 170 can be 0.5-4 inches.

The inner side walls 170 can have a height (in the vertical direction) smaller, e.g., by about 0.5 to 4 inches, than the height of the outer side walls 160. This permits a gap to be formed between the lower cover 120 and the floor 140 when the lower cover 120 is attached to the body 110. Alternatively, the bottom of the floor 140 could be coplanar with the bottom of the outer side walls 160; in this case there would not be a gap below the floor 140 when the lower cover 120 is attached.

Referring to FIGS. 1A and 1B, the body 110 includes a floor 140, outer side walls 160, and inner side walls 170. The outer side walls 170 and the inner side walls 170 are joined at rims 165 of the body 110. The floor 140 and the inner side walls of the body 110 define the interior space 112 of the body 110 to receive the item and optionally a coolant, e.g., ice, dry ice or a gel pack.

As noted above, the body 110 (whether a single-piece body or a shell that encloses air or a core material) can include one or more projections that project inwardly from the floor or side walls of the body 110. The inward projections can serve to hold the item in the interior space 112, to divide the interior space 112 into separate sub-compartments, e.g., sub-compartments 112a, 112b as shown in FIGS. 1N and 1O, or to provide increased structural support for the body 110.

The body 110 can also include one or more projections that project outward from the floor or side walls of the body 110. The outward projections can provide increased structural support or for cushioning of the packaging.

The body 110 can also include one or more recesses in the interior surfaces of the side walls or floor. The recesses can serve to hold the items being shipped, or to hold a coolant 260, e.g., ice, dry ice or a gel pack, or to provide increased structural support for the body 110. In some situations, the recesses are simply the result of spaces between the projections that are present for other purposes.

Where the body includes a shell, the protrusions on one side of the shell correspond to the recesses on the other side of the shell. For example, projections from the inner surface that extend inwardly into the interior space 112 correspond to complementary recesses on the outer surface. Similarly, projections from the outer surface that extend outwardly correspond to complementary recesses on the inner surface.

FIGS. 1F to 1H are perspective views of implementations of a thermally insulating packaging and show example shapes of the projections 181.

In FIG. 1F, the projections 181 are parallel rectilinear stripes. The projections 181 extend vertically on the inner surface of the side walls 169. The projections 181 extend horizontally on the inner surface of the floor 140. The spaces between the projections 181 provide grooves for air flow to improve uniformity of flow of cold air across the item held in the interior space 112.

FIG. 1G illustrates a lid to fit on the top of the tub of FIG. 1F. Again, the spaces between the projections 181 provide grooves for air flow to improve uniformity of flow of cold air across the item held in the interior space 112. In FIG. 1G, the projections 181 can have the same dimensions and spacing as the projections 181 in FIG. 1F. This permits the grooves in the "tub" of FIG. 1F to line up with the grooves in the lid of FIG. 1G.

In FIG. 1H, the projections 181 combine to define a circular recessed area, e.g., to receive a bottle. For example, individual projections can have concave vertical surfaces; the provision of multiple such projections with the concave surfaces spaced around a central axis can thus define the circular recessed area.

The stippling shown in the bottom views of FIGS. 1F and 1H indicates that the cavity 180 between the walls 160, 170 and below the floor 140 can be filled with the core material, e.g., a loose-fill compostable or recyclable material. Similarly, the stippling shown in the bottom views of FIG. 1G indicates that a cavity between the walls 160, 170 and below the floor 140 that form the cover can be filled with the core material, e.g., a loose-fill compostable or recyclable material.

The structures of the projections 181 of the body 110 are described in greater detail with reference to FIGS. 2A-4B.

In some implementations, the body 110 includes one or more pads 150 on an outer surface of the floor 140. The pads 150 can support the floor 140 of the body 110 above the lower cover 120 (if present), thus providing a gap between the lower cover 120 and the floor 140. The gap can be filled with a thermally insulating material, e.g., as discussed below. The pads 150 can absorb shock when the thermally insulating packaging 100 is placed on ground or stacked on top of other shipping packages.

The pads 150 can be continuously jointed to the outer surface of the floor 140 and be formed of the same material with the body 110. The pads 150 can have any suitable shapes to absorb shock. For example, the pads 150 can have a cross shape as illustrated in FIG. 1A, a circular shape, or a rectangular shape. The pads 150 can have a thickness, e.g., 0.5 to 4 inches. The bottom of the pads 150 can be coplanar with the bottom of the outer side walls 160.

FIG. 1E is a bottom view of a floor a fourth implementation of a thermally insulating packaging. The thermally insulating packaging 100 includes the pads 150 and outer protrusions 152 on the outer surface of the floor 140. The pads 150 and the outer protrusions 152 are continuously joined to the outer surface of the floor 140 and are primarily formed of the same material with the body 110.

The pads 150 and the outer protrusions 152 can be arranged various ways. For example, the pads 150 and the outer protrusions 152 can be alternately arranged. In addition, two adjacent pads 150 and two adjacent outer protrusions 152 can be diagonally arranged. Adjacent pads 150 and protrusions 152 can be connected by struts 156, which are additional protrusions that are shorter than the pads 150 and protrusions 152. These struts 156 provide improved structural support for the packaging 100. In some implementations, the struts 156 can have the same height with the pads 150 or the protrusions 152.

The pads 150 can have any suitable shapes to absorb shock as described above. The outer protrusions 152 can also have any suitable shapes based on a shape of the projections. For example, where the projections are designed to hold bottles, as illustrated in FIG. 1E, the recesses on the inner side of the body that are complementary to the outer protrusions 152 can have a circular shape to bottles.

In some implementations, the pads 150 can be separately formed and be attached to the body 110. In these implementations, the pads 150 can be formed of a different material from the material used for the body 110. For example, the pads 150 can be formed of a material that provides more cushion to the body 110 than the material used for the body 110.

In some implementations, the bottom of the thermally insulating packaging 100 is closed off by a lower cover 120 to cover the gap 180 or material in the gap 180.

Referring to FIGS. 1A and 1B, the thermally insulating packaging 100 can include a separate cover 120 that is primarily formed of a compostable or recyclable material(s). The cover 120 can enclose the inner surface of the floor 140 and the space 180 of the body 110. In some implementations, the cover 120 can be snuggly fit to bottom rims 155 of the outer side walls 160. In some other implementations, the cover 120 can include grooves or protrusions on edges of the cover 120 to be coupled with the body 110. Example methods of coupling the cover 120 to the body 110 are described in greater detail with reference to FIGS. 5A to 5D.

FIG. 1C is a cross-sectional view of a second implementation of the thermally insulating packaging. In this example, the thermally insulating packaging 100 does not include a separate cover 120. Portions 162 of the outer side walls 160 are hinged at a joint 164 of the outer side walls 160. The portions 162 provide flaps to cover the inner surfaces of the floor and the space 180 of the body 110. Although FIG. 1C illustrates two flaps, there could be just one flap.

In some implementations, the outer and/or inner surfaces of the outer walls 160, the inner walls 170, and the floor 140 can be optionally covered by a moisture barrier layer 130 and/or 132. Details of the layers 130, 132 are described in greater detail below.

Figure 1J:
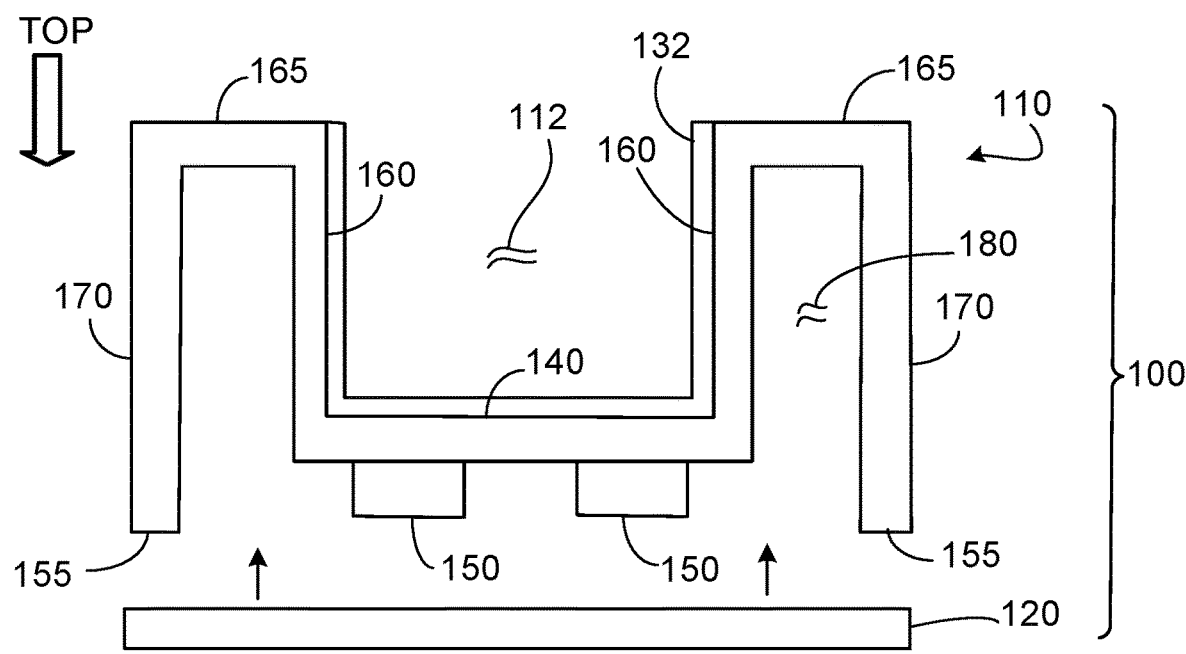
Figure 1K:
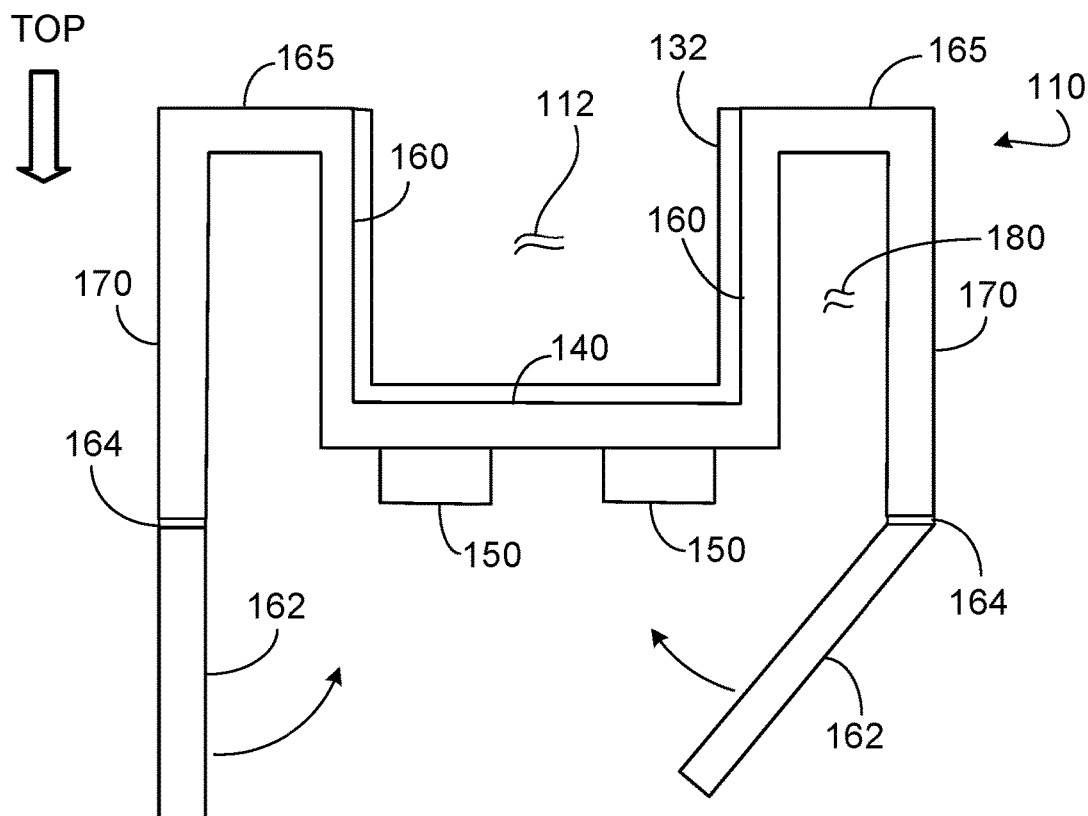

In some implementations, referring to FIGS. 1J and 1K, the surfaces of the floor 140 and the side walls, e.g., inner walls 170, that are closer to the interior space 112 are covered by a moisture barrier layer 132. The moisture barrier layer can be formed of the same material and have the thickness with the moisture barrier layer 130 discussed below. The moisture barrier layer 132 can extend over just the inner surface of the floor 140 and inner walls 170, or also extend over the rim and/or outer walls 160, as shown in FIGS. 1L and 1M.

In some implementations, referring to FIGS. 1B and 1C, e.g., where the body provide as shell with a gap between inner walls 170 and outer walls 160, the surfaces of the walls 160, 170 that are closer to the gap 180 are covered by a moisture barrier layer 130.

Figure 1L:
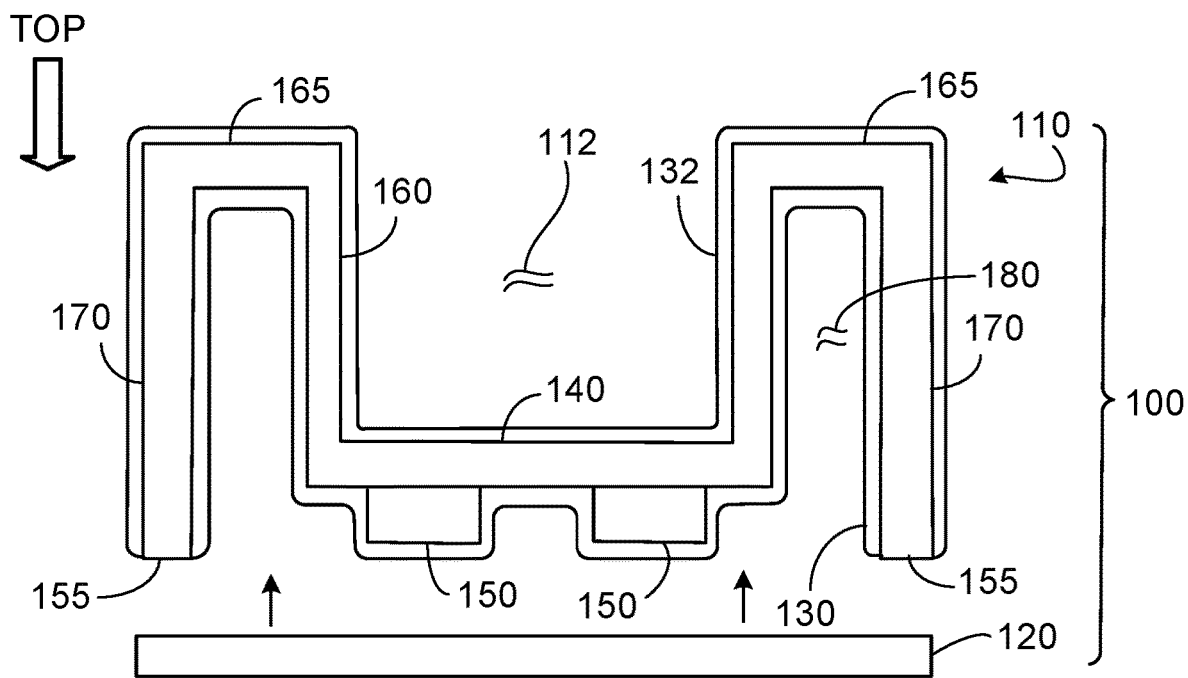
Figure 1M:
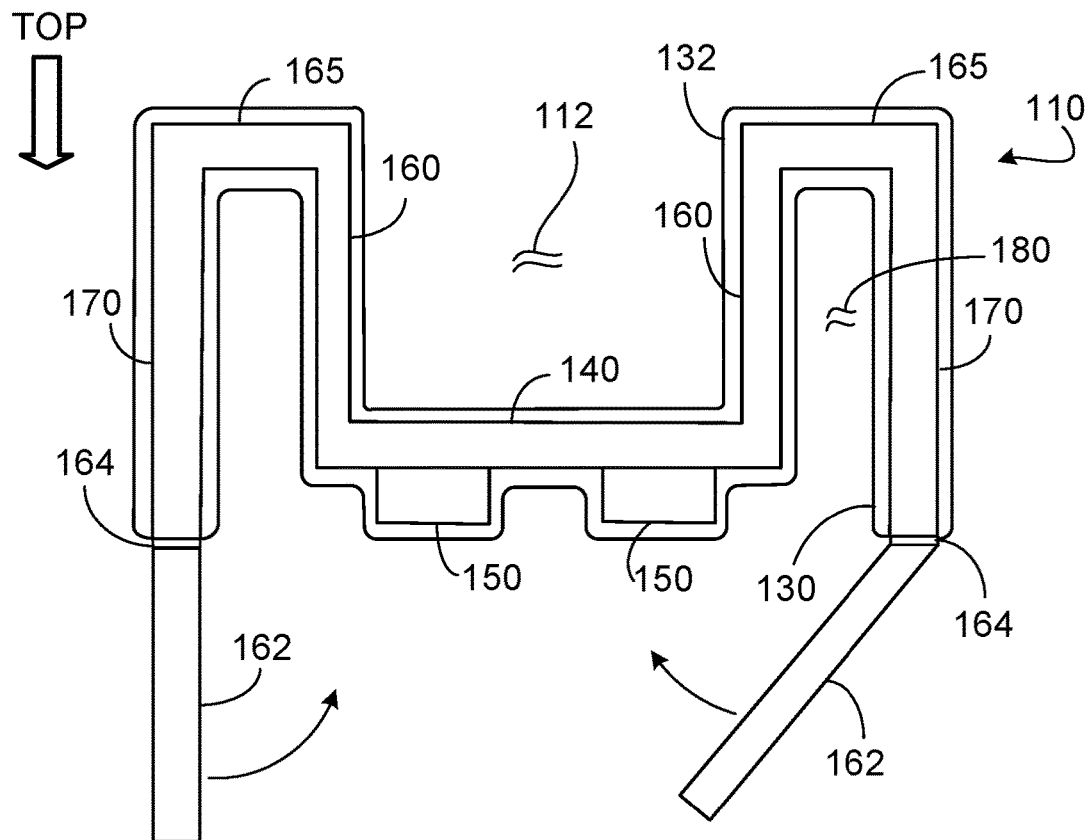
Figure 1N:
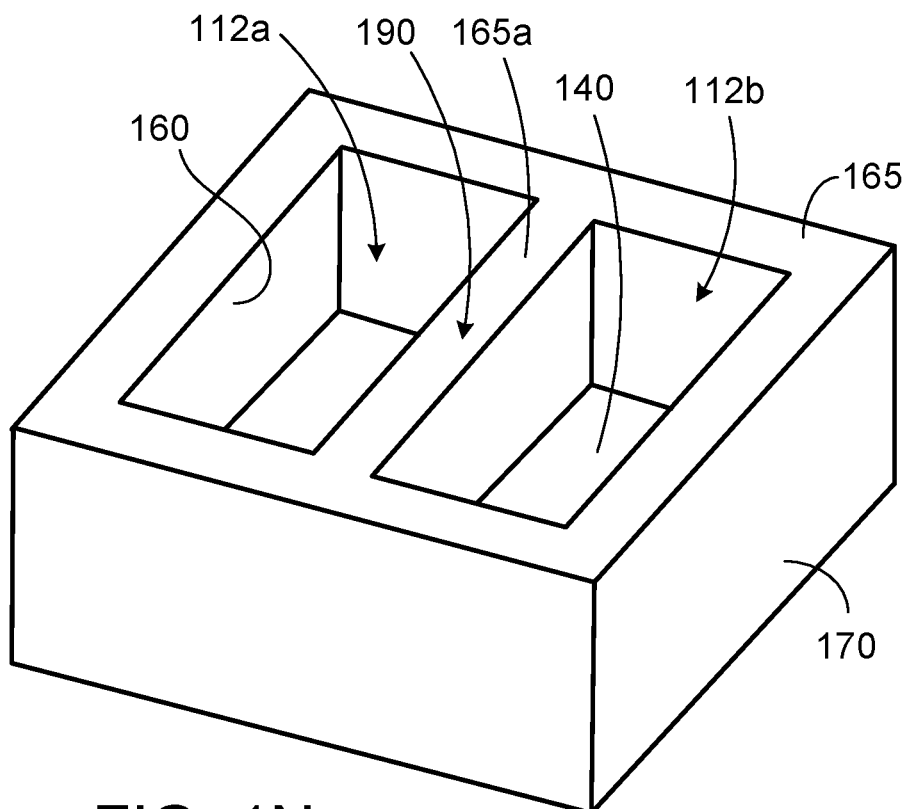
Figure 1O:
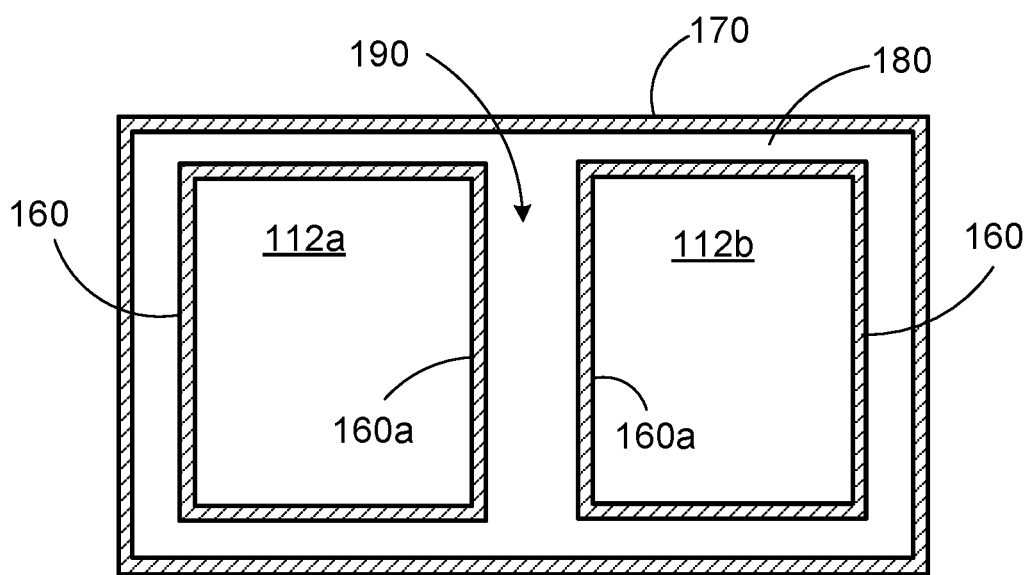

In some implementations, referring to FIGS. 1L and 1M, both the surfaces adjacent the interior space 112 and the surfaces closer to the gap 180 are covered by the moisture barrier layers 130, 132.

As illustrated in FIG. 1A, when the cover 120 is coupled to the body 110, the bottom of the body 110 is covered by the cover 120 and the top of the body 110 includes an opening to the interior space 112.

In some implementations, the interior space 112 can be covered by a lid. The lid can be primarily formed of a compostable or recyclable material(s). In some other implementations, the interior space 112 can be covered by another thermally insulating article, so that together the two articles for the thermally insulating packaging. Examples of covering the interior space by a thermally insulating article are described with reference to FIGS. 2A to 4B.

As noted above, in some implementations, the thermally insulating packaging 100 includes one or more protrusions that extend from one or more of the inner sidewall(s) 170 and/or the floor 140 into the interior space 112. For example, the protrusion can include a wall or strut that sections the interior space 112 into separate subspaces; this may be useful for restraining items to be shipped or for increasing structural strength of the body. As another example, the protrusion can be a bump or dimple; this may be useful for restraining or cushioning items in the interior space 112.

Inner Structure of Thermally Insulating Packaging I

Figure 2A:
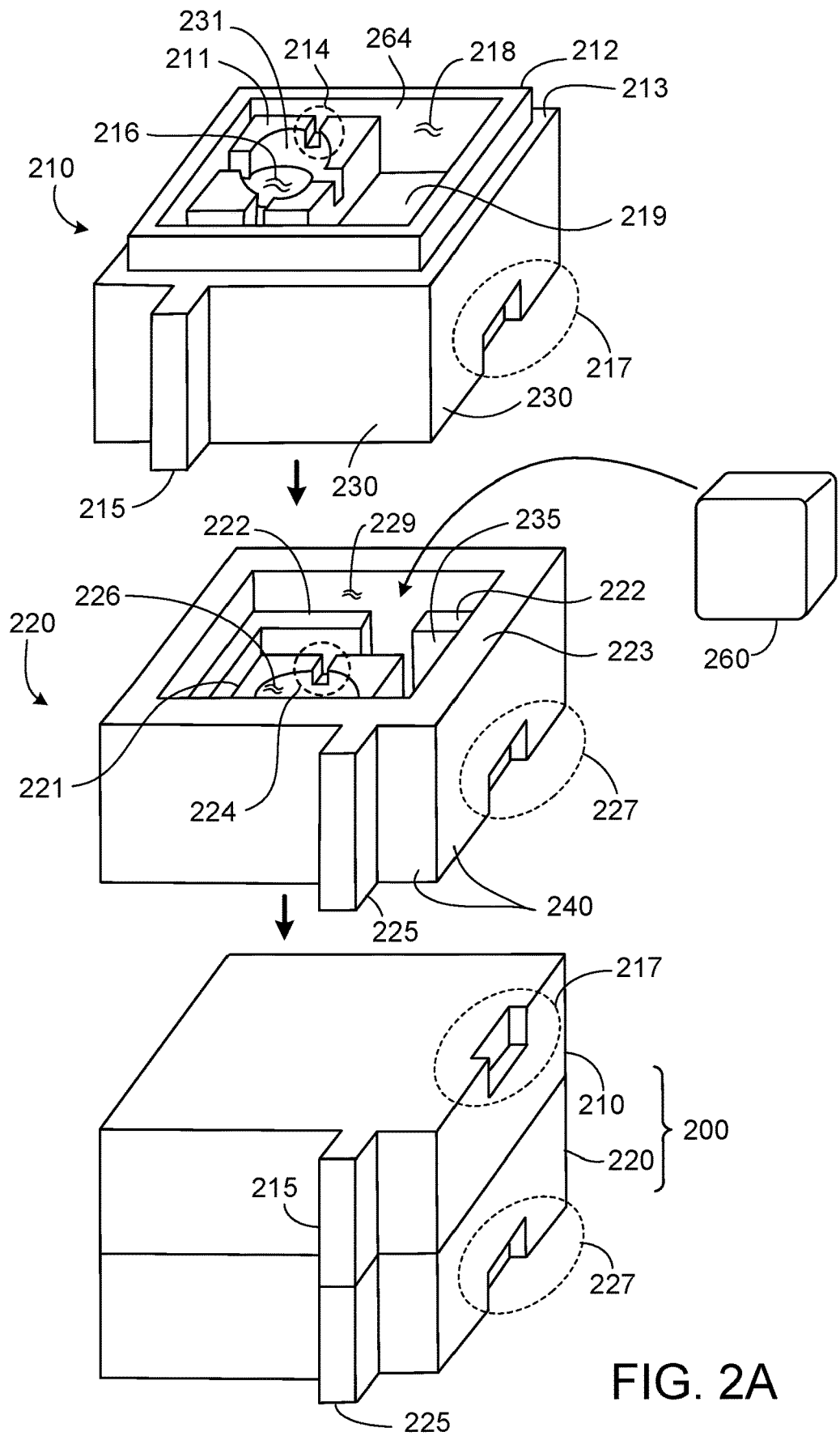
FIG. 2A is a perspective view of a first implementation of a pair of thermally insulating articles that form a shipping package.
Figure 2B:
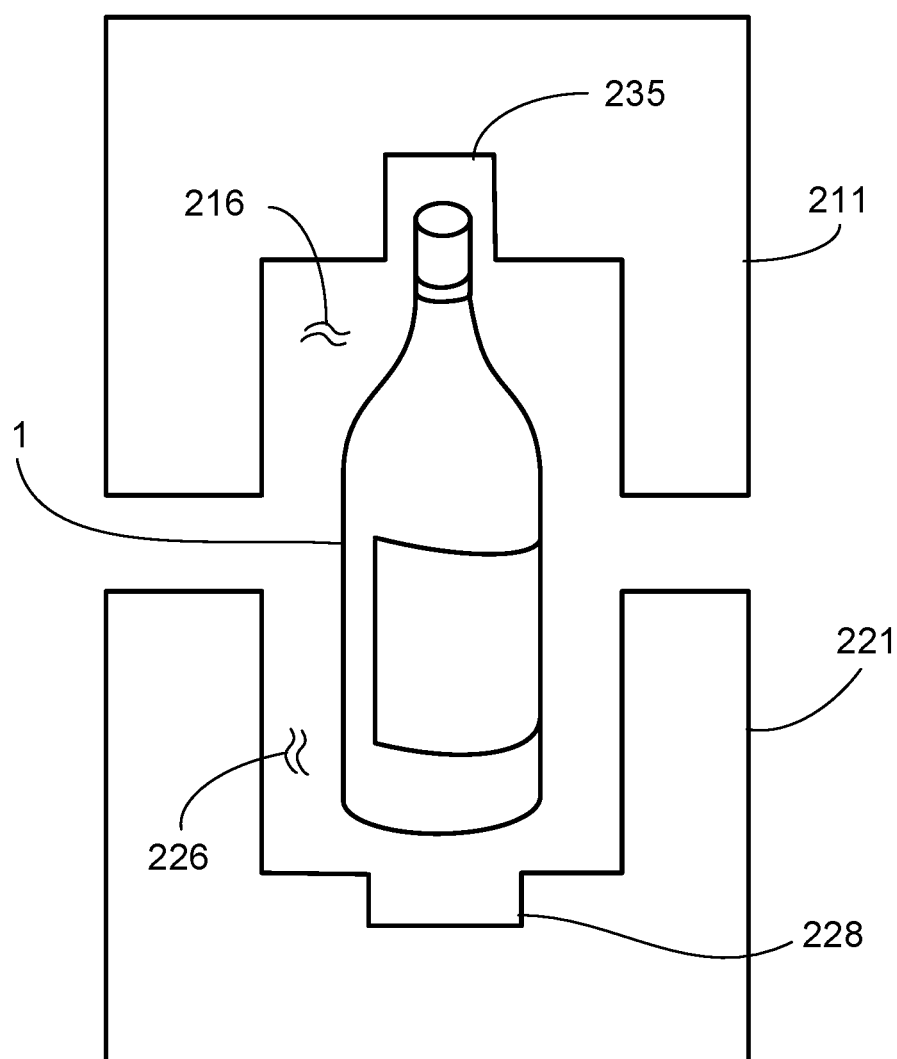
FIG. 2B is a cross-sectional view of the pair of thermally insulating articles of FIG. 2A.

FIG. 2A is a perspective view of a first implementation of thermally insulating packaging. FIG. 2B is a cross-sectional view of a first implementation of thermally insulating packaging. The thermally insulating packaging 210, 220 can be the example thermally insulating packaging 100 described with reference to FIG. 1.

The first thermally insulating packaging 210 includes a first floor 219, first inner side walls, and first outer side walls 230. Details regarding the first floor 219, the inner side walls, and the first outer side walls 230 of the thermally insulating packaging 210 of FIG. 2A, e.g., overall structures, dimensions, and possible material compositions for the compostable materials, can be the same as the thermally insulating packaging 100 described with reference to FIG. 1.

The thermally insulating packaging 210 further includes the first projection 211. In FIG. 2A, the thermally insulating packaging 210 is illustrated as including one first projection 211. However, in some implementations, the thermally insulating packaging 210 can include multiple first projections on an inner surface of the first floor 219. The first projection 211 includes side walls 231 to hold the item. For example, the side walls 231 can be curved to effectively hold an item that has a curved surface, e.g., a bottle. The side walls 231 and a floor of the first projection 211 define an interior space 216 of the first projection 211. The item is accommodated in the interior space 216.

Referring to FIG. 2B, some portions of the item 1 are accommodated in the interior space 216 of the first projection 211 and other portions of the item 1 are accommodated in the interior space 226 of the second projection 212. In particular, the first projection 211 holds a first portion of the item 1. In some implementations, the first projection 211 can include a groove 235 on the floor of the first projection. In particular, where the item 1 has a narrow portion, e.g., a bottle neck, the groove 235 can help the narrow portion of the item fit snugly in the interior space 216 of the first projection 211. In some implementations, the first projection 211 and the second projection 221 can be symmetric. In some implementations, the first projection 211 and the second projection 221 are not symmetric. For example, the interior space 216 can have a shape different from that of the interior space 226 and/or the groove 235 can have a shape different from that of the groove 228.

Referring back to FIG. 2A, the first projection 211 is located in the first interior space 218 defined by the floor 219 and the side walls 230. In some implementations, the first projection 211 is continuously joined to the floor 219 and the inner surfaces 264 of the side walls 230 and is primarily formed of the same material with the thermally insulating packaging 210.

In some implementations, the first projection 211 can include one or more grooves 214 on the curved side walls of the first projection 211. The grooves 214 helps cold air cooled by a coolant 260 efficiently spread out in the interior space 218. In particular, the grooves 214 can increase the surface area of the item contacting cold air so that materials inside the item, e.g., a liquid, such as milk, fruit juice, or wine, in a bottle, or the item itself, e.g., packed meat or fish, can maintain freshness.

In some implementations, the first thermally insulating packaging 210 can include a protrusion 215 on the outer surface of the outer side wall 230. The protrusion 215 can have the same or a smaller height than the height of the outer side wall 230. The protrusion 215 can have box-like shape, e.g., a generally rectilinear prism. In some implementations, the edges of the protrusion 215 can be rounded, while remaining a generally rectilinear prism. The protrusion 215 can protect the first thermally insulating packaging 210 from being hit by other boxes in lateral directions. For example, when the first thermally insulating packaging 210 is placed with other boxes laterally, the protrusion 215 can keep a gap between the first thermally insulating packaging 210 and other boxes such that other boxes cannot directly hit the side walls 230 of the first thermally insulating packaging 210.

In some implementations, the first thermally insulating packaging 210 can include a groove 217 on the outer surface of the outer side wall 230 that is shaped for a hand grip. The groove 217 can be located on one of the bottom edges of the side walls 230. A user can insert his or her hand into the groove 217 to carry the first thermally insulating packaging 210 easily.

The second thermally insulating packaging 220 includes a second floor, second inner side walls, second outer side walls 240, and a second projection 222. The second thermally insulating packaging 220 can further include a protrusion 225 and a groove 227 for a hand grip. Details regarding the second floor, the second inner side walls, the second outer side walls 240, the second projection 222, the protrusion 225, and the groove 227 of the second thermally insulating packaging 220, e.g., overall structures, dimensions, and possible material compositions for the compostable materials, can be the same as the first thermally insulating packaging 210.

The second thermally insulating packaging 220 further includes side walls 235 on inner surfaces of the outer side walls 230. The side walls 235 have the height that is smaller than the height of the outer side walls 230. Thus, the second thermally insulating packaging 220 includes two rim portions 222, 223 in a different level. On the other hand, the first thermally insulating packaging 210 further includes protrusions 212 on the rims 213 of the side walls 230.

In FIG. 2A, if the first thermally insulating packaging 210 is turned over and is placed on top of the second thermally insulating packaging 220, the rims 213 of the first thermally insulating packaging 210 are coupled to the rims 223 of the second thermally insulating packaging 220 and the protrusions 212 of the first thermally insulating packaging 210 are coupled to the rims 222 of the second thermally insulating packaging 220. As a result, the first thermally insulating packaging 210 can be coupled to the second thermally insulating packaging 220. The coupled packagings 210, 220 can be shipped as a single shipping package 200. In this example, the protrusion 215 of the first thermally insulating packaging 210 can align with the protrusion 225 of the second thermally insulating packaging 220.

In some implementations, the first thermally insulating packaging 210, the second thermally insulating packaging 220, or both of them can include a groove or slot 229 to accommodate a coolant 260. For example, in FIG. 2A, a portion of the side walls 235 has the groove or slot 229 to accommodate the coolant 260. The second thermally insulating packaging 220 can spread cold air cooled by the coolant 260 so that materials being shipped can maintain freshness. Optionally, the groove or slot 229 can have a holding mechanism to hold the coolant 260 so that the coolant 260 can be fixed while the first thermally insulating packaging 210 is shipped.

In some implementations, as described above, the first thermally insulating packaging 210 can include multiple first projections 211. In these implementations, the first thermally insulating packaging 210 can include one or more grooves or slots between the adjacent first projections 211 to accommodate the coolant 260.

In some implementations, the first projection 211 can be separately formed and be attached to the floor 219 and the inner surfaces 264 of the side walls 230. In these implementations, the first projection 211 can be formed of a different material from the material used for the thermally insulating packaging 210. For example, the first projection 211 can be formed of a material that provides more cushion to the item than the material used for the body 110.

Figure 2C:
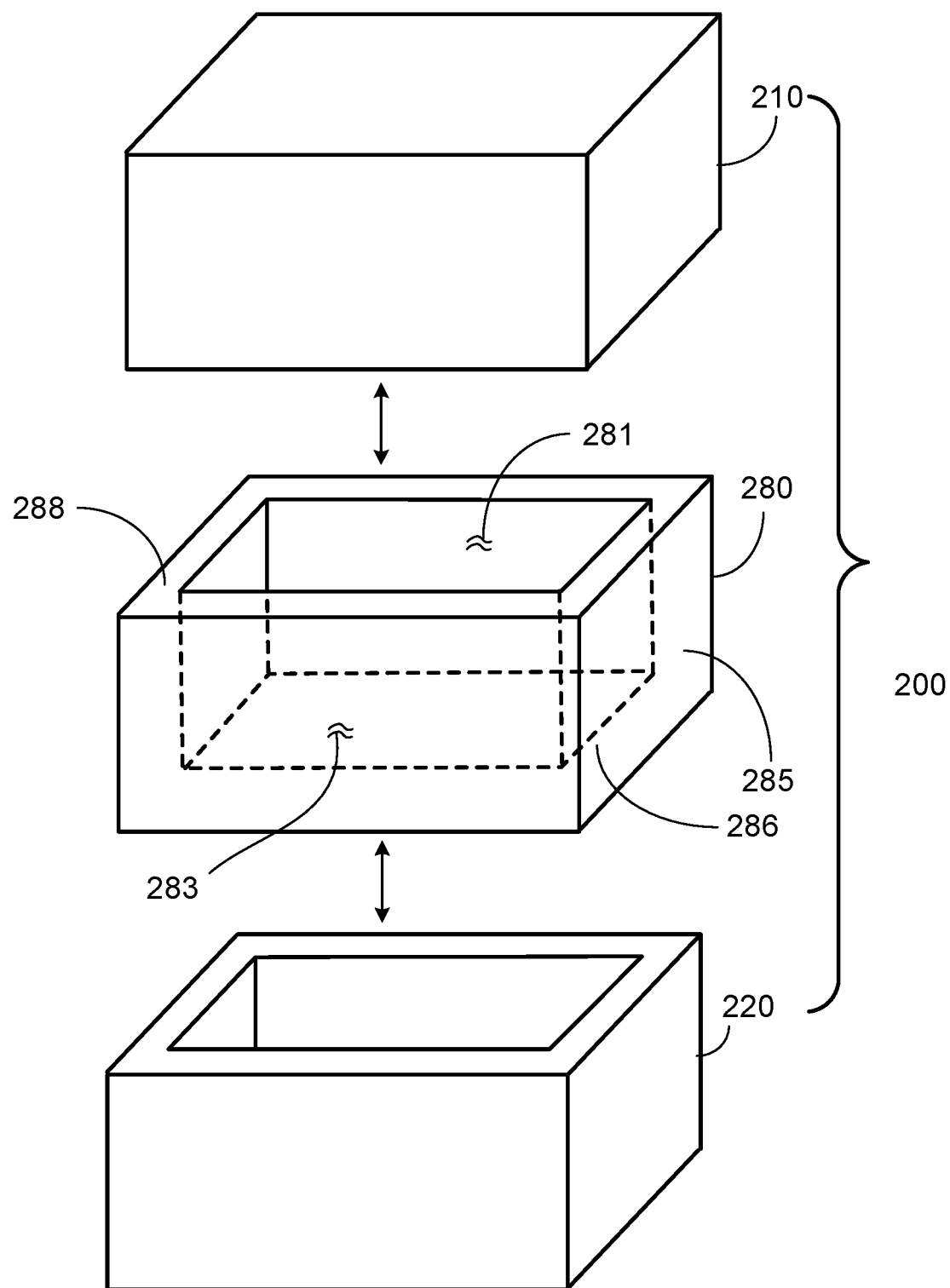
FIG. 2C is a perspective view of a second implementation of a set of thermally insulating articles that form a shipping package.

FIG. 2C is a perspective view of a second implementation of a set of thermally insulating packagings that form a thermally insulating shipping package. The thermally insulating shipping package 200 includes the first thermally insulating packaging 210, the second thermally insulating packaging 220, and one or more thermally insulating extenders 280, e.g., up to ten extenders.

Each extender 280 generally takes the form of an annular body that is open at the top and the bottom. The extender 280 can have a generally rectangular perimeter. Of course, the edges of the body can be rounded, while remaining a generally rectangular. In addition, the extender could have other shapes, e.g., octagonal, cylindrical, etc.

For example, the extender in FIG. 2C includes a first opening 281, a second opening 282, side walls defining the first opening and the second opening, and first rims 288, and second rims 286. The first rims 288 are coupled to the rims 213 of the first thermally insulating packaging 210 and the second rims 286 are coupled to the rims 223 of the second thermally insulating packaging 220. As a result, the first thermally insulating packaging 210, the extender 280, and the second thermally insulating packaging 220 can form the single shipping package 200. Coupling mechanisms between the extender 280 and the thermally insulating packagings 210, 220 are described in greater detail with reference to FIG. 5A to 5D.

Figure 2D:
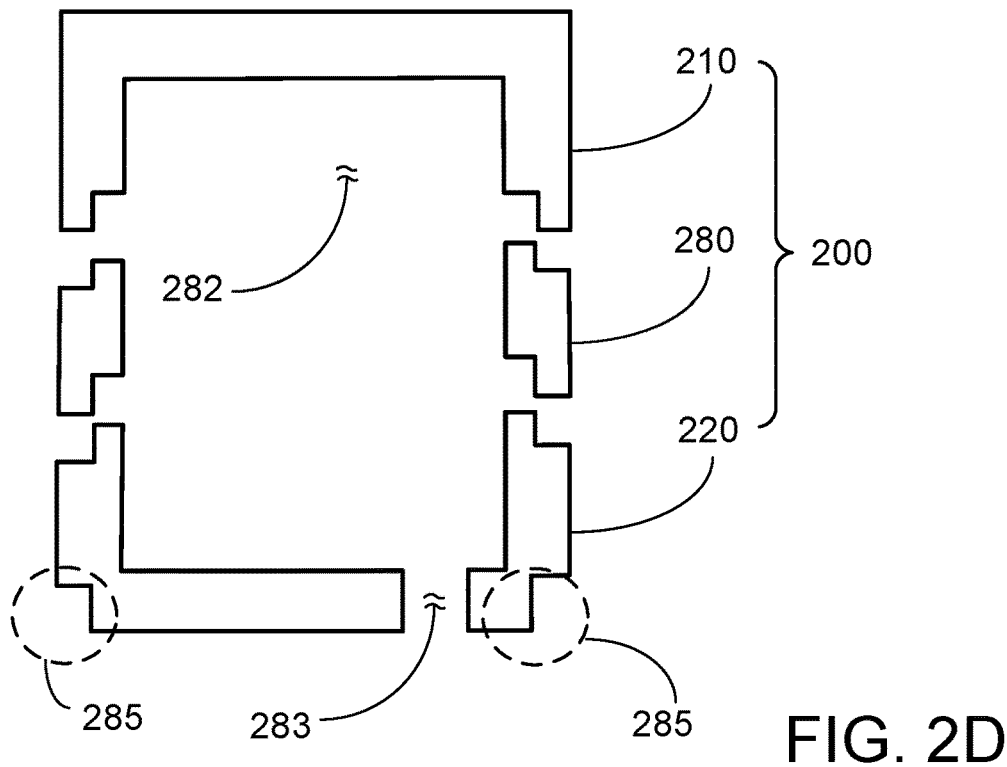
FIG. 2D is a cross-sectional view of a first implementation of the set of thermally insulating articles of FIG. 2C.

FIG. 2D is a cross-sectional view of the set of articles of FIG. 2C. The extender 280 couples two thermally insulating packagings 210, 220 such that the interior space 282 can be extended. In some implementations, multiple extenders can be coupled between the first thermally insulating packaging 210 and the second thermally insulating packaging 220. Thus, the interior space 282 of the shipping package 200 can be extended as much as a user wants.

Figure 2E:
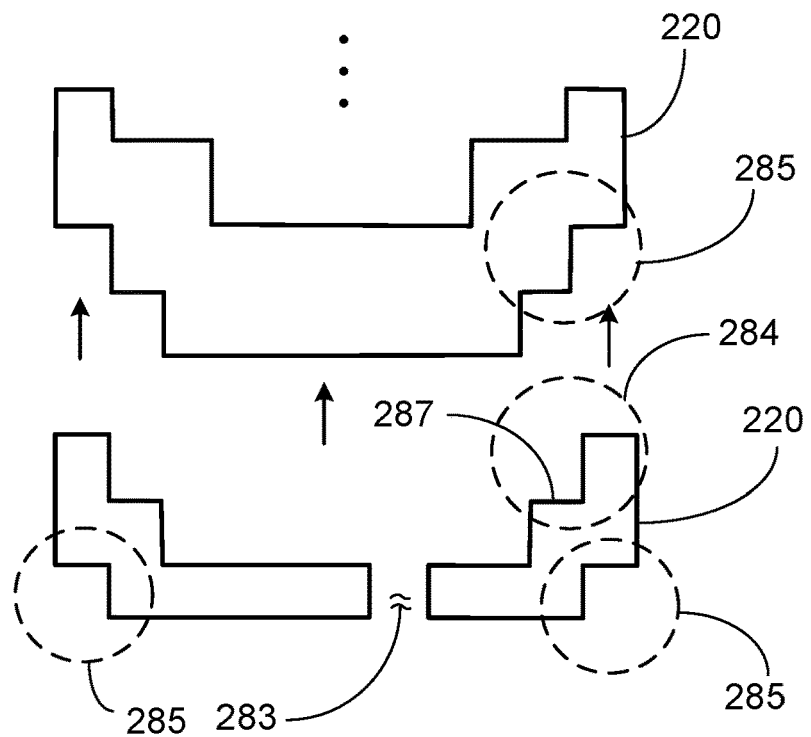
FIG. 2E is a cross-sectional view of a second implementation of the set of thermally insulating articles of FIG. 2C.

Optionally, as shown in FIG. 2E, one of the pieces of the thermally insulating packaging 200, e.g., the lower section 220, can include one or more recesses 285, in which projections 284 on the top surface of the rim 287 of the lower section 220 will fit. This permits the lower section 220 to act as a stackable tray, with multiple lower sections stacked vertically. The recesses 285 can be a cut-out on the edges of the packaging 220 or grooves formed on the underside of the packaging 220. Having the projections 284 inserted into the recesses 285 assists in stability of the overall packaging 100, e.g., if packaging 200 is moved then it is less likely that the individual trays will slide or topple. In addition, the thermally insulating packaging 220 can include one or more slots 283 on the floor of the thermally insulating packaging 220 to discharge liquid from the interior area 282 to an exterior area of the thermally insulating packaging 220. For example, condensed liquid in the interior can be discharged through the slots 283.

Inner Structure of Thermally Insulating Packaging II

Figure 3A:
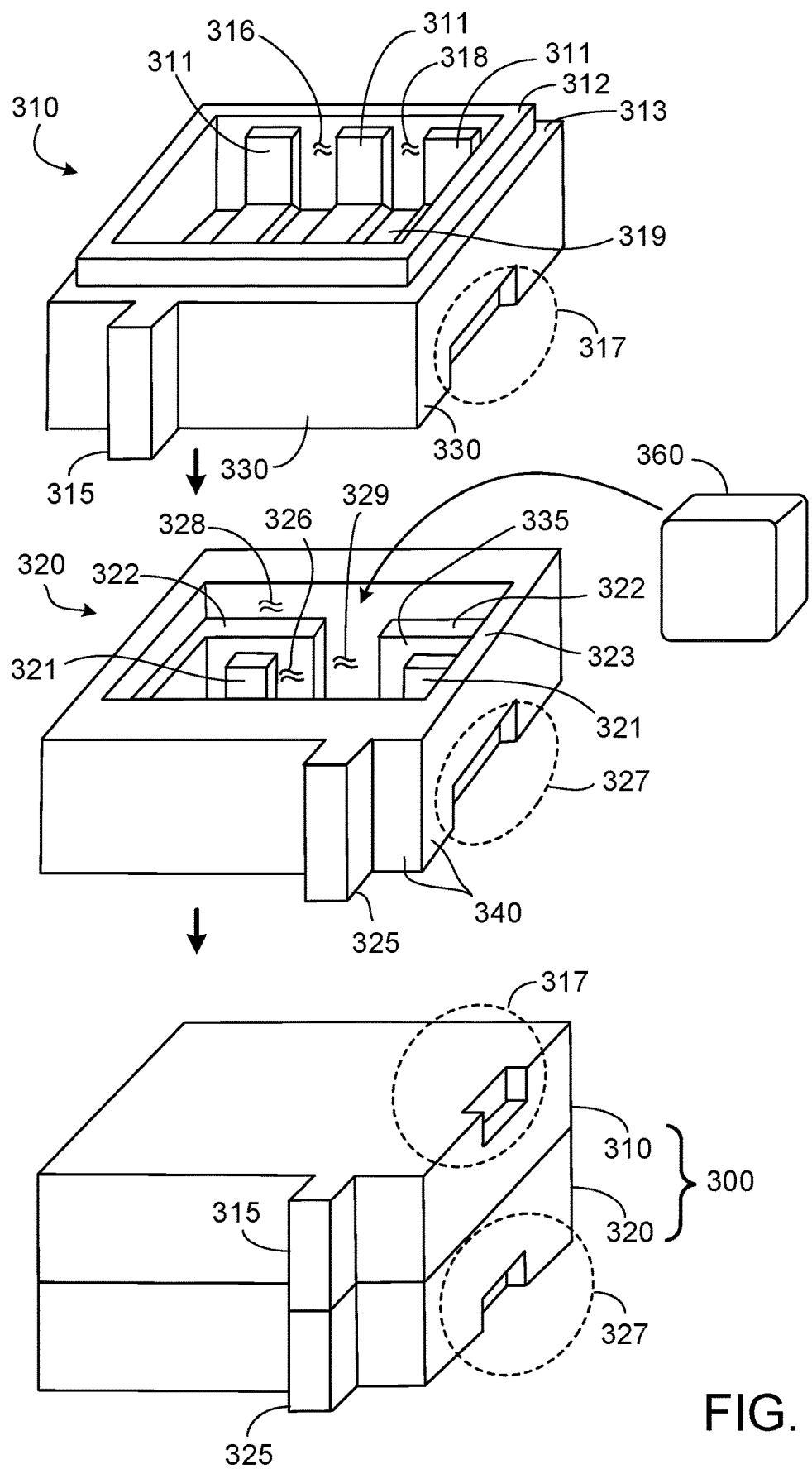
FIG. 3A is a perspective view of a second implementation of a pair of thermally insulating articles that form a shipping package.
Figure 3B:
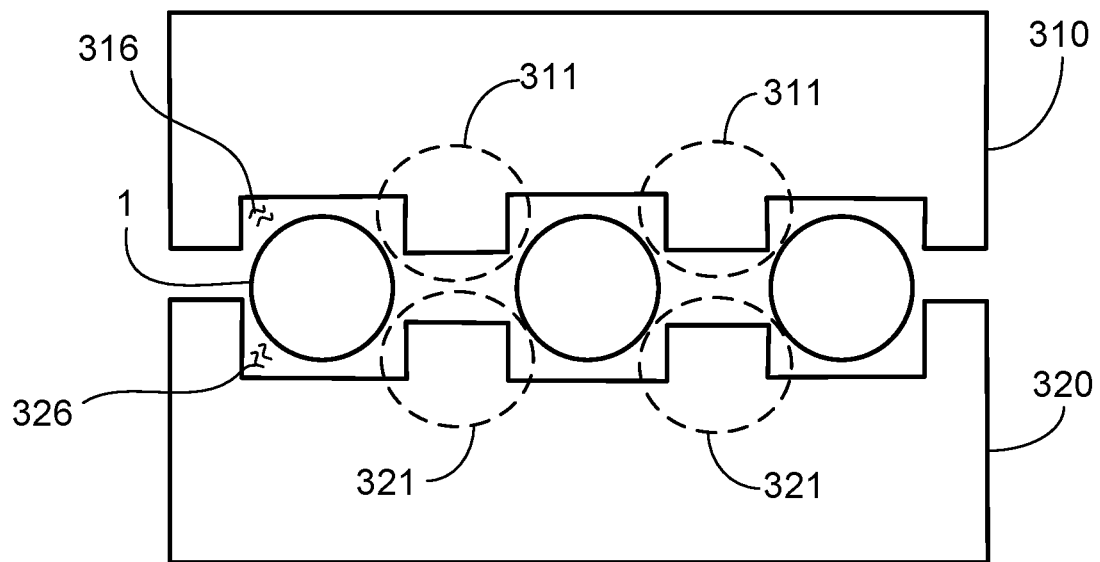
FIGS. 3B and 3C are cross-sectional views of the pair of thermally insulating articles of FIG. 3A.
Figure 3C:
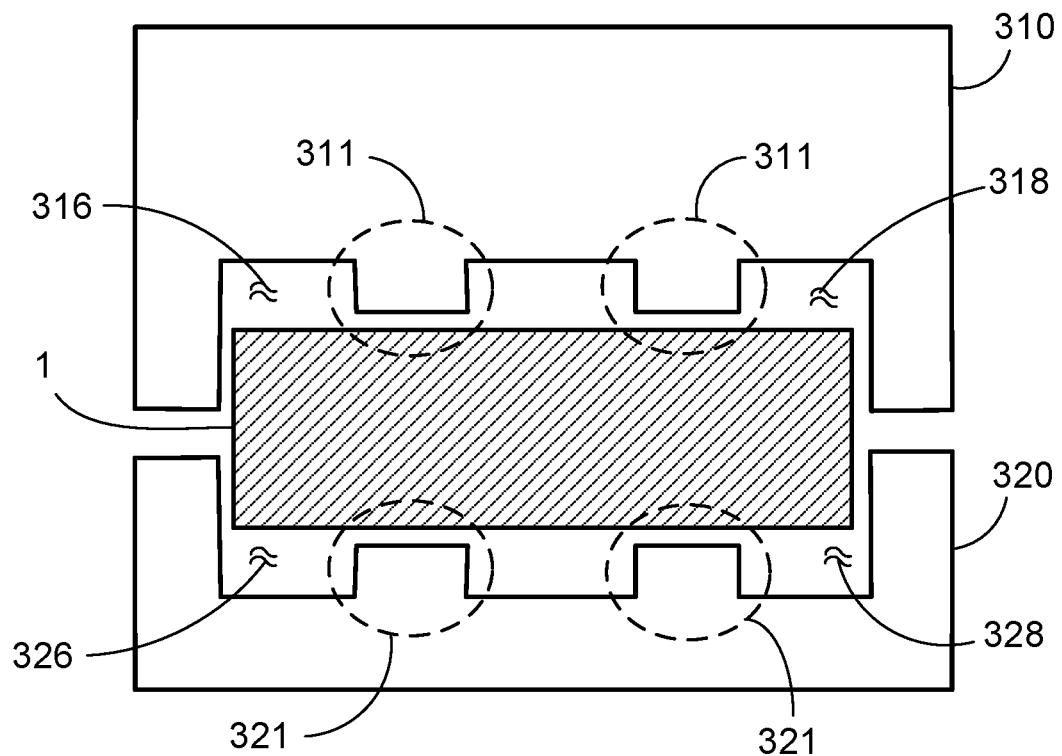

FIG. 3A is a perspective view of a second implementation of thermally insulating packaging. FIG. 3B is a cross-sectional view of a second implementation of thermally insulating packaging. The thermally insulating packaging 310, 320 can be the example thermally insulating packaging 100 described with reference to FIG. 1.

The first thermally insulating packaging 310 includes a first floor 319, first inner side walls, and first outer side walls 330. Details regarding the first floor 319, the inner side walls, and the outer side walls 330 of the thermally insulating packaging 310 of FIG. 3A, e.g., overall structures, dimensions, and possible material compositions for the compostable materials, can be the same as the first thermally insulating packaging 210 described with reference to FIG. 2A.

The thermally insulating packaging 310 further includes the first projections 311. The first projections 311 protrudes from inner surfaces of the outer side walls 330 and/or the floor 319. For example, each of the first projections 311 can have a box-like shape, e.g., a generally rectilinear prism. In some implementations, the edges of the protrusion 315 can be rounded, while remaining a generally rectilinear prism. The first projections 311 can extend in parallel each other to define a groove 316 between two adjacent first projections 311.

In some implementations, the grooves 316 are shallow, and primarily serve to provide for air flow such that cold air can reach all around the item being shipped.

In some implementations, referring to FIG. 3B, the first projections 311 can hold the item 1 in the groove 316. A portion of the item 1, e.g., a bottle, can be accommodated in the groove 316. In some implementations, referring to FIG. 3C, the first projections 311 hold the item 1 in the interior space 318. The interior space 318 is a space defined by the floor 319 and the outer side walls 330 of the first thermally insulating packaging 310. A portion of the item, e.g., a meat package, can be accommodated in the interior space 318. In these implementations, the groove 316 helps cold air cooled by a coolant 360 efficiently spread out in the interior space 318. In particular, the groove 316 can maximize surface of the item contacting cold air so that materials, e.g., juice or wine, inside the item, e.g., a bottle, or the item itself, e.g., packed meats or fishes, can maintain freshness.

Figure 3D:
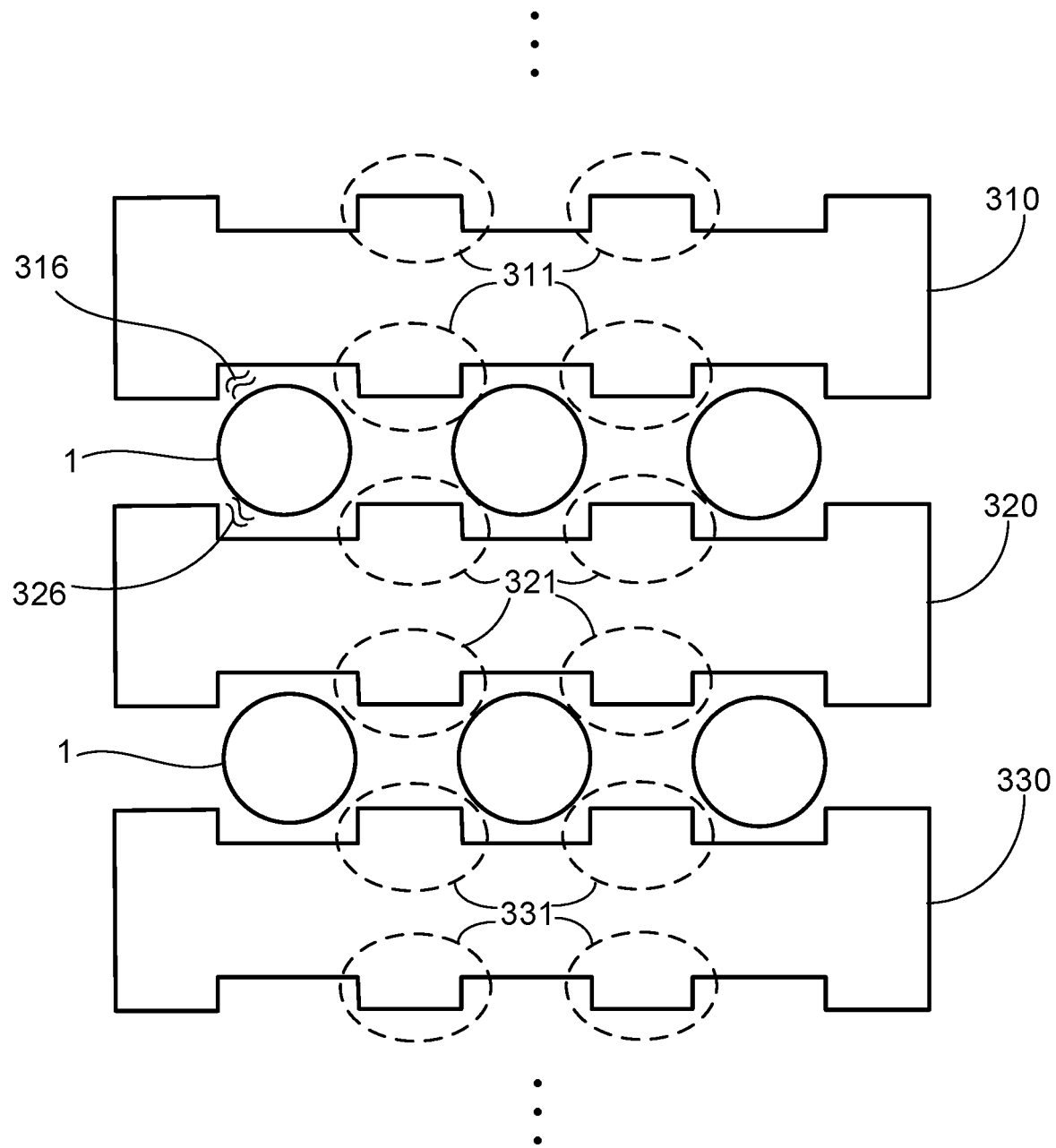
FIG. 3D is a cross-sectional view of a third implementation of a pair of thermally insulating articles.

In some implementations, referring to FIG. 3D, the thermally insulating packagings 310, 320, 330 include the projections 311, 321, 331 on both the top surface and the bottom surface of the thermally insulating packagings 310, 320, 330. When each of the thermally insulating packagings 310, 320, 330 are stacked, multiple items 1 can be stored in the spaces 316, 326 between the adjacent packagings. It can increase the storing capacity.

Referring back to FIG. 3A, in some implementations, the first projections 311 can be part of the thermally insulating packaging 310 and be primarily formed of the same material with the thermally insulating packaging 310. In some other implementations, the first projections 311 can be separately formed and be attached to the thermally insulating packaging 310. In these implementations, the first projections 311 can be formed of a different material from the material used for the thermally insulating packaging 310. For example, the first projections 311 can be formed of a material that provides more cushion to the item than the material used for the second thermally insulating packaging 310.

Like the first thermally insulating packaging 210 described with reference to FIG. 2A, the first thermally insulating packaging 310 can include a protrusion 315 and a groove 317. Details regarding the protrusion 315 and the groove 317 of the thermally insulating packaging 310 of FIG. 3A, e.g., overall structures, dimensions, and possible material compositions for the compostable materials, can be the same as the first thermally insulating packaging 210 described with reference to FIG. 2A.

Furthermore, details regarding the second thermally insulating packaging 320 and a single shipping package 300, e.g., overall structures, dimensions, and possible material compositions for the compostable materials, can be the same as the second thermally insulating packaging 210 and the single shipping package 200 described with reference to FIG. 2A.

Inner Structure of Thermally Insulating Packaging III

Figure 4A:
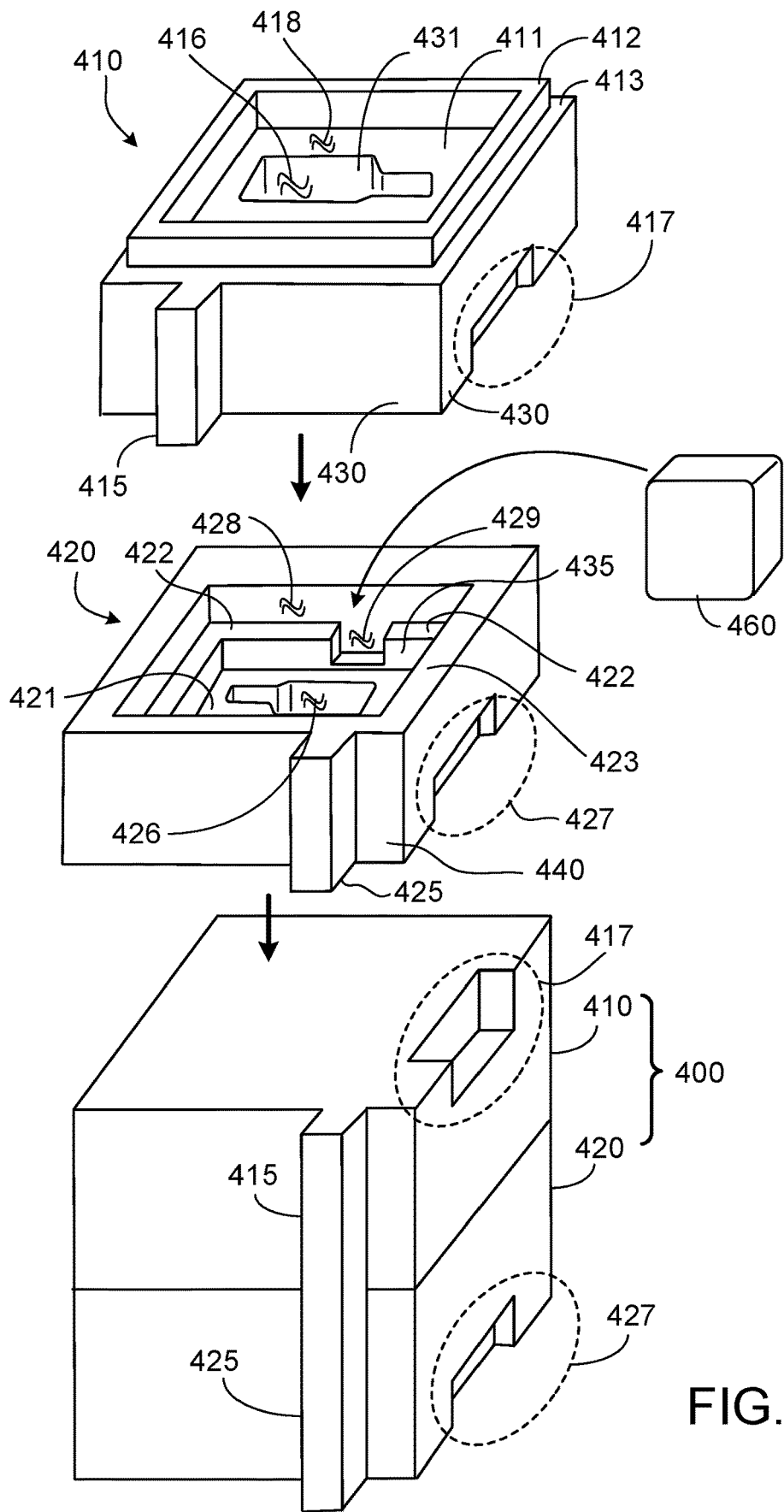
FIG. 4A is a perspective view of a fourth implementation of a pair of thermally insulating articles that form a shipping package.
Figure 4B:
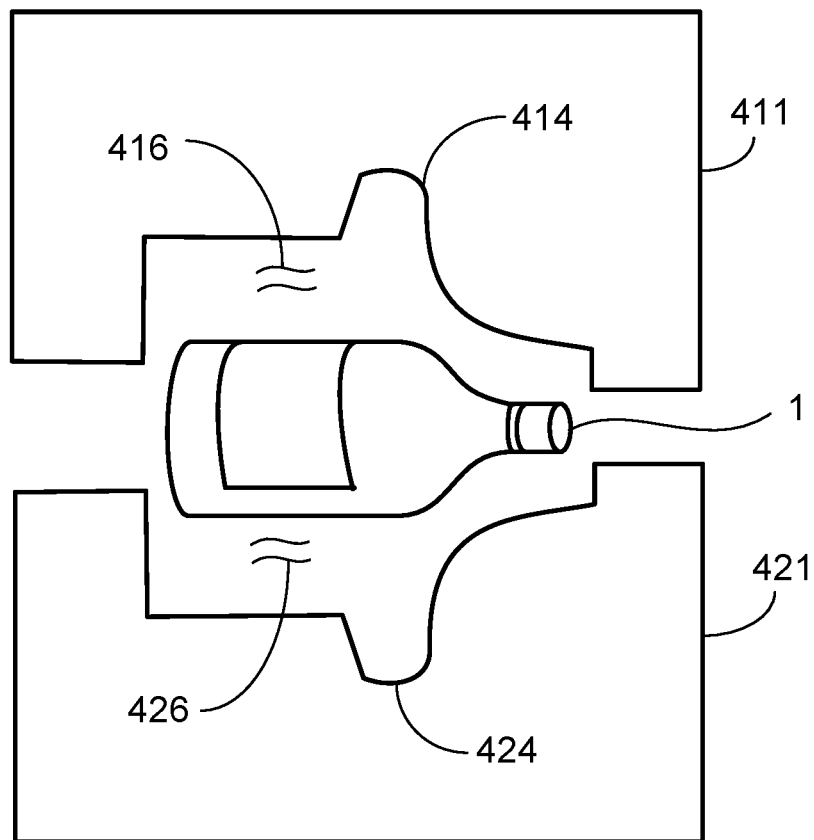
FIG. 4B is a cross-sectional view of the pair of thermally insulating articles of FIG. 4A.

FIG. 4A is a perspective view of a third implementation of thermally insulating packaging. FIG. 4B is a cross-sectional view of a third implementation of thermally insulating packaging. The thermally insulating packagings 410, 420 can be the example thermally insulating packaging 100 described with reference to FIG. 1.

The first thermally insulating packaging 410 includes a first floor, first inner side walls, and first outer side walls 430. Details regarding the first floor, the inner side walls, and the outer side walls 430 of the thermally insulating packaging 410 of FIG. 4A, e.g., overall structures, dimensions, and possible material compositions for the compostable materials, can be the same as the first thermally insulating packaging 210 described with reference to FIG. 2A.

The thermally insulating packaging 410 further includes the first projection 411. In FIG. 4A, the thermally insulating packaging 410 is illustrated as including one first projection 411. However, in some implementations, the thermally insulating packaging 410 can include multiple first projections on an inner surface of the first floor. The first projection 411 includes side walls 431 to hold the item. For example, the side walls 431 can be curved to hold the item that has a curved surface efficiently. The side walls 431 and a floor of the first projection 411 define an interior space 416 of the first projection 411. The item is accommodated in the interior space 416. Referring to FIG. 4B, some portions of the item 1 are accommodated in the interior space 416 of the first projection 411 and other portions of the item 1 are accommodated in the interior space 426 of the second projection 412.

In some implementations, the first projection 411 can include one or more grooves 414 on the curved side walls of the first insert 411. The grooves 414 helps cold air cooled by a coolant 460 efficiently spread out in the interior space 418. In particular, the grooves 414 can maximize surface of the item contacting cold air so that materials, e.g., juice or wine, inside the item, e.g., a bottle, or the item itself, e.g., packed meats or fishes, can maintain freshness.

Like the first thermally insulating packaging 210 described with reference to FIG. 2A, the first thermally insulating packaging 410 can include a protrusion 415 and a groove 417. Details regarding the protrusion 415 and the groove 417 of the thermally insulating packaging 410 of FIG. 4A, e.g., overall structures, dimensions, and possible material compositions for the compostable materials, can be the same as the first thermally insulating packaging 210 described with reference to FIG. 2A.

Furthermore, details regarding the second thermally insulating packaging 420 and a single shipping package 400, e.g., overall structures, dimensions, and possible material compositions for the compostable materials, can be the same as the second thermally insulating packaging 210 and the single shipping package 200 described with reference to FIG. 2A.

Cover

Figure 5A:
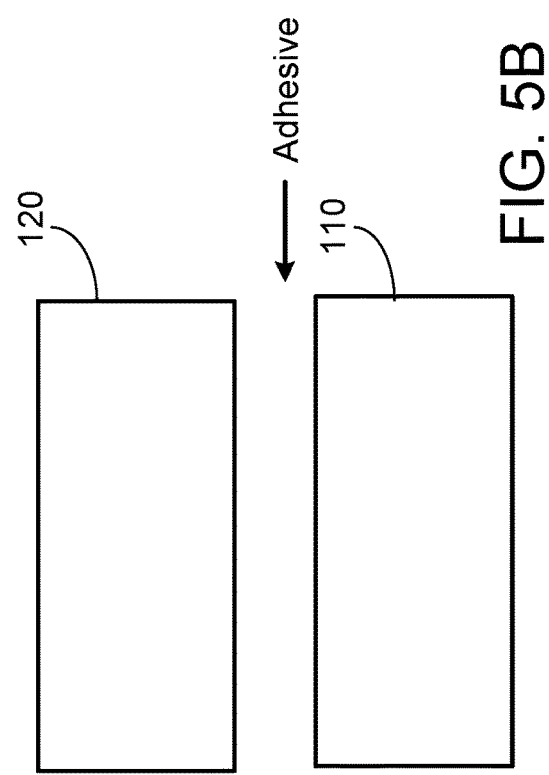
FIGS. 5A to 5D are cross-sectional views of implementations of a cover for thermally insulating packaging.

FIG. 5A is a cross-sectional view of a first implementation of a cover to a thermally insulating packaging. The thermally insulating packaging 100 includes the body 110 and the cover 120. The cover 120 includes grooves 31 on the edges of the cover 120. The body 110 includes protrusions on the rims 155 of the outer side walls 160. The protrusions 32 of the body 110 can be coupled to the grooves 31 of the cover 120 such that the cover 120 can be firmly coupled to the body 110 by the friction between the grooves 31 and the protrusions 32.

Figure 5B:
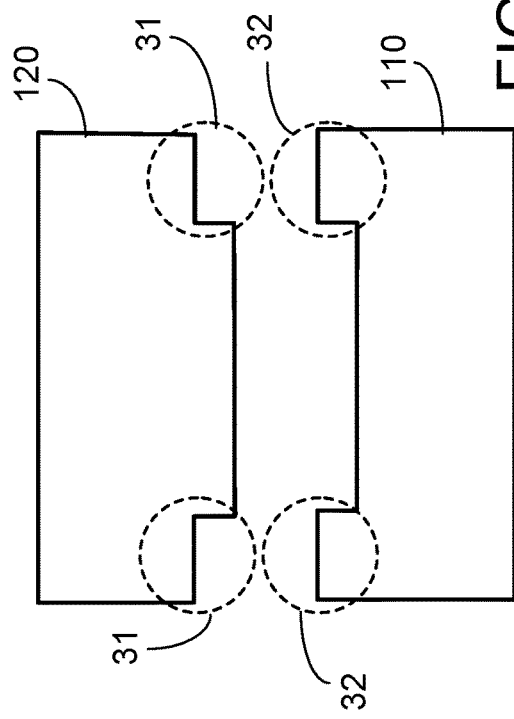

FIG. 5B is a cross-sectional view of a second implementation of a cover to a thermally insulating packaging. The thermally insulating packaging 100 includes the body 110 and the cover 120. The cover 120 can be coupled to the body 110 using an adhesive.

Figure 5C:
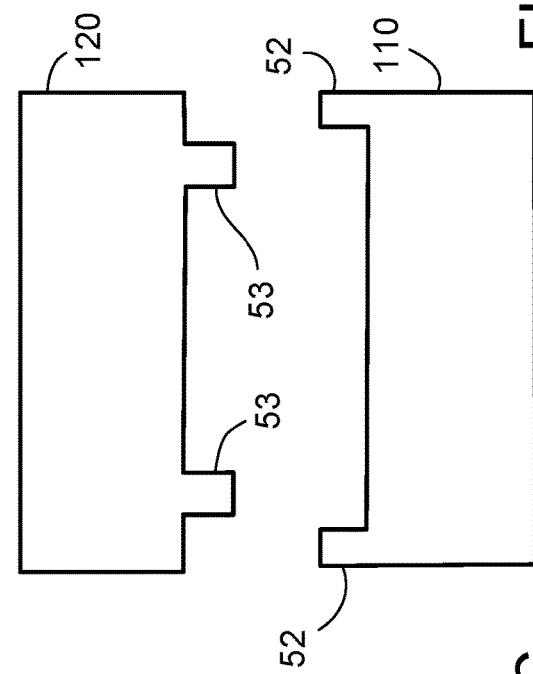

FIG. 5C is a cross-sectional view of a third implementation of a cover to a thermally insulating packaging. The thermally insulating packaging 100 includes the body 110 and the cover 120. The cover 120 includes protrusions 41 adjacent to the edges of the cover 120. The body 110 includes grooves 42 on the rims 155 of the outer side walls 160. The protrusions 41 of the cover 120 110 can be coupled to the grooves 42 of the body 110 such that the cover 120 can be firmly coupled to the body 110 by the friction between the grooves 42 and the protrusions 41.

Figure 5D:
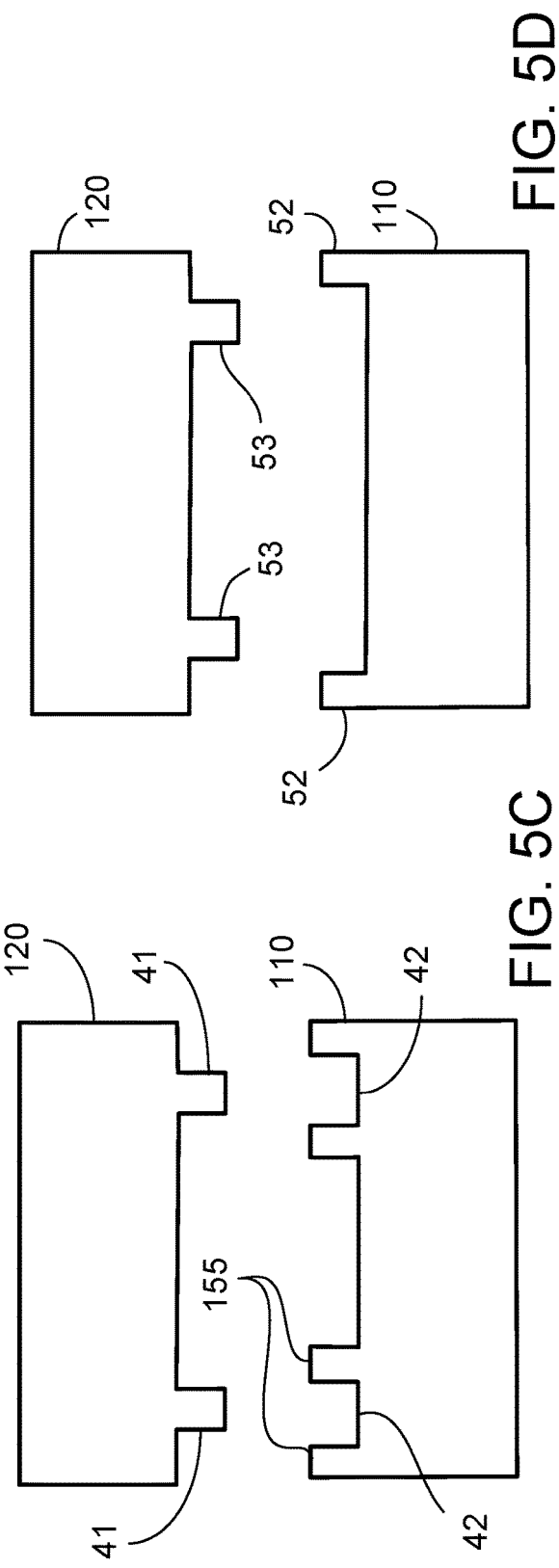

FIG. 5D is a cross-sectional view of a fourth implementation of a cover to a thermally insulating packaging. The thermally insulating packaging 100 includes the body 110 and the cover 120. The cover 120 includes protrusions 53 adjacent to the edges of the cover 120. The body 110 includes protrusions 52 on the rims 155 of the outer side walls 160. When the cover 120 is placed to cover the body 110, side surfaces of the protrusions 52 are coupled to side surfaces of the protrusions 53 such that the cover 120 can be firmly coupled to the body 110 by the friction between the protrusions 52 and the protrusions 53.

The cover 120 can be made of compostable materials. In some implementations, the cover 120 can be made of the same compostable material that is used for the body 110. In some other implementations, the cover 120 can be made of a compostable material that is different from the compostable material used for the body 110.

Similar to the body 110, the cover 120 can be a single-piece panel formed of the compostable material, or can include a shell of compostable material that at least partially encloses a core of compostable material.

In some implementations, the cover 120 has a length and a width that match the bottom of the body 110.

In some implementations, a water-proof, water-resistant or water-repellant layer can fully enclose the cover 120. For example, the layer can enclose all the surfaces of the cover 120. In some other implementations, the layer can enclose the cover 120 in part. For example, the layer can enclose a particular surface, e.g., an interior surface or an exterior surface, of the cover 120 or a portion of a particular surface, e.g., a bottom portion or an upper portion of the interior surface, of the cover 120.

The coupling mechanisms described with reference to FIGS. 5A to 5D can be also used to couple two thermally insulating packagings described with reference to FIGS. 2A, 3A and 4A or to couple the extender 280 to the thermally insulating packagings 210, 220 described with reference to FIGS. 2C and 2D.

Manufacturing Process

Figure 6:
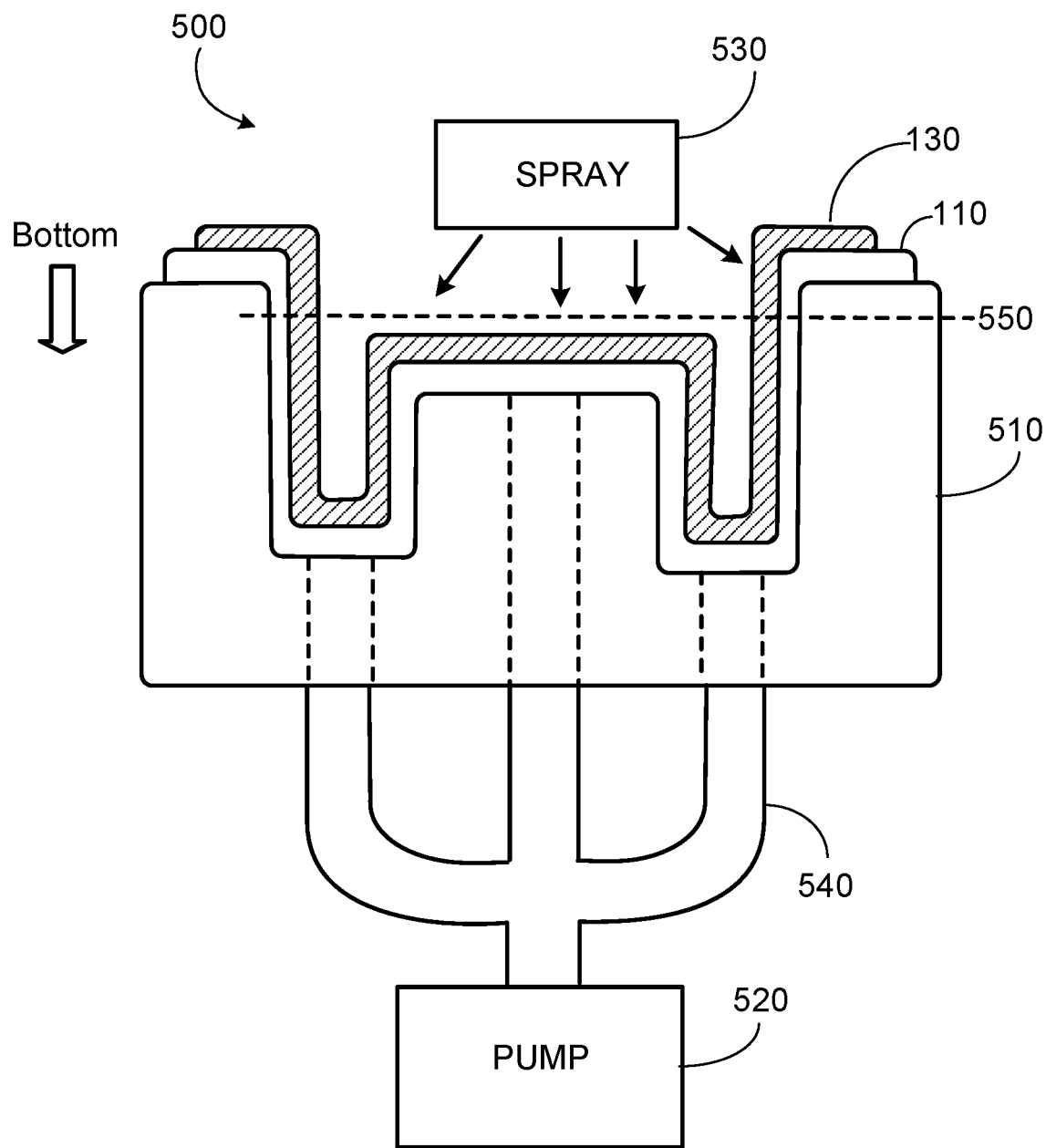
FIG. 6 is a diagram illustrating an example system to manufacture the thermally insulating packaging of FIG. 1A.

FIG. 6 is a diagram illustrating an example system to manufacture the thermally insulating packaging 100 of FIG. 1A.

As described above, the thermally insulating packaging 100 includes the solid compostable or recyclable body 110 and optionally the layer 130. The system 500 manufactures the thermally insulating packaging 100 using two processes, (i) a process to form the body 110 and (ii) a process to affix the layer 130 on a surface of the body 110. To form the body 110, any suitable techniques can be used. For example, a suction technique can be used. To affix the layer 130 on a surface of the body 110, any suitable techniques can be used. For example, an adhesive can be used.

The system 200 includes a mold 510, a pump 520, a spray 530, and one or more pipes 540. In this example suctioning process, compostable material that is provided to the mold 510 described above is provided to the reservoir 210. The compostable material can be highly viscous. Once the compostable material is provided on the surfaces of the mold 510, the pump 520 sucks the compostable material through the pipes 540 such that the compostable material evenly spreads over the surfaces of the mold 510. When the suction process is completed, the compostable material become hardened. Additional cooling or curing can be applied if needed to harden the compostable material. As a result, the body 110 is formed.

Optionally, the system 200 can affix the layer 130 on a surface of the unitary body 110. In this example, the layer 130 encloses the entire inner surfaces of the unitary body 110. In some implementations, different techniques can be used to partially enclose the unitary body 110 using the layer 130.

In some implementations, the layer can be secured to the body 110 by an adhesive. The adhesive can be a separate additive, or the adhesive can be provided by applying water to the body 110 to cause the starch in a portion of the body 110 at the surface to become tacky such that the layer 130 sticks to the body 110.

Where both the body 110 and layer 130 are compostable, the entire thermally insulating packaging 100 can be disposed of as a unit in a composting bin. Where the body 110 is compostable and the layer 130 is recyclable, the layer can be ripped off the body 110 manually by the recipient of the package, and then the body 110 can be disposed of in a composting bin and the layer can be disposed of a recycling bin.

Stackable Compostable or Recyclable Body

FIGS. 7A to 7C are cross-sectional views of implementations of a stackable body. In FIG. 7A, the outer side walls 160 can have a slope at a certain angle between 0 and 90 degrees. In FIG. 7B, the rims 165 of the outer side walls 160 are curved. In FIG. 7C, the outer side walls 160 have a slope and does not have rims between the outer side walls 160 and the inner side walls 170. These shapes of the body 110 enables multiple compostable bodies 110 to be stackable. As a result, large numbers of compostable bodies can be stacked so that they can be easily moved. In addition, the multiple compostable bodies can be stacked, they require less storage space.

Moisture Barrier Layer

The moisture barrier layer 130 can be water-proof, water-resistant or water-repellant layer 130 that encloses at least a portion of the compostable body 110. In some implementations, the layer 130 can fully enclose the compostable body 110. For example, the layer 130 can enclose across the entire surfaces of the compostable body 110. In some other implementations, the layer 130 can only partially enclose the compostable body 110. For example, the layer 130 can cover a particular surface, e.g., an interior surface or an exterior surface, of the compostable body 110 or a portion of a particular surface, e.g., a perimeter portion along the edge, a bottom portion, a central portion, or an upper portion of the interior surface, of the compostable body 110.

The layer 130 can be a biodegradable or compostable layer. The layer 130 prevents or inhibits water from penetrating the layer 130 not only from the interior area 35 to an exterior area of the compostable body 110, but also from the exterior area to the interior area 35. In some implementations, the layer 130 can be air-tight. In some implementations, the layer 130 can be a plastic film.

In some implementations, the layer 130 can be compostable, e.g., a bioplastic that meets ASTM D6400 standards. Example materials for a compostable layer include polymers based on one or more of polylactic acid (PLA), poly(beta-amino) esters (PBAE), polyhydroxyalkanoate (PHA), polycapralactones (PCL), polybutyrate adipate terephthalate (PBAT) polyvinylalcohol (PVA), or ethylene vinyl alcohol (EVOH). In addition, any combinations of these materials can be used for the layer 130. For example, a combination of PBAT and PE can be used for the layer 130. As another example, a combination of PE and PLA can be used for the layer 130. In some implementations, the polymer can be mixed with an organic product, e.g., starch or pulp, such as corn starch.

In some implementations, the layer 130 can be recyclable and biodegradable. A suitable material for the recyclable layer is polyethylene, e.g., a polyethylene film. For example, the layer can include LDPE, MDPE, HDPE, or polyethylene terephthalate. An advantage of polyethylene is ease of fabrication and good water resistance.

In some implementations, the layer is a paper sheet. If the paper is thin enough or is perforated, the paper is compostable. Optionally, the paper can be lined with a water-repellant coating. Either the inner surface of the layer, or the outer surface, or both can be lined with the water-repellant coating. The water-repellant coating can be a compostable material, e.g., wax. In this case, the layer with paper and coating is compostable. Alternatively, the water-repellant coating can be a recyclable material. In this case, the layer with paper and coating is recyclable.

In some implementations, the layer provides a film that encloses the compostable body, e.g., the body is slidable within a pocket formed by the film. In some implementations, the film is secured to the compostable body 110 by an adhesive.

In some implementations, the layer directly coats the compostable body. The layer that directly coats the compostable body can be composed of an organic compostable material, e.g., a wax. The layer can be spread in a thin layer on the surface of the body. The layer can be applied in liquid form and then harden on the compostable body. Alternatively, the layer can be sprayed onto the body. The sprayed-on layer can provide a moisture barrier. For example, a water-proof, water-resistant or water-repellant material can be sprayed onto the panel. In some implementations the layer can be polylactic acid (PLA).

A problem with starch-based insulation is that it dissolves easily in water. If the item being shipped is cold or a coolant is placed in the interior of the shipping container 10, condensation can form on the interior surfaces of the thermally insulating packaging 100. However, the layer 130 prevents liquid, e.g., the condensation, from reaching the starch of the compostable body 110, thus enabling the thermally insulating packaging 100 to be usable as a thermal insulator in the shipping container 10. However, in some implementations, the compostable body 110 is exposed to the environment, i.e., there is no layer coating or surrounding the compostable body 110.

Structure of Container for Wet Material

Figure 8:
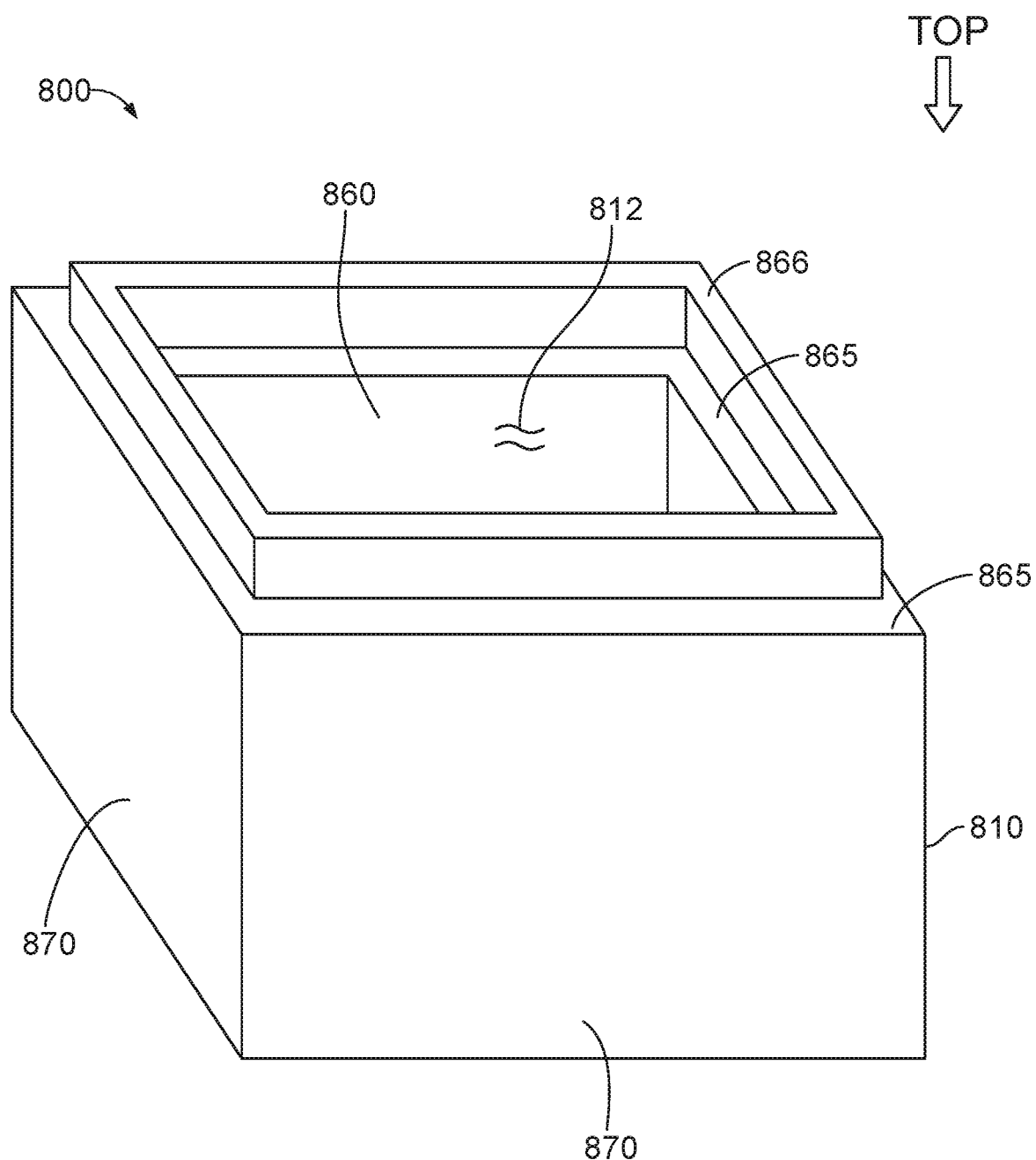
FIG. 8 illustrates an example container to store wet flexible material.

FIG. 8 illustrates an example container to store cold wet material, particularly cold wet solid objects, e.g., seafood. In some implementations, the container 800 can be shipped without being inserted into a shipping box. In this case, the container 800 can serve as the shipping container. In some other implementations, the container 800 can be inserted into a shipping box, e.g., a cardboard box, for shipping.

The container 800 includes a solid compostable or recyclable body 810 that is primarily formed of a compostable and/or recyclable material. In this context, "solid" indicates that the body 810 holds together as a single unit, e.g., rather than being formed of loose-fill pellets. The container 800 can optionally include a water-proof, water-resistant or water-repellant layer that covers at least a portion of the body 810.

Examples of the compostable material(s) for forming the body 810 are starch, organic fiber, or a combination of them. The starch can be a grain starch, e.g., a corn starch, a wheat starch or sorghum (sorghum is also known as milo), a root starch, e.g., a potato starch, or a vegetable starch. In some cases, a combinations of different starches can be used. The organic fiber can be plant fibers, e.g., a paper pulp, or a vegetable fiber pulp. For example, the plant fibers could be fibers from coconut husk, corn husk, linen, or cotton. As further examples, the plant fibers could be bagasse, bamboo fibers, or fiber formed from recycled paper (e.g., by grinding up paper product, such as cardboard, to provide recycled wood pulp). In some cases, a combination of plant fibers from different plants can be used.

In some implementations, the body 810 consists of starch. In some implementations, the body consists of plant fiber. In some cases, a combination of starch and plant fiber can be used; the body can consist of starch and plant fiber.

Other materials that do not interfere with the compostable or recyclable nature of the body 810, e.g., a softener to improve adhesion of the starch, or a preservative or anti-fungal agent, can be present, but only in small quantities. For example, at least 85%, e.g., at least 90-95%, by weight of the body 810 is starch and/or pulp. Polyvinyl alcohol can be present, e.g., 5-10% by weight.

In particular, an additive to increase the resistance of the body to water (i.e., reduce permeability of the body and reduce tendency of the material of the body to absorb water or dissolve in the presence water) can be mixed into the body 810. In some implementations, the body 810 consists of plant fiber and the additive to increase water resistance. In some implementations, the body 810 consists of starch and the additive to increase water resistance. In some implementations, the body 810 consists of a mixture of plant fiber and starch, and the additive to increase water resistance. The additive can be mixed homogeneously into the plant fiber.

The additive can include a polymer based on one or more of polylactic acid (PLA), poly(beta-amino) esters (PBAE), polyhydroxyalkanoate (PHA), polycapralactones (PCL), polybutyrate adipate terephthalate (PBAT) polyvinylalcohol (PVA), or ethylene vinyl alcohol (EVOH).

However, in some implementations, the body 810 does not include an additive to increase water resistance.

In some implementations, the material of the body 810 can be a foam material, e.g., to include small pores or voids spread substantially uniformly through the body 810. For example, 80-80% of the volume of the body 811 can be pores or voids, e.g., 25-75%, 25-50%, 10-25%, 50-75%. The maximum size of the pores or voids can be about 1 mm. Although the body 810 could be a foam material, it is generally incompressible. The density of the solid compostable or recyclable body 810 can be about 0.4-3.5 g/cm3, e.g., 0.6-1.0 g/cm3, 0.8-2.0 g/cm3, 1.0-3.5 g/cm3.

In some implementations, the body 810 is entirely compostable, i.e., consists of compostable materials. In some implementations, the body 810 is entirely recyclable, i.e., consists of recyclable materials. In some implementations, the body 810 is formed of a combination of compostable and recyclable materials. In particular, a recyclable material for the body 810 is a body formed from a pulp of plant fibers, e.g., a paper pulp (whether paper pulp is compostable or recyclable can depend on the thickness, size and porosity of the body), optionally including the additive to increase the resistance of the body to water.

The thickness of the body 810 can be about 0.5-5 inches, e.g., 1-3 inches. Any given unitary body 810 can have substantially uniform thickness. The floor 840, the outer side walls 860, and the inner side walls 870 can have substantially uniform thickness. In some implementations, the surfaces of the body 810 can be generally flat. In some other implementations, one or more surfaces of the body 810 can be corrugated. Corrugation can increase the effective thickness of the body 810, e.g., by a factor of up to 4. In this case, the thickness of the body 810 can still be uniform, but the body 810 is shaped with corrugations. However, in some implementations, the inner surfaces of the body have various projections, e.g., tabs or struts, e.g., to assist in positioning of the item to be shipped or for increased structural support. In addition, in some implementations, the outer surfaces of the body can have various projections, e.g., pads or struts, e.g., to assist provide increased structural support or cushioning.

Referring a top view of the container 800 shown in FIG. 8, the container 800 generally takes the form of a "tub," e.g., a container with floor and side-walls and that is open at the top and has an interior space. The "tub" can have box-like shape, e.g., a generally rectilinear prism. Of course, the edges of the body can be rounded, while remaining a generally rectilinear prism. In addition, the "tub" could have other shapes, e.g., octagonal, cylindrical, etc., while still considered to have side-walls.

To manufacture the container 800, the plant fibers are ground to the appropriate size and added to a liquid to form a slurry. For example, used paper products, e.g., cardboard, can be recycled by grinding the paper product and adding water to form a recycled wood pulp. If appropriate, the additive to increase water-resistance can be added to the slurry. The slurry is then fed to a vacuum former to create a mold of the desired shape, e.g., one of the shapes described below, thus forming the body which is made up of recycled wood pulp.

Figure 9A:
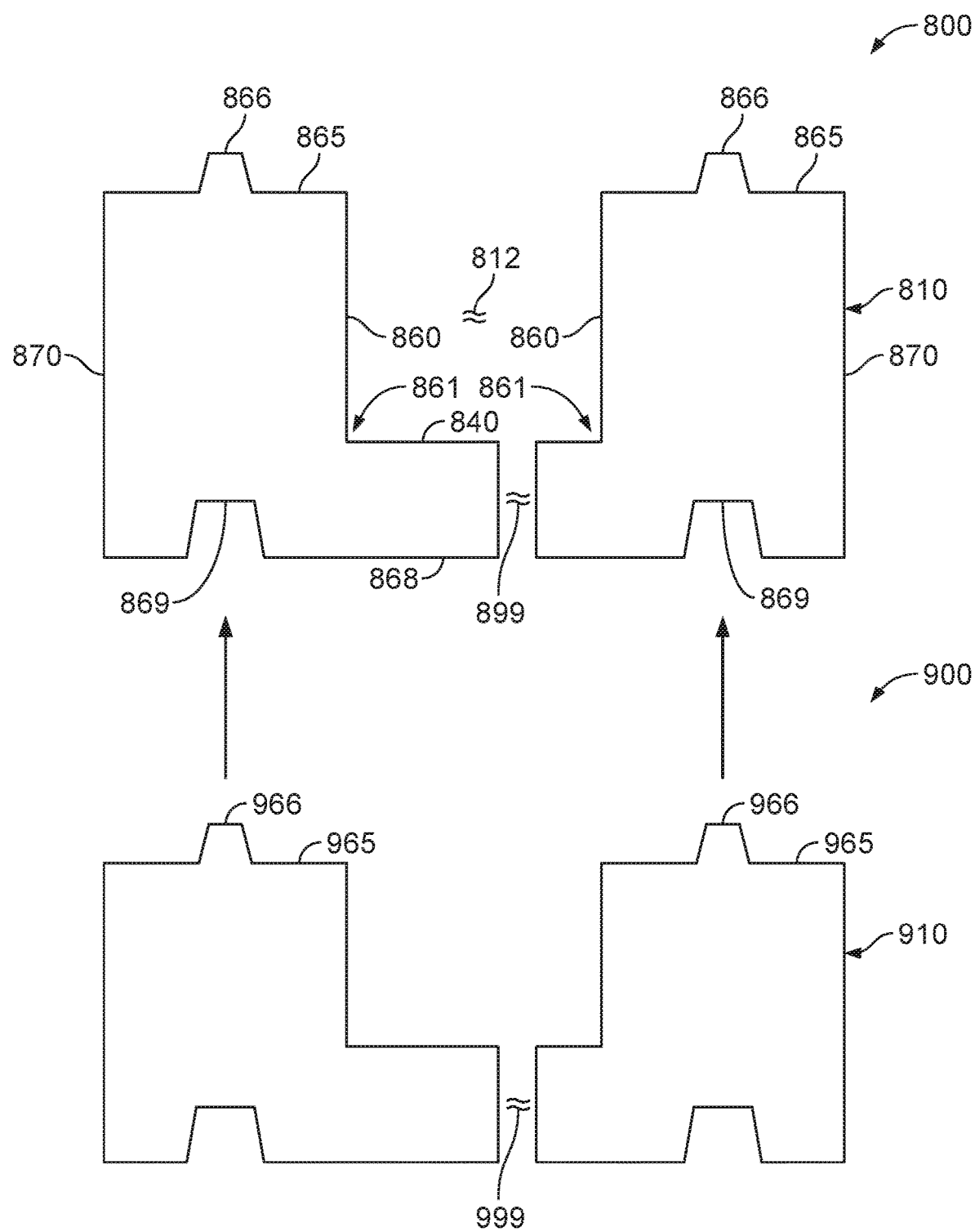
FIG. 9A is a cross-sectional view of example containers.

FIG. 9A is a cross-sectional view of example stackable containers. In FIG. 9A, the container 800 can be coupled to the container 900 using the coupling mechanism. The mechanisms described above with reference to FIGS. 5A to 5D can be used to couple the container 800 to the container 900. However, these mechanisms are examples of various coupling mechanisms and any suitable coupling mechanism can be used to couple the container 800 to the container 900. In some implementations, the body 810 is or includes a unitary layer that provides a floor and side walls of the body 810. This unitary layer is "continuous." In this context, "continuous" indicates that the portions are seamlessly joined without a discontinuity in material composition; there is no gap, adhesive, melted region, or similar disruption in the material composition to indicate a seam between floor and walls or between adjacent walls. This unitary layer holds together by itself as a single unit without adhesives or fasteners to join multiple sections.

As shown in FIG. 9A, the container 800 can include a single-piece body, i.e., the solid compostable or recyclable body 810 consists of, i.e., is only, the unitary layer. The solid compostable or recyclable body 810 can have a uniform homogenous composition. The solid compostable or recyclable body 810 is primarily formed of a single compostable material. As a unitary layer, the floor 840 of the solid compostable or recyclable body 810 is joined "continuously" and "seamlessly" to the side walls 860 along edges 861. In addition, each of the side walls 860 is joined "continuously" and "seamlessly" to its adjacent side walls along edges, e.g., an edge 861. In this implementation, the body 810 doesn't include any interior cavity between the inner side walls 860 and the outer side walls 870.

The inner surface 840 of the floor is continuously and seamlessly joined to the surfaces of inner side walls 860. The surfaces of the inner side walls 860 are continuously and seamlessly jointed to the surfaces of the outer side walls 870 by a rim 865 of the body 810. The surfaces of the outer side walls 870 are continuously and seamlessly joined to the outer surface 868 of the floor.

In some implementations, the floor includes one or more holes 899 penetrating the floor 840. The holes 899 extend between the inner surface 840 of the floor and the outer surface 868 of the floor. If the holes are present, any liquid in the interior area 812 can be drained to an exterior area of the container 800 through the one or more holes 899. However, in some implementations, the body does not include drainage holes.

In some implementations, the floor can include one or more grooves or protrusions on the inner surface 840 of the floor. The grooves can hold an item as described with reference to FIGS. 3B to 3D.

The container 800 includes a protrusion 866 that is located on the rim 865 and a groove 869 that is located on the outer surface 868 of the floor. The protrusion 866 and the groove 869 can be the coupling mechanism mentioned above. The protrusion 866 is coupled to a groove of another container such that the container 800 is coupled to the container. For example, the container 900 includes a protrusion 966 on the rim 965 of the container 900. The protrusion 966 of the container 900 is inserted into the groove 869 of the container 800 such that the container 900 is coupled to the container 800. Once the protrusion 966 is securely coupled to the groove 869, the container 800 can be securely stacked on top of the container 900. The protrusion and the groove of the container can have any suitable size and shape to implement various containers.

Figure 9B:
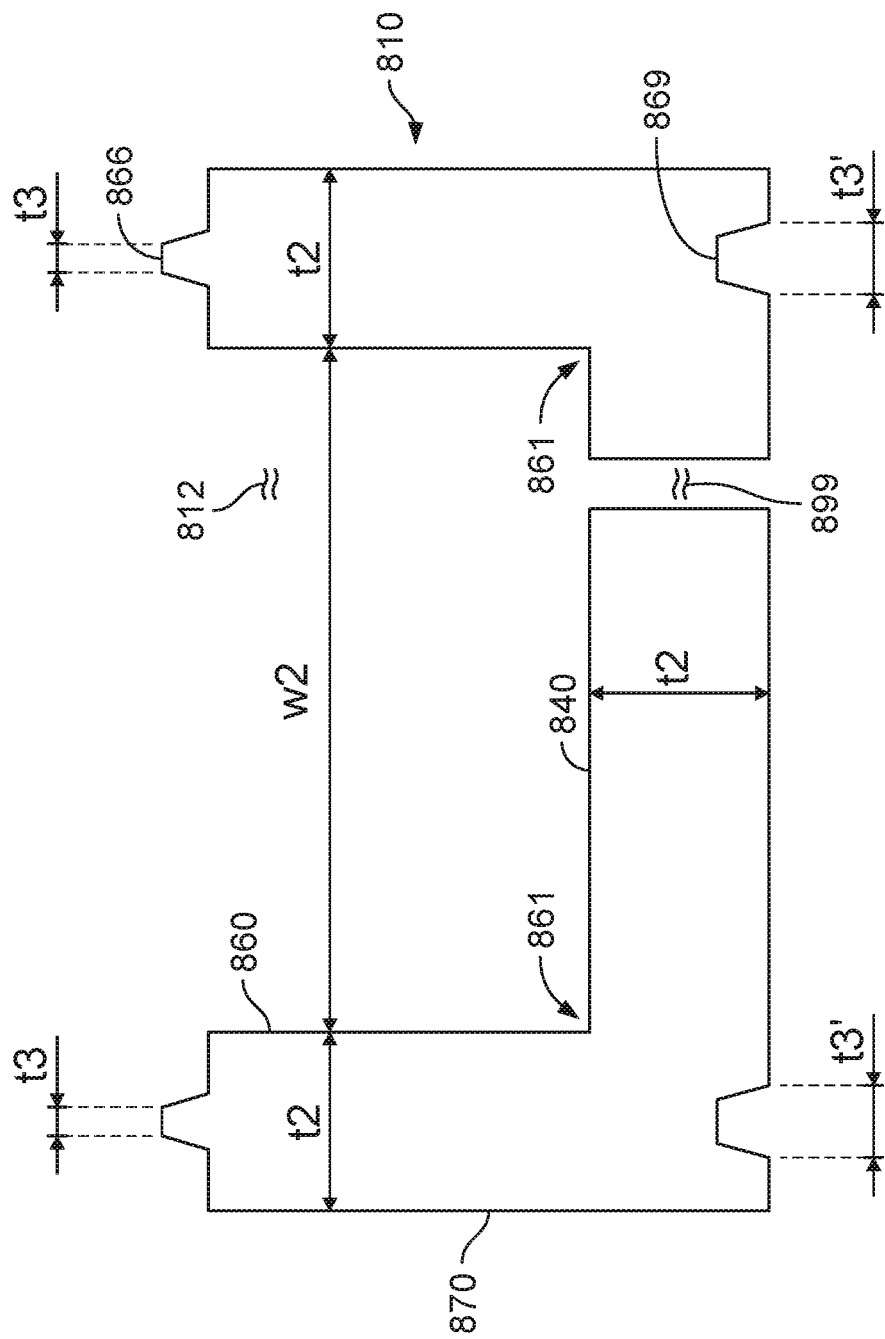
FIG. 9B is a cross-sectional view of the example container in FIG. 9A.

FIG. 9B is a view of the example container 800 in FIG. 9A. Referring FIG. 9B, for any of the various implementations, although the floor and walls of the body 810 can be thin, as compared to their respective length and width, the floor and walls are thick enough to provide sufficient thermal insulating function for commercial applications, such as shipment of fresh seafood, that require of products, e.g., foods or medical supplies, that need to be kept cool, e.g., at temperatures of 32-48° F. In general, this can be accomplished with the body 810 having a thicknesses noted above, e.g., of about 0.5-5 inches for a single-piece compostable body.

An example thickness t2 of the solid compostable or recyclable body 810 can be 0.5-5 inches. In the illustrated example, the solid compostable or recyclable body 810 has substantially uniform thickness. In some implementations, the solid compostable or recyclable body 810 can have non-uniform thickness. For example, a thickness of the floor 840 can be different from a thickness for the side wall 860. A width w2 of the interior space 812 can be 3-48 inches. In some implementations, the interior space 812 can have a square shape. In some other implementations, the interior area 812 can have a rectangular shape. In some other implementations, the interior area 812 can have a circular shape.

The width t3 of the protrusion 866 is smaller than the width t3' of the groove 869.

Figure 10A:
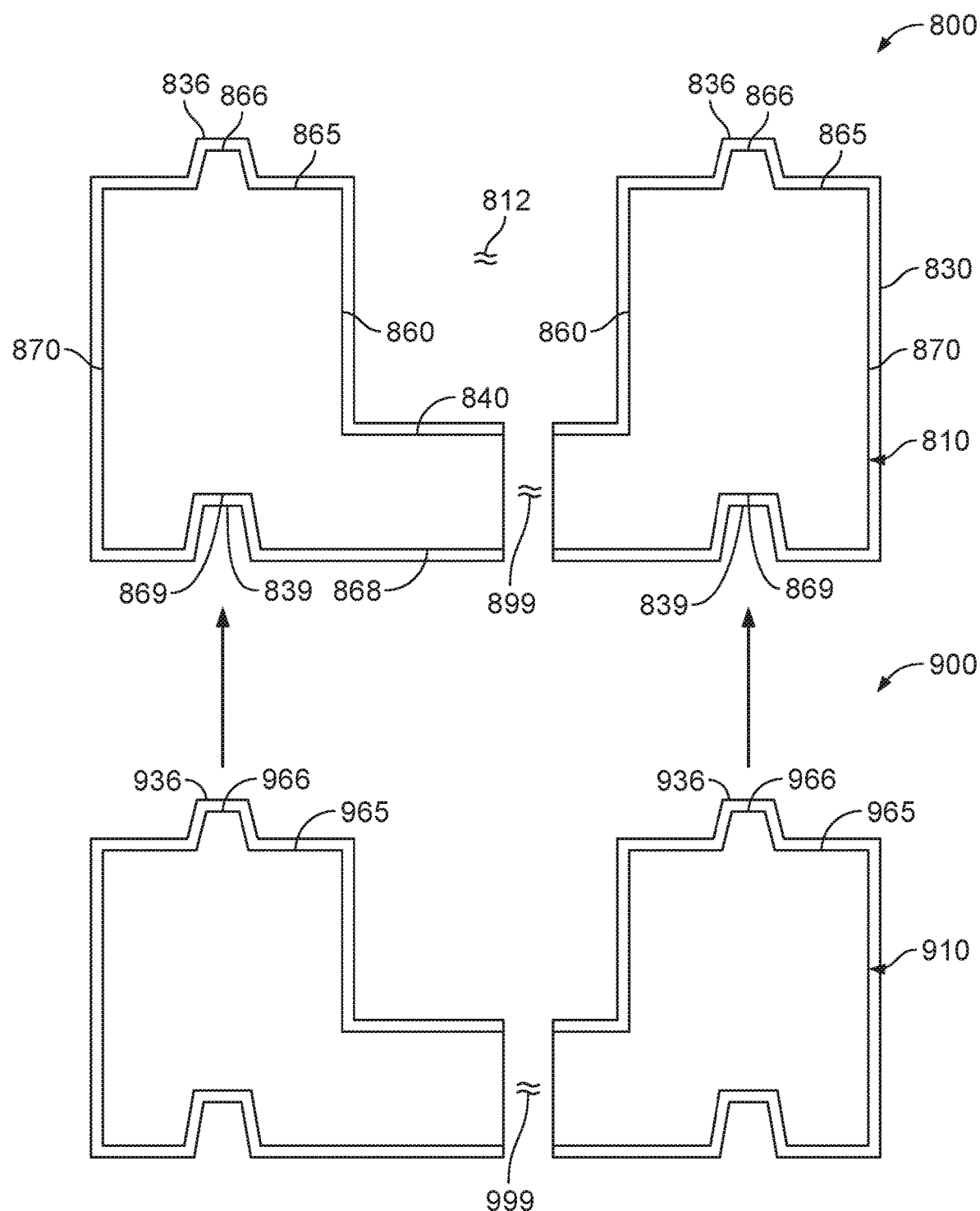
FIG. 10A is a cross-sectional view of another example containers.

FIG. 10A is a cross-sectional view of another example stackable containers. In FIG. 10A, the container 800 can be coupled to the container 900 using the coupling mechanism. The mechanisms described above with reference to FIGS. 5A to 5D can be used to couple the container 800 to the container 900. However, these mechanisms are examples of various coupling mechanisms and any suitable coupling mechanism can be used to couple the container 800 to the container 900. In some implementations, the body 810 is or includes a unitary layer that provides a floor and side walls of the body 810. This unitary layer is "continuous." In this context, "continuous" indicates that the portions are seamlessly joined without a discontinuity in material composition; there is no gap, adhesive, melted region, or similar disruption in the material composition to indicate a seam between floor and walls, between walls and rim, or between adjacent walls. This unitary layer holds together by itself as a single unit without adhesives or fasteners to join multiple sections.

As shown in FIG. 10A, the container 800 can include a single-piece body, i.e., the solid compostable or recyclable body 810. The solid compostable or recyclable body 810 can have a uniform homogenous composition. The solid compostable or recyclable body 810 is primarily formed of a single compostable material. As a unitary layer, the floor 840 of the solid compostable or recyclable body 810 is joined "continuously" and "seamlessly" to the side walls 860 along edges 861. In addition, each of the side walls 860 is joined "continuously" and "seamlessly" to its adjacent side walls along edges, e.g., an edge 861.

The inner surface 840 of the floor is continuously and seamlessly joined to the surfaces of inner side walls 860. The surfaces of the inner side walls 860 are continuously and seamlessly jointed to the surfaces of the outer side walls 870 by a rim 865 of the body 810. The surfaces of the outer side walls 870 are continuously and seamlessly joined to the outer surface 868 of the floor.

In some implementations, the floor includes one or more holes 899 penetrating between the inner surface 840 of the floor and the outer surface 868 of the floor. Any liquid in the interior area 812 can be drained to an exterior area of the container 800 through the one or more holes 899. In some implementations, the floor can include one or more grooves on the inner surface 840 of the floor. The grooves can hold an item as described with reference to FIGS. 3B to 3D.

The container 800 includes a protrusion 866 that is located on the rim 865 and a groove 869 that is located on the outer surface 868 of the floor. The protrusion 866 and the groove 869 can be the coupling mechanism described above; the protrusion 866 on one container will fit snugly into the groove of another container. For example, the container 900 includes a protrusion 966 on the rim 965 of the container 900. The protrusion 966 of the container 900 is inserted into the groove 869 of the container 800 such that the container 900 is coupled to the container 800. The protrusion and the groove can have any suitable size and shape.

In the implementation illustrated in FIG. 10A, the container 800 further includes one or more layers, e.g., a layer 830, covering the body 810. That is, the supporting layer 830 can cover at least one of the surfaces of the body 810. For example, in FIG. 10A, the layer 830 covers the inner surface 840 of the floor, the inner walls 860, the rim 865, the outer walls 970 and the outer surface 868 of the floor. In some implementations, the layer 830 covers only some of the surfaces of the container 800. The layer 830 can be a moisture barrier (a water-resistant, water-repellant or waterproof layer) to prevent liquid from reaching the body 810 and/or provide additional strength to the structure of the container 800.

To cover the surfaces of the container 800 with the supporting layer 830, various techniques can be used. For example, the techniques described with reference to FIG. 6 can be used to cover the surfaces of the container 800 with the supporting layer 830.

In some implementations, the layer 830 can be secured to the body 110 by an adhesive. The adhesive can be a separate additive, or the adhesive can be provided by applying water to the body 810 to cause the starch in a portion of the body 810 at the surface to become tacky such that the layer 830 sticks to the body 810.

Where both the body 810 and layer 830 are compostable, the entire container 800 can be disposed of as a unit in a composting bin. Where the body 810 is compostable and the layer 830 is recyclable, the layer can be ripped off the body 810 manually by the recipient of the package, and then the body 810 can be disposed of in a composting bin and the layer can be disposed of a recycling bin.

Figure 10B:
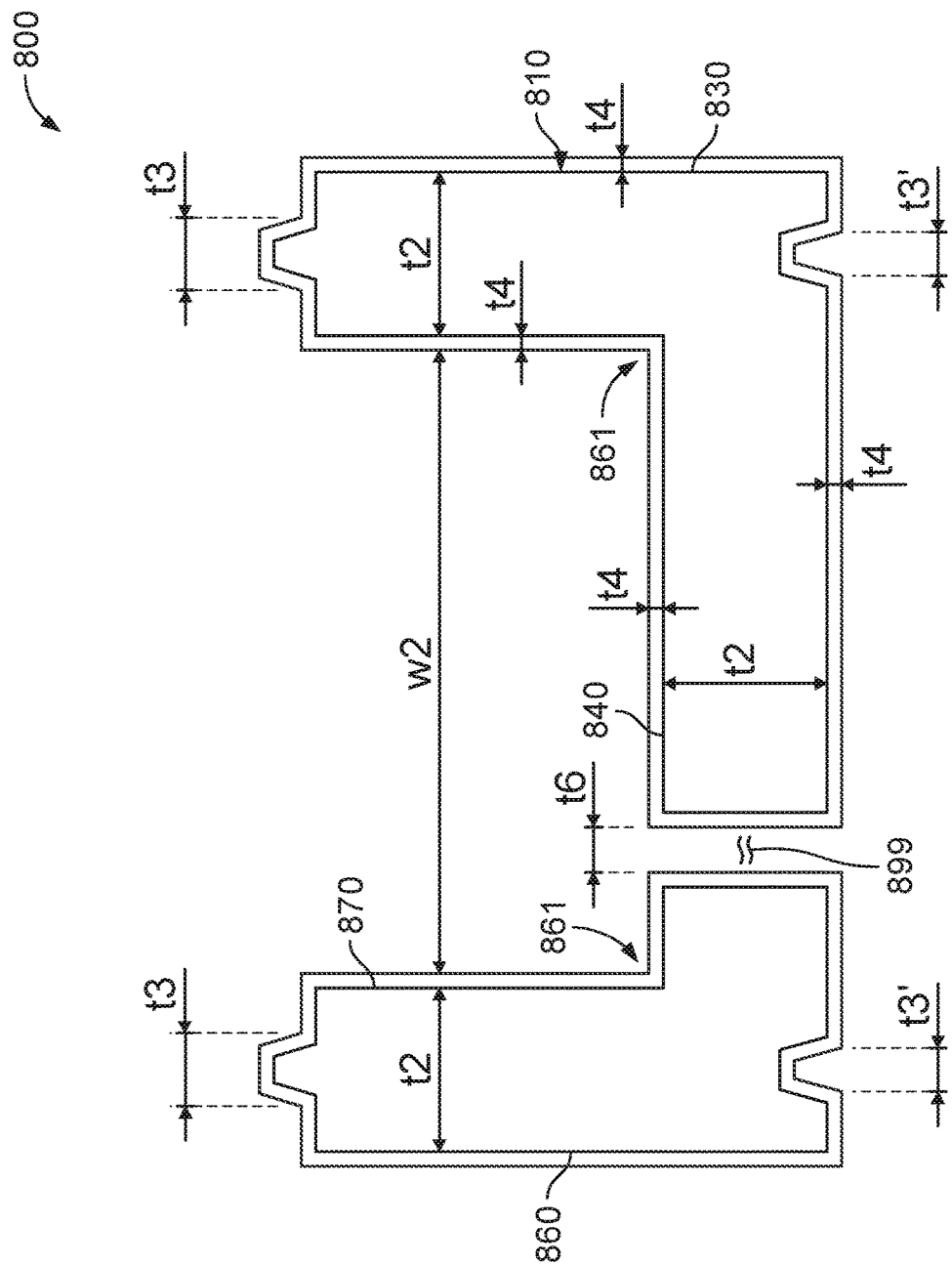
FIG. 10B is a cross-sectional view of the example container in FIG. 10A.

As described with reference to FIG. 9A, the container 800 can be securely stacked on top of the container 900 using a coupling mechanism. For example, the protrusion 966 of the container 900 is inserted into the groove 869 of the container 800 such that the container 900 is coupled to the container 800. The protrusion and the groove of the container can have any suitable size and shape to implement various containers. FIG. 10B is a view of the example container 800 in FIG. 10A. Referring FIG. 10B, for any of the various implementations, although the floor and walls of the body 810 can be thin, as compared to their respective length and width, the floor and walls are thick enough to provide sufficient thermal insulating function for common commercial applications such as shipment of fresh seafood that require shipment of products, e.g., foods or medical supplies, that need to be kept cool, e.g., at temperatures of 32-48° F. In general, this can be accomplished with the body 810 having a thicknesses noted above, e.g., of about 0.5-5 inches for a single-piece compostable body.

An example thickness t2 of the solid compostable or recyclable body 810 can be 0.5-5 inches. In the illustrated example, the solid compostable or recyclable body 810 has substantially uniform thickness. In some implementations, the solid compostable or recyclable body 810 can have non-uniform thickness. For example, a thickness of the floor 840 can be different from a thickness for the side wall 860. A width w2 of the interior space 812 can be 3-48 inches. In some implementations, the interior space 812 can have a square shape. In some other implementations, the interior area 812 can have a rectangular shape. In some other implementations, the interior area 812 can have a circular shape.

The width t3 of the protrusion 866 is smaller than the width t3' of the groove 869. In particular, as illustrated in FIG. 10B, when the protrusion 866 is covered by the supporting layer 830, the thickness t3 and the thickness t3' can be determined based on the thickness t4 of the supporting layer 830.

Figure 11A:
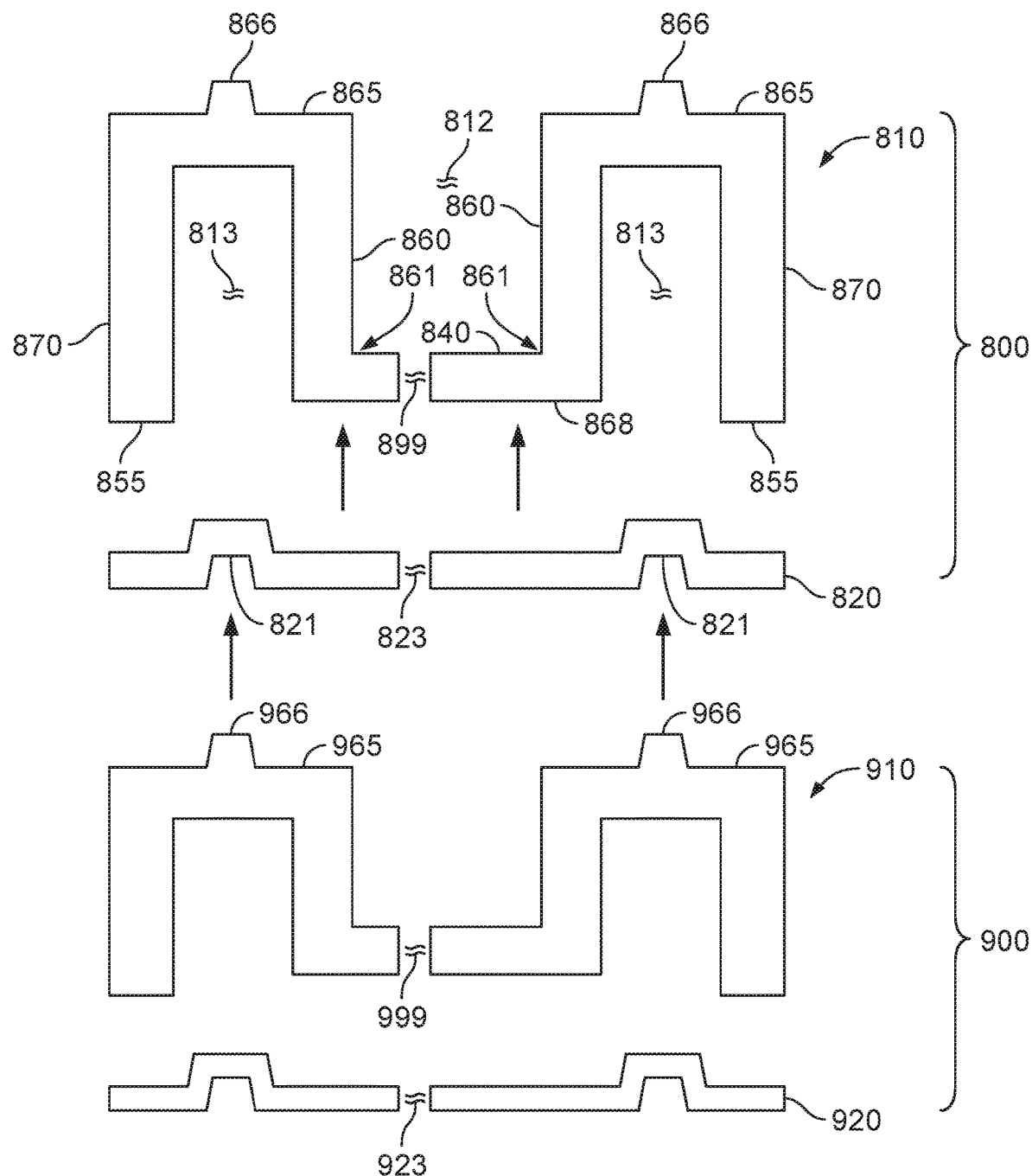
FIG. 11A is a cross-sectional view of another example containers.

FIG. 11A is a cross-sectional view of example stackable containers. In FIG. 11A, the container 800 is or includes the body 810 that is a unitary layer providing a floor and side walls of the body 810. This unitary layer is "continuous." In this context, "continuous" indicates that the portions are joined without a discontinuity in material composition; there is no gap, adhesive, melted region, or similar disruption in the material composition to indicate a seam between floor and walls, between walls and rim, or between adjacent walls. This unitary layer holds together by itself as a single unit without adhesives or fasteners to join multiple sections.

The container 800 can include a single-piece body, i.e., the solid compostable or recyclable body 810 consists of, i.e., is only, the unitary layer. The solid compostable or recyclable body 810 can have a uniform homogenous composition. The solid compostable or recyclable body 810 is primarily formed of a single compostable material. As a unitary layer, the inner surface 840 of the floor is joined "continuously" and seamlessly to the side walls 860 along edges 861. In addition, each of the side walls 860 is joined "continuously" to its adjacent side walls along edges, e.g., an edge 861. The body 810 can form a shell with a gap 813 between the inner walls 860 and the outer side walls 870, which together provide the side walls of the packaging.

The inner surface 840 of the floor is continuously and seamlessly joined to the outer surfaces of inner side walls 860. The outer surfaces of the inner side walls 860 are continuously and seamlessly jointed to the outer surfaces of the outer side walls 870 by a rim 865 of the body 810. The outer surfaces of the outer side walls 870 are continuously and seamlessly joined to the inner surfaces of the outer side walls 870 by a rim 855 of the body 810. The inner surfaces of the outer side walls 870 are continuously and seamlessly joined to the inner surfaces of the inner side walls 860 by the rim 865. The inner surfaces of the inner side walls 860 are continuously and seamlessly joined to the outer surface 868 of the floor.

The container 800 can additionally include a bottom cover 820 that is primarily formed of a compostable or recyclable material(s). The bottom cover 820 can enclose the outer surface of the floor 840 and the gap 813 formed between the sidewalls 860, 870 of the body 810. In some implementations, the cover 820 can be snuggly fit to bottom rims 855 of the outer side walls 870. In some other implementations, the cover 820 can include grooves or protrusions on edges of the cover 820 to be coupled with the body 810. Example methods of coupling the cover 820 to the body 810 are described above in greater detail with reference to FIGS. 5A to 5D.

In some implementations, the floor includes one or more holes 899 penetrating between the inner surface 840 of the floor and the outer surface 868 of the floor. In addition, the cover 820 includes one or more holes 823 penetrating the cover 820. Any liquid in the interior area 812 can be drained to an exterior area of the container 800 through the hole 899 and the hole 823. To drain liquid, the hole 899 of the body 810 can be aligned with the hole 823 of the cover 820. In some implementations, the floor can include one or more grooves on the inner surface 840 of the floor. The grooves can hold an item as described with reference to FIGS. 3B to 3D.

The container 800 includes a protrusion 866 that is located on the rim 865 and the cover 820 includes a groove 821 that is located on the outer surface of the cover 820. The protrusion and the groove can be the coupling mechanism mentioned above. The protrusion 866 is coupled to a groove of another container such that the container 800 is coupled to the container. For example, the container 900 includes a protrusion 966 on the rim 965 of the container 900. The protrusion 966 of the container 900 is inserted into the groove 821 of the container 800 such that the container 900 is coupled to the container 800. Once the protrusion 966 is securely coupled to the groove 821, the container 800 can be securely stacked on top of the container 900. The protrusion and the groove of the container can have any suitable size and shape to implement various containers.

In some implementations, the gap 813 can be filled with one or more materials. The filled gap 813 can be called as a core of the body 810. In some implementations, the shell and the core can have different compositions. For example, the shell can be primarily formed of starch whereas the core can be primarily formed of organic fiber pulp. As another example, the shell can be primarily formed of a corn starch while the core can be primarily formed of a root starch. In these examples, the shell and the core are compostable and recyclable.

As another example, the shell can be primarily formed of starch or pulp while the core can be primarily formed of polyethylene, e.g., shredded polyethylene or polyethylene pellets. In this example, the shell is compostable and recyclable while the core is recyclable. As another example, the core can be primarily formed of starch or pulp while the shell can be primarily formed of polyethylene. In this example, the core is compostable and recyclable while the shell is recyclable. In these implementations, even if the shell has a composition that is different from a composition of the core, each of the shell and the core can have a uniform homogenous composition.

In some implementations, the shell and the core can have the same composition, but the composition of the shell and the composition of the core can be differently processed. For example, both the shell and the core can be primarily formed of a starch. However, the starch used for the shell can be processed at a first temperature during a drying process while the starch used for the core can be processed at a second temperature during a drying process.

In some implementations, the shell and the core can have different firmness. For example, the shell can be primarily formed of a material that is harder than the material that provides the core, or vice versa. Alternatively, the shell and the core can have the same compositions.

In some implementations, the shell can have a solid composition while the core is loose material, e.g., pellets, shredded material, powder, etc. For example, the core can be composed of starch pellets, shredded paper, loose plant fibers, etc. Optionally the loose material can be compacted within the shell.

If the core includes a loose material, the bottom of the shell will need to be covered, e.g., by the cover 820, to retain the loose material of the core within the shell.

If the core is a solid body or is a loose material that is sufficiently compacted that it can't be trivially dislodged, then covering the bottom of the shell is optional; a portion of the shell can extend across the bottom of the core to enclose the core, or the bottom of the core could provide the lower outer surface of the body 810.

In some other implementations, the gap 813 can be filled with air, that is the gap 813 can be left as an empty space. In this case, the bottom of the shell can be covered to seal the air within the gap 813. In addition, in this case, the body 810 is just the shell (possibly with the layer 830).

The inner side walls 860 can have a height (in the vertical direction) smaller, e.g., by about 0.5 to 4 inches, than the height of the outer side walls 870. This permits a gap to be formed between the cover 820 and the floor 840 when the cover 820 is attached to the body 810. Alternatively, the bottom 868 of the floor could be coplanar with the bottom of the outer side walls 870; in this case there would not be a gap below the floor 840 when the cover 820 is attached.

Figure 11B:
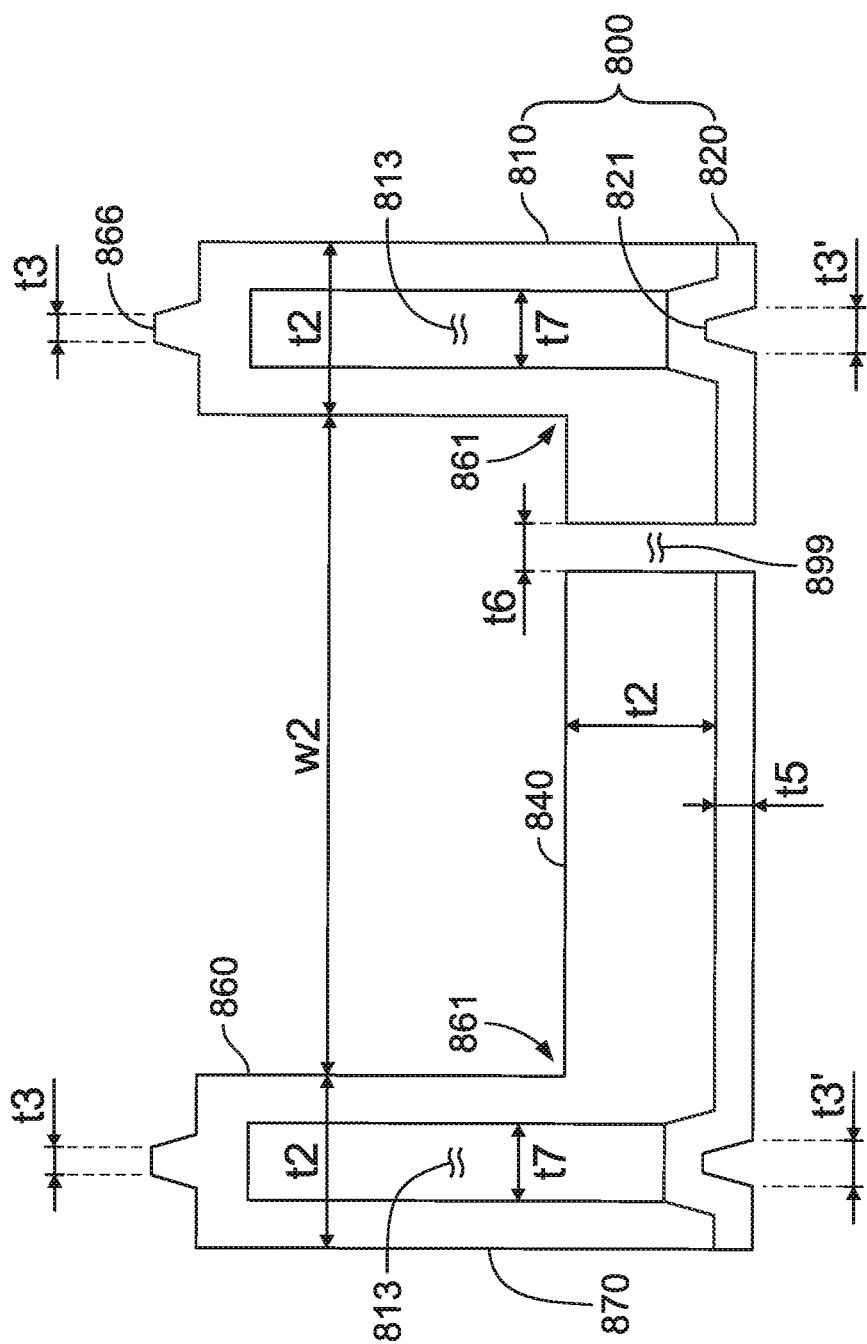
FIG. 11B is a cross-sectional view of the example container in FIG. 11A.

FIG. 11B is a view of the example container 800 in FIG. 11A. Referring FIG. 11B, for any of the various implementations, although the floor and walls of the body 810 can be thin, as compared to their respective length and width, the floor and walls are thick enough to provide sufficient thermal insulating function for commercial applications, such as shipment of fresh seafood. that require shipment of products, e.g., foods or medical supplies, that need to be kept cool, e.g., at temperatures of 32-48° F. In general, this can be accomplished with the body 810 having a thicknesses noted above, e.g., of about 0.25-4 inches for the core and 0.25-0.75 inches for the shell of a compostable body having a core and shell.

An example thickness t2 of the solid compostable or recyclable body 810 can be 0.5-5 inches. In the illustrated example, the solid compostable or recyclable body 810 has substantially uniform thickness. In some implementations, the solid compostable or recyclable body 810 can have non-uniform thickness. For example, a thickness of the floor 840 can be different from a thickness for the side wall 860. That is, the sum of the thickness of the floor 840 and the thickness of the cover 820 can be the same as the thickness t2 of the side walls. An example thickness t7 of the gap between the outer side wall 870 and the inner side wall 860 can be 0.5-4 inches. A width w2 of the interior space 812 can be 3-48 inches. In some implementations, the interior space 812 can have a square shape. In some other implementations, the interior area 812 can have a rectangular shape. In some other implementations, the interior area 812 can have a circular shape.

The width t3 of the protrusion 866 is smaller than the width t3' of the groove 869.

Figure 12A:
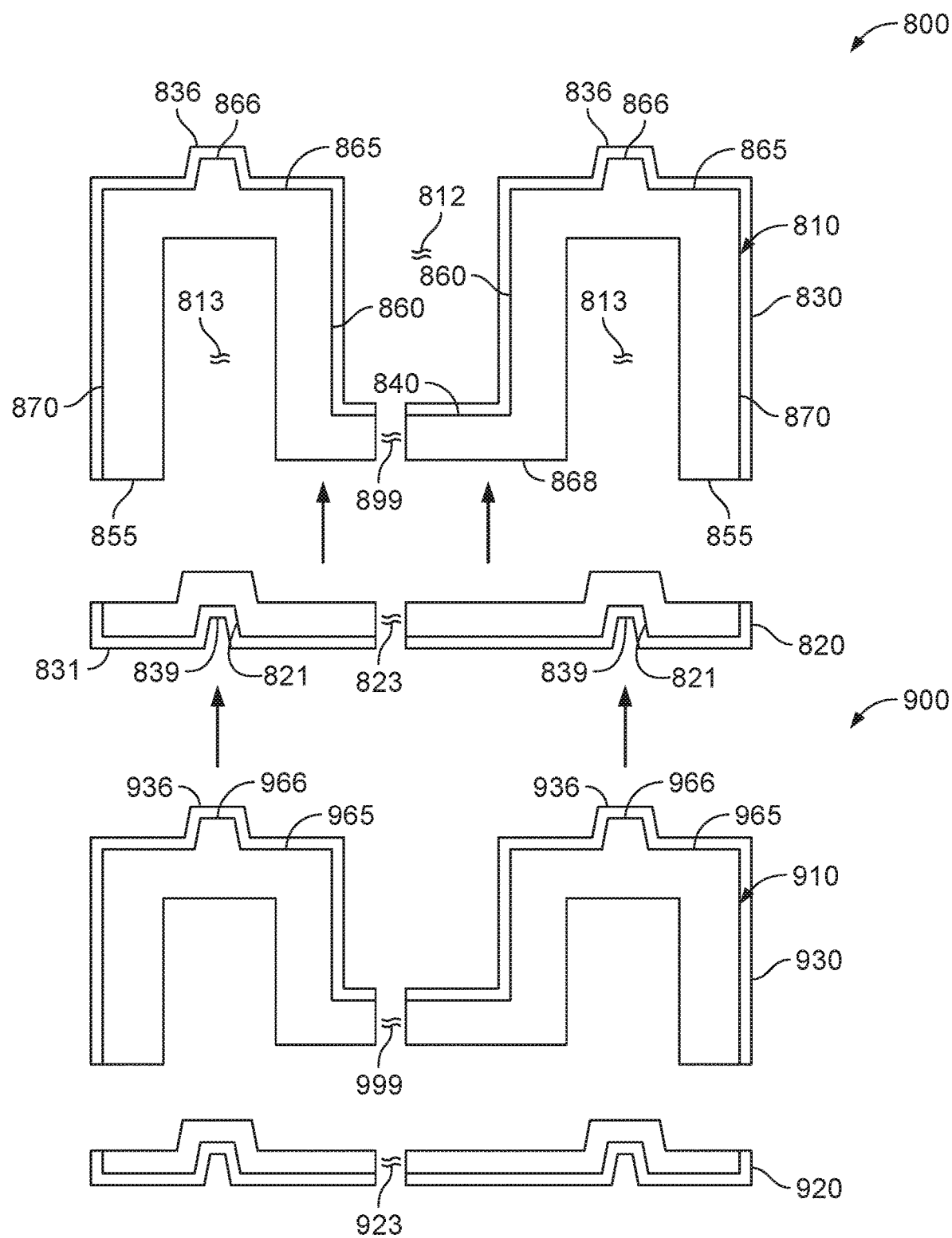
FIG. 12A is a cross-sectional view of another example containers.

FIG. 12A is a cross-sectional view of example containers. The container 800 can include a single-piece body, i.e., the solid compostable or recyclable body 810 and a cover 820. The solid compostable or recyclable body 810 can have a uniform homogenous composition. The solid compostable or recyclable body 810 is primarily formed of a single compostable material. As a unitary layer, the inner surface 840 of the floor is joined "continuously" and seamlessly to the side walls 860 along edges 861. In addition, each of the side walls 860 is joined "continuously" to its adjacent side walls along edges, e.g., an edge 861. The body 810 can form a shell with a gap 813 between the inner walls 860 and the outer side walls 870, which together provide the side walls of the packaging.

The inner surface 840 of the floor is continuously and seamlessly joined to the outer surfaces of inner side walls 860. The outer surfaces of the inner side walls 860 are continuously and seamlessly jointed to the outer surfaces of the outer side walls 870 by a rim 865 of the body 810. The outer surfaces of the outer side walls 870 are continuously and seamlessly joined to the inner surfaces of the outer side walls 870 by a rim 855 of the body 810. The inner surfaces of the outer side walls 870 are continuously and seamlessly joined to the inner surfaces of the inner side walls 860 by the rim 865. The inner surfaces of the inner side walls 860 are continuously and seamlessly joined to the outer surface 868 of the floor.

The container 800 can additionally include a cover 820 that is primarily formed of a compostable or recyclable material(s). The cover 820 can enclose the outer surface 868 of the floor and the gap 813 of the body 810. In some implementations, the cover 820 can be snuggly fit to bottom rims 855 of the outer side walls 870. In some other implementations, the cover 820 can include grooves or protrusions on edges of the cover 820 to be coupled with the body 810. Example methods of coupling the cover 820 to the body 810 are described above in greater detail with reference to FIGS. 5A to 5D.

In some implementations, the floor includes one or more holes 899 penetrating between the inner surface 840 of the floor and the outer surface 868 of the floor. In addition, the cover 820 includes one or more holes 823 penetrating the cover 820. Any liquid in the interior area 812 can be drained to an exterior area of the container 800 through the hole 899 and the hole 823. To drain liquid, the hole 899 of the body 810 can be aligned with the hole 823 of the cover 820. In some implementations, the floor can include one or more grooves on the inner surface 840 of the floor. The grooves can hold an item as described with reference to FIGS. 3B to 3D.

The container 800 includes a protrusion 866 that is located on the rim 865 and the cover 820 includes a groove 821 that is located on the outer surface of the cover 820. The protrusion and the groove can be the coupling mechanism mentioned above. The protrusion 866 is coupled to a groove of another container such that the container 800 is coupled to the container. For example, the container 900 includes a protrusion 966 on the rim 965 of the container 900. The protrusion 966 of the container 900 is inserted into the groove 821 of the container 800 such that the container 900 is coupled to the container 800. Once the protrusion 966 is securely coupled to the groove 821, the container 800 can be securely stacked on top of the container 900. The protrusion and the groove of the container can have any suitable size and shape to implement various containers.

In this implementation, the container 800 further includes one or more layers, e.g., a layer 830, covering the body 810. That is, the layer 830 can cover at least one of the surfaces of the body 810. For example, in FIG. 12A, the supporting layer 830 covers the inner surface 840 of the floor, the inner walls 860, the rim 865, and the outer walls 870. In some implementations, the layer 830 covers part of the surfaces of the container 800. The layer 830 can be a moisture barrier (a water-resistant, water-repellant or water-proof layer) to prevent liquid from reaching the body 810 and/or provide additional strength to the structure of the container 800.

To cover the surfaces of the container 800 with the supporting layer 830, various techniques can be used. For example, the techniques described with reference to FIG. 6 can be used to cover the surfaces of the container 800 with the supporting layer 830.

In some implementations, the layer 830 can be secured to the body 110 by an adhesive. The adhesive can be a separate additive, or the adhesive can be provided by applying water to the body 810 to cause the starch in a portion of the body 810 at the surface to become tacky such that the layer 830 sticks to the body 810.

Where both the body 810 and layer 830 are compostable, the entire container 800 can be disposed of as a unit in a composting bin. Where the body 810 is compostable and the layer 830 is recyclable, the layer can be ripped off the body 810 manually by the recipient of the package, and then the body 810 can be disposed of in a composting bin and the layer can be disposed of a recycling bin.

Figure 12B:
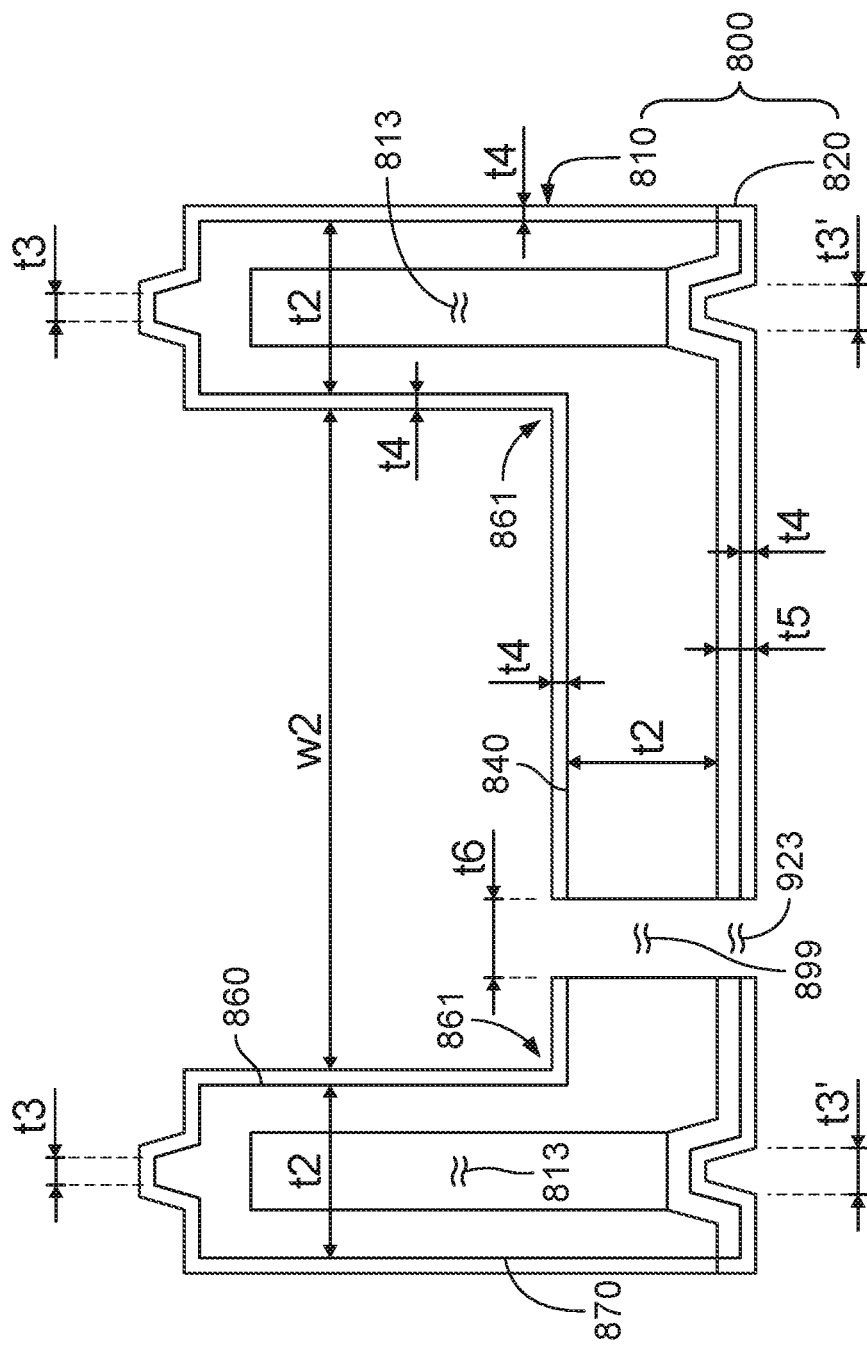
FIG. 12B is a cross-sectional view of the example container in FIG. 12A.

FIG. 12B is a cross-sectional view of the example container 800 in FIG. 12A. Referring FIG. 12B, for any of the various implementations, although the floor and walls of the body 810 can be thin, as compared to their respective length and width, the floor and walls are thick enough to provide sufficient thermal insulating function for commercial applications, such as shipment of fresh seafood, that require shipment of products, e.g., foods or medical supplies, that need to be kept cool, e.g., at temperatures of 32-48° F. In general, this can be accomplished with the body 810 having a thicknesses noted above, e.g., of about 0.25-4 inches for the core and 0.25-0.75 inches for the shell of a compostable body having a core and shell.

An example thickness t2 of the solid compostable or recyclable body 810 can be 0.5-5 inches. In the illustrated example, the solid compostable or recyclable body 810 has substantially uniform thickness. In some implementations, the solid compostable or recyclable body 810 can have non-uniform thickness. For example, a thickness of the floor 840 can be different from a thickness for the side wall 860. That is, the sum of the thickness of the floor 840 and the thickness of the cover 820 can be the same as the thickness t2 of the side walls. An example thickness t7 of the gap between the outer side wall 870 and the inner side wall 860 can be 0.5-4 inches. A width w2 of the interior space 812 can be 3-48 inches. In some implementations, the interior space 812 can have a square shape. In some other implementations, the interior area 812 can have a rectangular shape. In some other implementations, the interior area 812 can have a circular shape.

The width t3 of the protrusion 866 is smaller than the width t3' of the groove 869. In particular, as illustrated in FIG. 10B, when the protrusion 866 is covered by the supporting layer 830, the thickness t3 and the thickness t3' can be determined based on the thickness t4 of the supporting layer 830.

Conclusion

It should be understood that, although various terms such as "top", "bottom", "vertical," and "lateral" are used, these terms indicate relative positioning of components under the assumption that an opening to the box 20 is at the top, and don't necessarily indicate an orientation relative to gravity; in use, or even during assembly, the container 10 could be on its side or upside down relative to gravity. The term "slightly" indicates no more than about 5%, e.g., no more than 2%.

A number of embodiments have been described. Nevertheless, it will be understood that various modifications may be made without departing from the spirit and scope of the invention. Accordingly, other embodiments are within the scope of the following claims.

What is claimed is:

1. A stackable container to store wet material, the container comprising:
a solid compostable or recyclable body formed primarily of a plant fiber, the body including
a floor, and
a plurality of side walls that are coupled to the floor along first common edges and each coupled to two adjacent side walls along second common edges to surround an interior space of the container, wherein a top surface of the side walls provides a rim that includes a projection or recess spaced apart from an outer surface of a nearest side wall and a flat region between the projection or recess and the outer surface of the nearest side wall, the projection or recess configured to couple the container to a corresponding recess or projection on a floor of an overlying container,
wherein the floor is seamlessly and continuously coupled along each of the first common edges to each of the plurality of side walls,
wherein each of the plurality of side walls is seamlessly and continuously coupled along the second common edges to adjacent side walls, and
wherein a bottom surface of the floor includes a recess or projection that is spaced apart from the outer surface of a nearest side wall and a flat region between the recess or projection and the outer surface of the nearest side wall, and the recess or projection is configured to be coupled with a projection or recess on a rim of an underlying container.

2. The container of claim 1, wherein the plant fiber comprises bamboo, bagasse, wood pulp, or combinations thereof.

3. The container of claim 1, wherein a top surface of the floor further includes one or more grooves or protrusions to secure the wet material.

4. The container of claim 1, comprising one or more holes through the floor to provide drainage of liquid from the interior space.

5. The container of claim 1, wherein the solid compostable or recyclable body includes an additive to increase resistance of the plant fiber to water.

6. The container of claim 1, comprising a water-barrier film formed over a portion of the body.

7. The container of claim 1, wherein the rim includes the projection configured to couple the container to the corresponding recess of the overlying container and the bottom surface of the floor includes the recess that is configured to be coupled with the projection of the underlying container.

8. A stackable container to store wet material, the container comprising:
a solid compostable or recyclable body formed primarily of a plant fiber, the body including
a floor, and
a plurality of side walls that are coupled to the floor along first common edges and each coupled to two adjacent side walls along second common edges to surround an interior space of the container, wherein a top surface of the side walls provides a rim that includes a projection or recess configured to couple the container to a corresponding recess or projection on a floor of an overlying container,
wherein the floor is seamlessly and continuously coupled along each of the first common edges to each of the plurality of side walls,
wherein each of the plurality of side walls is seamlessly and continuously coupled along the second common edges to adjacent side walls,
wherein a bottom surface of the floor includes a recess or projection that is configured to be coupled with a projection or recess on a rim of an underlying container; and
wherein the floor includes one or more holes therethrough to provide drainage of liquid from the interior space, the holes spaced apart from the side walls.

9. The container of claim 8, comprising a water-barrier film formed over a portion of the body.

10. The container of claim 9, wherein the water-barrier film covers an interior surface of the floor and sidewalls.

11. The container of claim 10, wherein the water-barrier film covers an exterior surface of the floor and sidewalls.

12. The container of claim 8, wherein the solid compostable or recyclable body includes an additive to increase resistance of the plant fiber to water.

13. The container of claim 12, wherein the additive includes a polymer based on one or more of polylactic acid (PLA), poly(beta-amino) esters (PBAE), polyhydroxyalkanoate (PHA), polycapralactones (PCL), polybutyrate adipate terephthalate (PBAT) polyvinylalcohol (PVA), or ethylene vinyl alcohol (EVOH).

14. The container of claim 8, wherein a top surface of the floor includes one or more grooves or protrusions to secure the wet material.

15. The container of claim 8, wherein inner surfaces of the side walls include one or more grooves to provide air flow.

* * * * *